US012495440B2

(12) United States Patent
Khoshkholgh Dashtaki et al.

(10) Patent No.: US 12,495,440 B2
(45) Date of Patent: Dec. 9, 2025

(54) TWO-STEP RANDOM ACCESS PROCEDURE WITH DISCONTINUOUS RECEPTION

(71) Applicant: Ofinno, LLC, Reston, VA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 455 days.

(21) Appl. No.: 17/970,719

(22) Filed: Oct. 21, 2022

(65) Prior Publication Data
US 2023/0127160 A1   Apr. 27, 2023

Related U.S. Application Data

(60) Provisional application No. 63/270,440, filed on Oct. 21, 2021.

(51) Int. Cl.
*H04W 74/08*    (2024.01)
*H04W 52/02*    (2009.01)
(Continued)

(52) U.S. Cl.
CPC ..... *H04W 74/006* (2013.01); *H04W 52/0229* (2013.01); *H04W 74/0836* (2024.01);
(Continued)

(58) Field of Classification Search
CPC ......... H04W 74/0833; H04W 52/0229; H04W 74/006; H04W 76/28; H04W 74/0836;
(Continued)

(56) References Cited

U.S. PATENT DOCUMENTS 11,470,676 B2 * 10/2022 Chen ................... H04L 5/0096
2013/0272233 A1 * 10/2013 Dinan ................... H04L 5/001
370/329
(Continued)

FOREIGN PATENT DOCUMENTS

| EP | 3 716 520 A | 9/2020 | |
| JP | 2023501615 A * | 1/2023 | ........ H04W 74/0833 |
| WO | 2021/067921 A1 | 4/2021 | |

OTHER PUBLICATIONS

3GPP TS 38.211 V16.4.0 (Dec. 2020); Technical Specification; 3rd Generation Partnership Project; Technical Specification Group Radio Access Network; NR; Physical channels and modulation; (Release 16).
(Continued)

*Primary Examiner* — Wutchung Chu
(74) *Attorney, Agent, or Firm* — Matthew Fernandez; Kavon Nasabzadeh; Jacob L. Mangan

(57) ABSTRACT

A wireless device receives one or more configuration parameters indicating one or more radio network temporary identifiers (RNTIs) to monitor, via downlink control channels, during an active time of DRX operation. The wireless device selects, for transmission of a message-A of a random access procedure, one or more resources, where the message-A comprises a preamble and a payload and the payload comprises a C-RNTI. The wireless device starts a response window based on transmitting the preamble via at least one resource of the one or more resources. Based on dropping transmission of the payload and during the response window, the wireless device monitors the downlink control channels for a first RNTI, where the first RNTI is associated with a response to the preamble and determined based on the at least one resource, and does not monitor the downlink control channels for the one or more RNTIs.

20 Claims, 28 Drawing Sheets

(51) Int. Cl.
*H04W 74/00* (2009.01)
*H04W 74/0836* (2024.01)
*H04W 74/0833* (2024.01)
*H04W 74/0838* (2024.01)
*H04W 76/28* (2018.01)

(52) U.S. Cl.
CPC .... *H04W 74/0833* (2013.01); *H04W 74/0838* (2024.01); *H04W 76/28* (2018.02)

(58) Field of Classification Search
CPC ............. H04W 74/0838; H04W 76/11; H04W 52/0216
See application file for complete search history.

(56) References Cited

U.S. PATENT DOCUMENTS

| | | | | |
|---|---|---|---|---|
| 2013/0279435 | A1* | 10/2013 | Dinan | H04B 7/2618 370/329 |
| 2016/0056933 | A1* | 2/2016 | Aiba | H04L 1/1861 370/329 |
| 2019/0215896 | A1 | 7/2019 | Zhou et al. | |
| 2020/0100297 | A1* | 3/2020 | Agiwal | H04W 52/365 |
| 2021/0014881 | A1* | 1/2021 | Aiba | H04L 1/1822 |
| 2021/0022172 | A1* | 1/2021 | Abotabl | H04W 76/11 |
| 2021/0051706 | A1* | 2/2021 | Yang | H04W 74/04 |
| 2021/0100029 | A1* | 4/2021 | Lei | H04W 72/0446 |
| 2021/0105822 | A1* | 4/2021 | Hakola | H04B 7/06952 |
| 2021/0112603 | A1* | 4/2021 | Xue | H04L 5/0053 |
| 2021/0168874 | A1* | 6/2021 | Wei | H04W 74/0833 |
| 2021/0195630 | A1* | 6/2021 | Taherzadeh Boroujeni | H04W 72/0446 |
| 2021/0227587 | A1* | 7/2021 | Tsai | H04W 74/006 |
| 2021/0250989 | A1* | 8/2021 | Chin | H04W 76/27 |
| 2021/0251012 | A1* | 8/2021 | Shrestha | H04W 56/0045 |
| 2021/0321461 | A1* | 10/2021 | Kung | H04W 72/23 |
| 2021/0360610 | A1* | 11/2021 | Kim | H04L 1/1858 |
| 2021/0409096 | A1* | 12/2021 | Liou | H04W 56/001 |
| 2022/0046574 | A1* | 2/2022 | Farag | H04L 27/2607 |
| 2022/0061117 | A1* | 2/2022 | Liou | H04L 5/0053 |
| 2022/0110184 | A1* | 4/2022 | Jeon | H04W 74/0833 |
| 2022/0141884 | A1* | 5/2022 | Lee | H04W 72/0446 370/329 |
| 2022/0159659 | A1* | 5/2022 | Hosseini | H04W 24/08 |
| 2022/0232609 | A1* | 7/2022 | Lee | H04W 72/569 |
| 2022/0232626 | A1* | 7/2022 | Li | H04W 72/02 |
| 2022/0312337 | A1* | 9/2022 | Lim | H04W 52/242 |
| 2022/0394805 | A1* | 12/2022 | Chen | H04W 72/30 |
| 2023/0127160 | A1* | 4/2023 | Khoshkholgh Dashtaki | H04W 74/0836 370/329 |
| 2023/0156743 | A1* | 5/2023 | Seok | H04L 5/0094 370/329 |
| 2023/0156819 | A1* | 5/2023 | Agiwal | H04B 7/0695 370/329 |
| 2023/0284329 | A1* | 9/2023 | Agiwal | H04W 76/27 370/331 |
| 2023/0319845 | A1* | 10/2023 | Guo | H04W 72/1273 370/329 |
| 2024/0381483 | A1* | 11/2024 | Park | H04L 5/0055 |
| 2025/0016877 | A1* | 1/2025 | Kim | H04W 76/38 |

OTHER PUBLICATIONS

3GPP TS 38.212 V16.4.0 (Dec. 2020); Technical Specification; 3rd Generation Partnership Project; Technical Specification Group Radio Access Network; NR; Multiplexing and channel coding; (Release 16).

3GPP TS 38.213 V16.4.0 (Dec. 2020); Technical Specification; 3rd Generation Partnership Project; Technical Specification Group Radio Access Network; NR; Physical layer procedures for control (Release 16).

3GPP TS 38.214 V16.4.0 (Dec. 2020); Technical Specification; 3rd Generation Partnership Project; Technical Specification Group Radio Access Network; NR; Physical layer procedures for data; (Release 16).

3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).

3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).

3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).

* cited by examiner

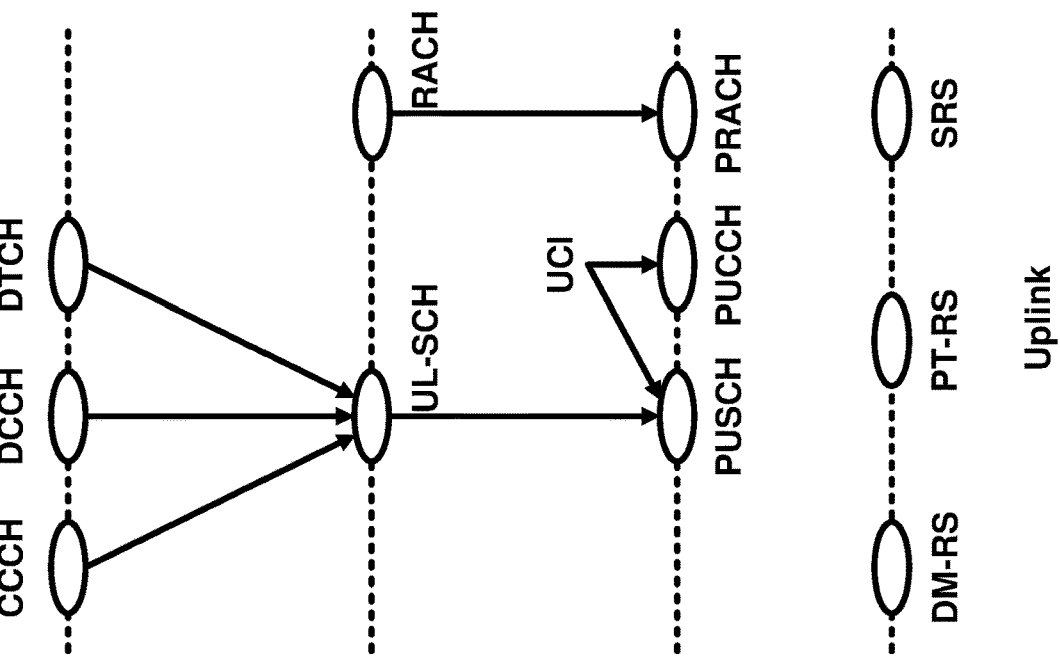
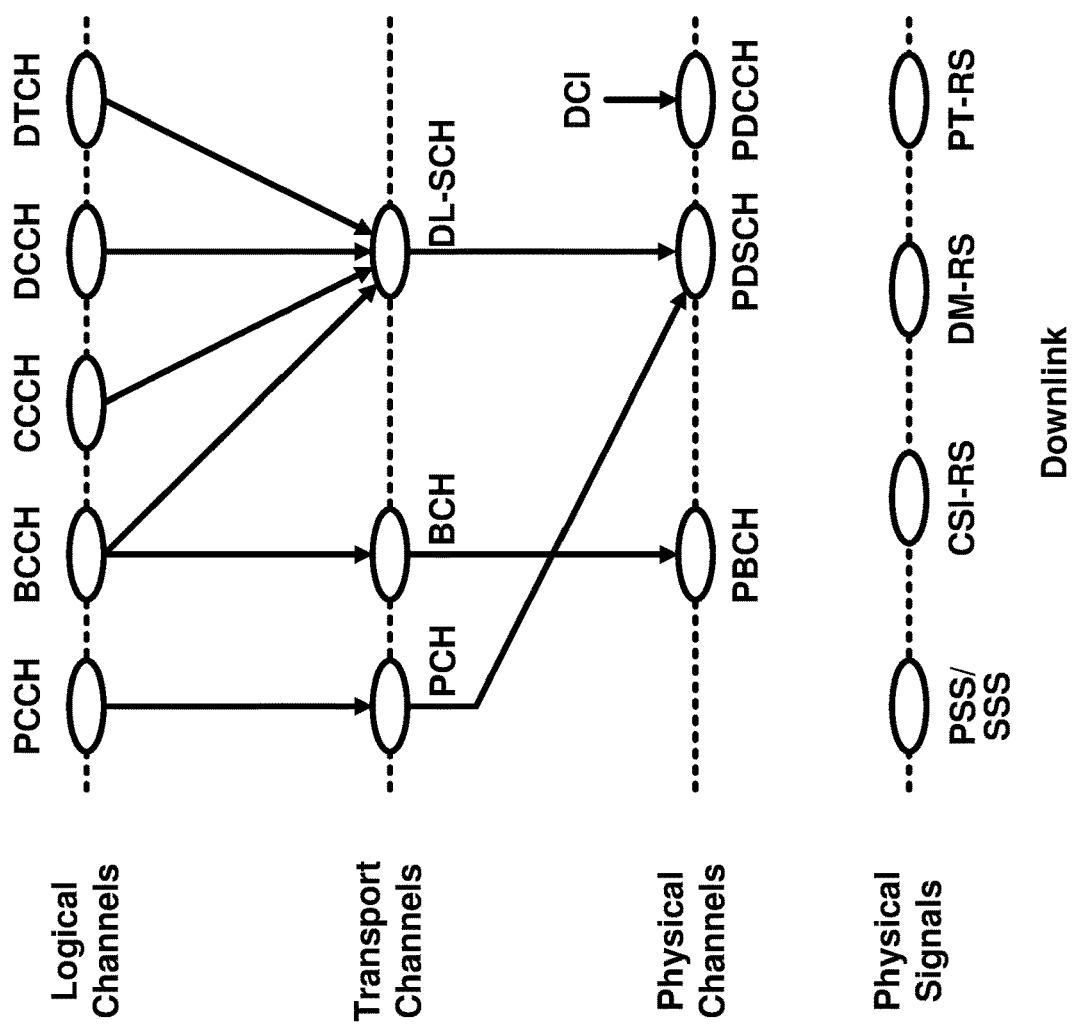
FIG. 5B Uplink
FIG. 5A Downlink

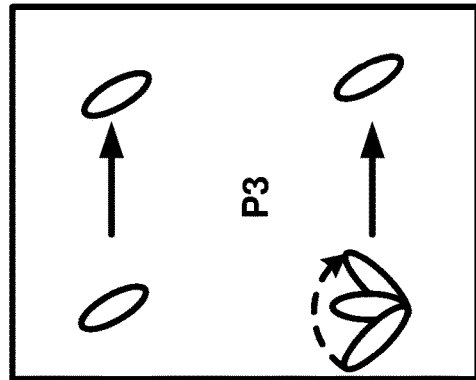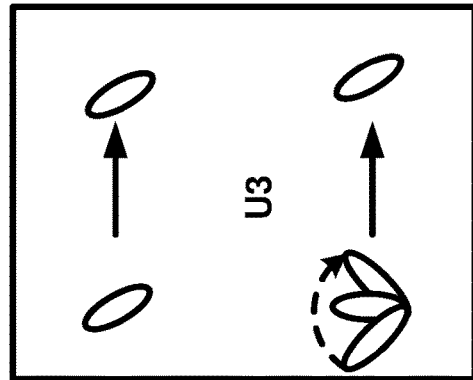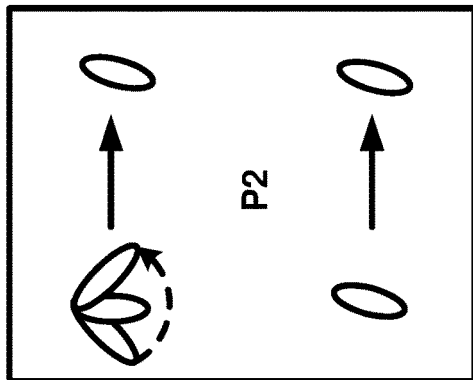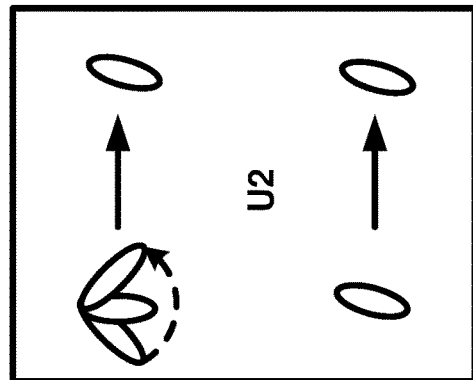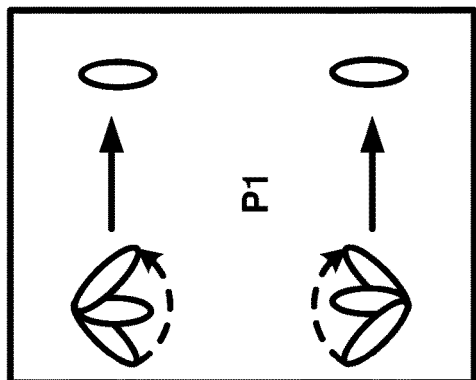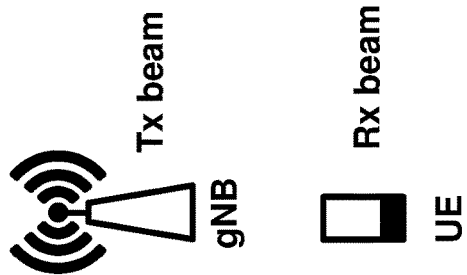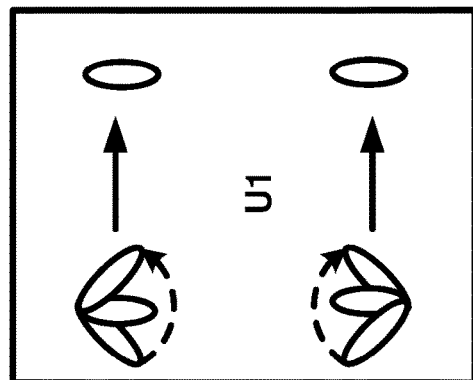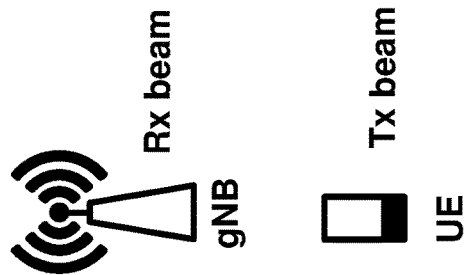
FIG. 12A
FIG. 12B

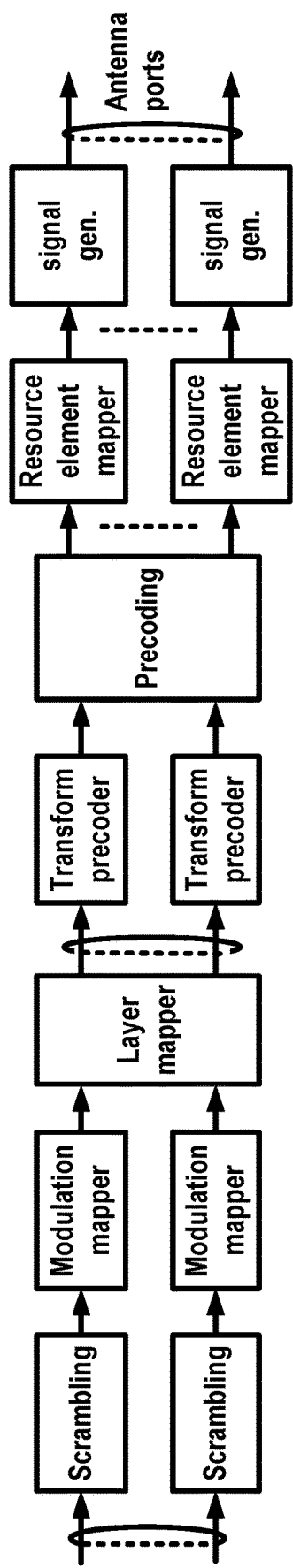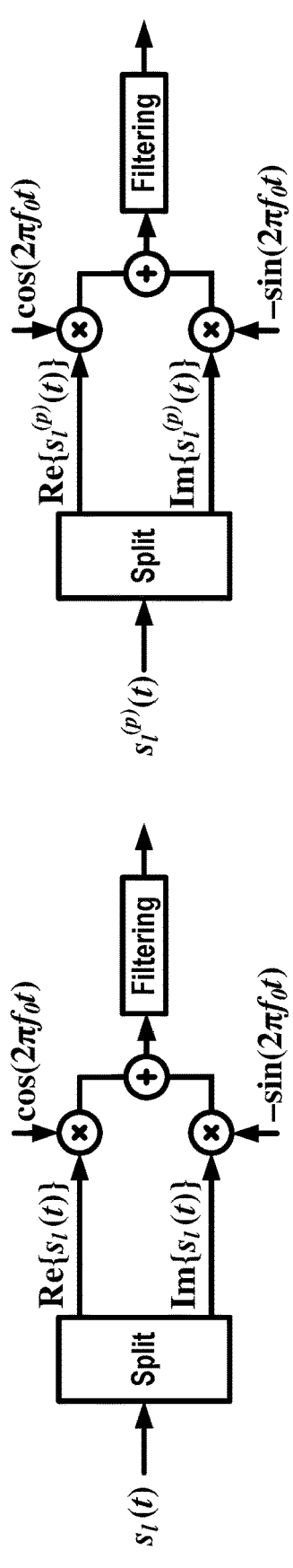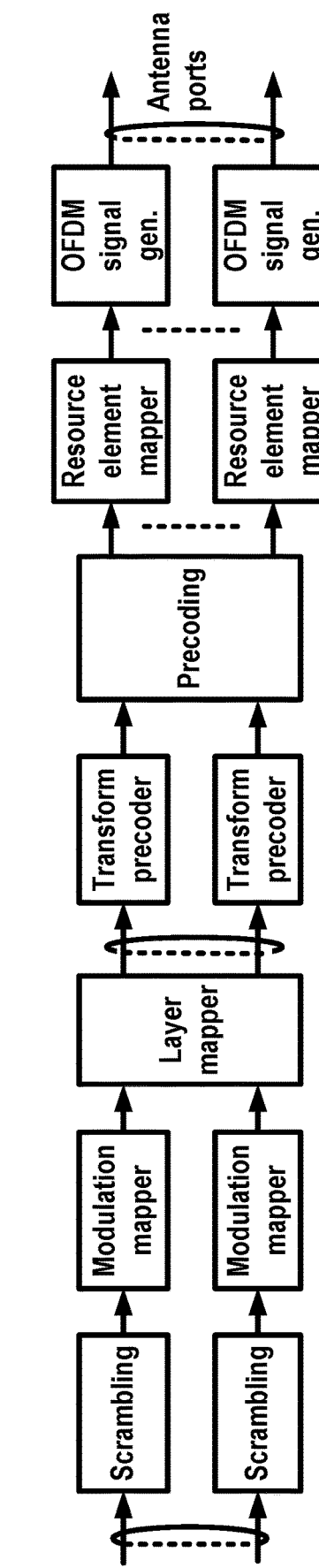
FIG. 16A
FIG. 16B
FIG. 16C
FIG. 16D

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

Table 1: PDSCH processing time for PDSCH processing capability 1

| μ | PDSCH decoding time $N_1$ [symbols] | |
|---|---|---|
| | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB, or if the higher layer parameter is not configured |
| 0 | 8 | $N_{1,0}$ |
| 1 | 10 | 13 |
| 2 | 17 | 20 |
| 3 | 20 | 24 |

Table 2: PDSCH processing time for PDSCH processing capability 2

| μ | PDSCH decoding time $N_1$ [symbols] dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

FIG. 18

Table 3: PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

Table 4: PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

FIG. 19

TWO-STEP RANDOM ACCESS PROCEDURE WITH DISCONTINUOUS RECEPTION

CROSS-REFERENCE TO RELATED APPLICATIONS

This application claims the benefit of U.S. Provisional Application No. 63/270,440, filed Oct. 21, 2021, which is hereby incorporated by reference in its entirety.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 17 shows several DCI formats that may be used by a base station to transmit control information to a wireless device or used by the wireless device for PDCCH monitoring.

FIG. 18 shows example PDSCH processing times.

FIG. 19 shows examples of PUSCH preparation/processing time.

DETAILED DESCRIPTION

Figure 1A:
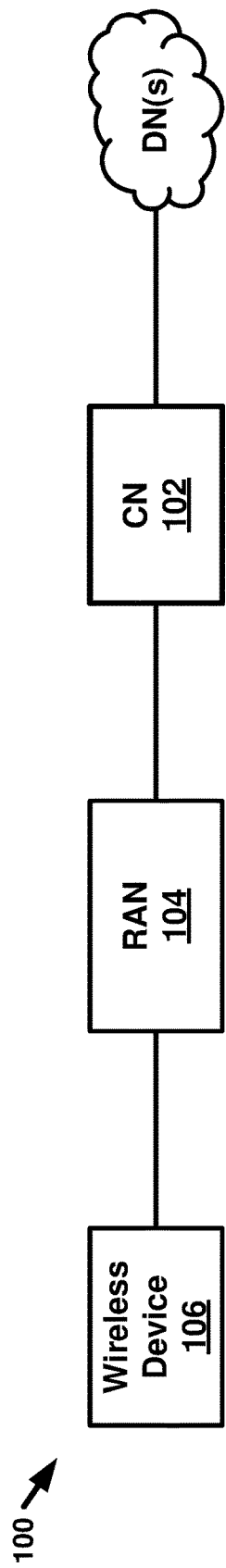
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
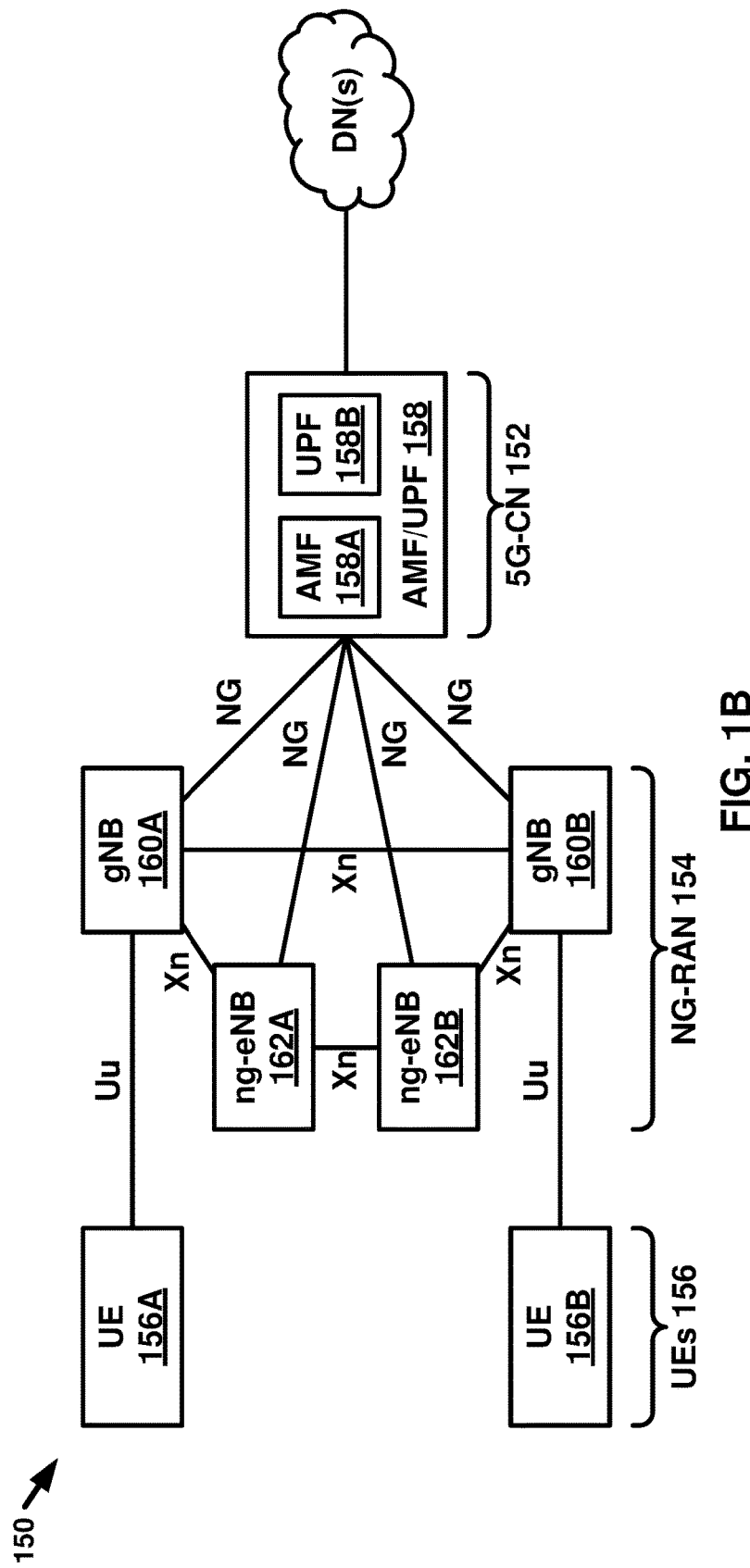

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
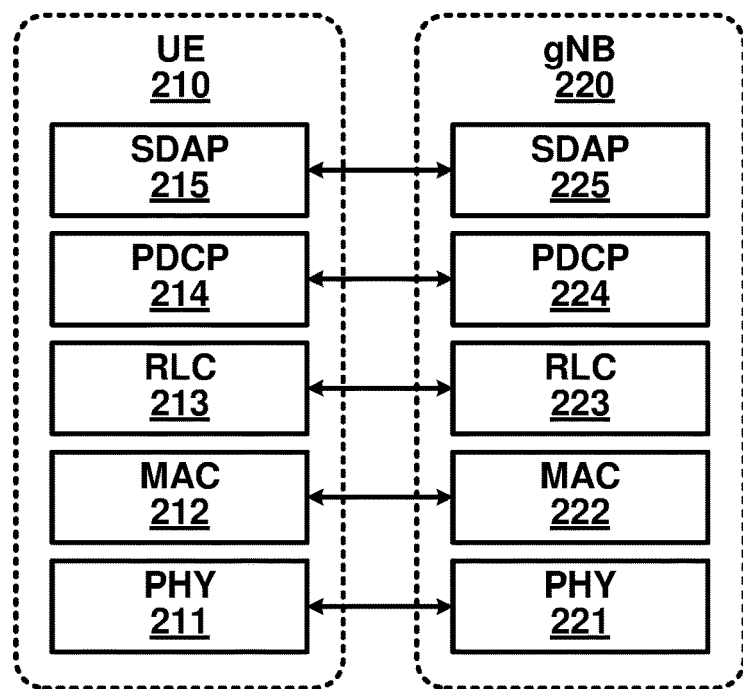
FIG. 2A and FIG. 2B respectively illustrate a New Radio (NR) user plane and control plane protocol stack.
Figure 2B:
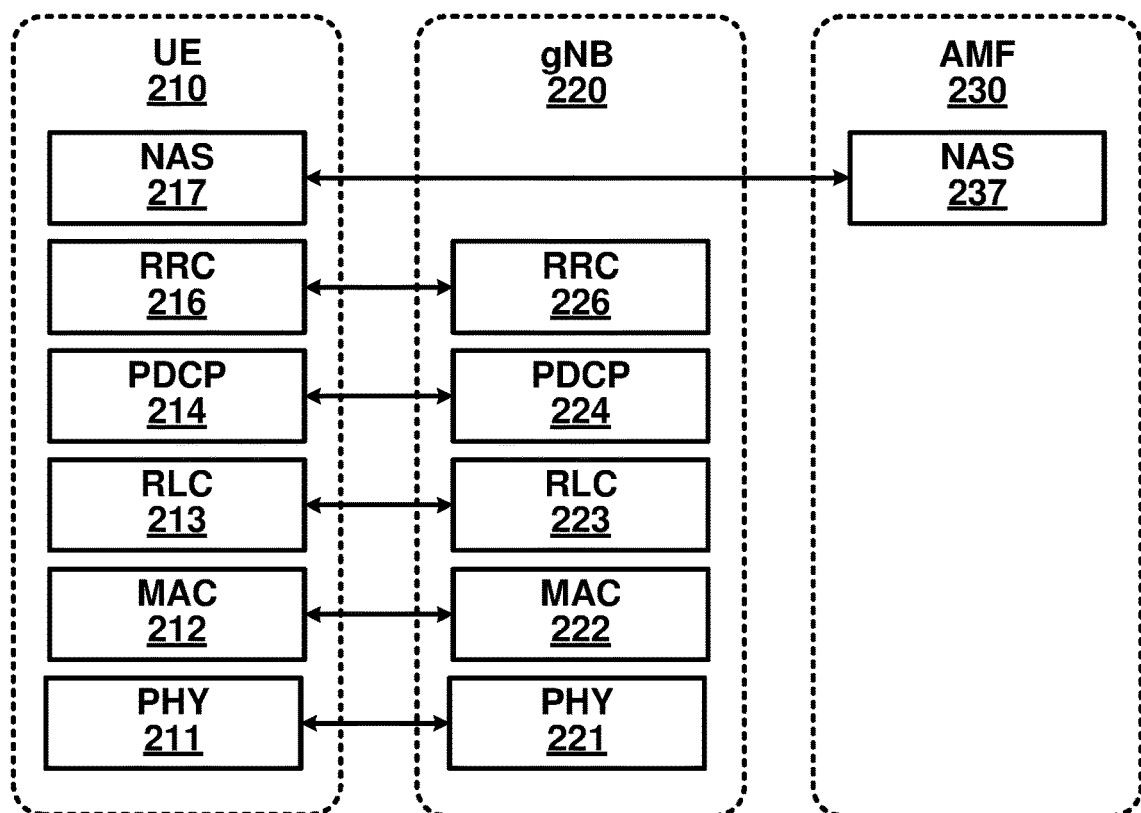

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
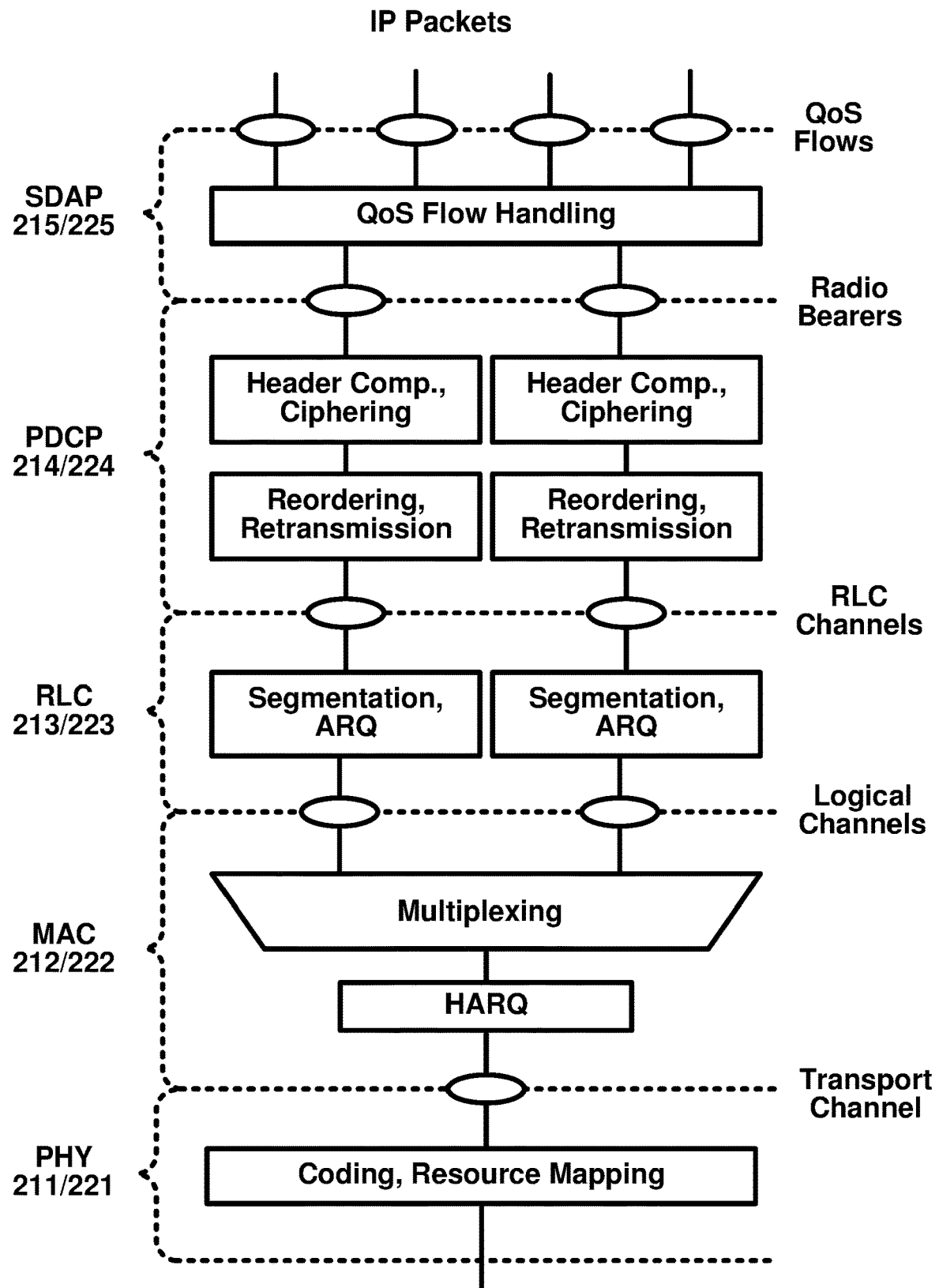
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
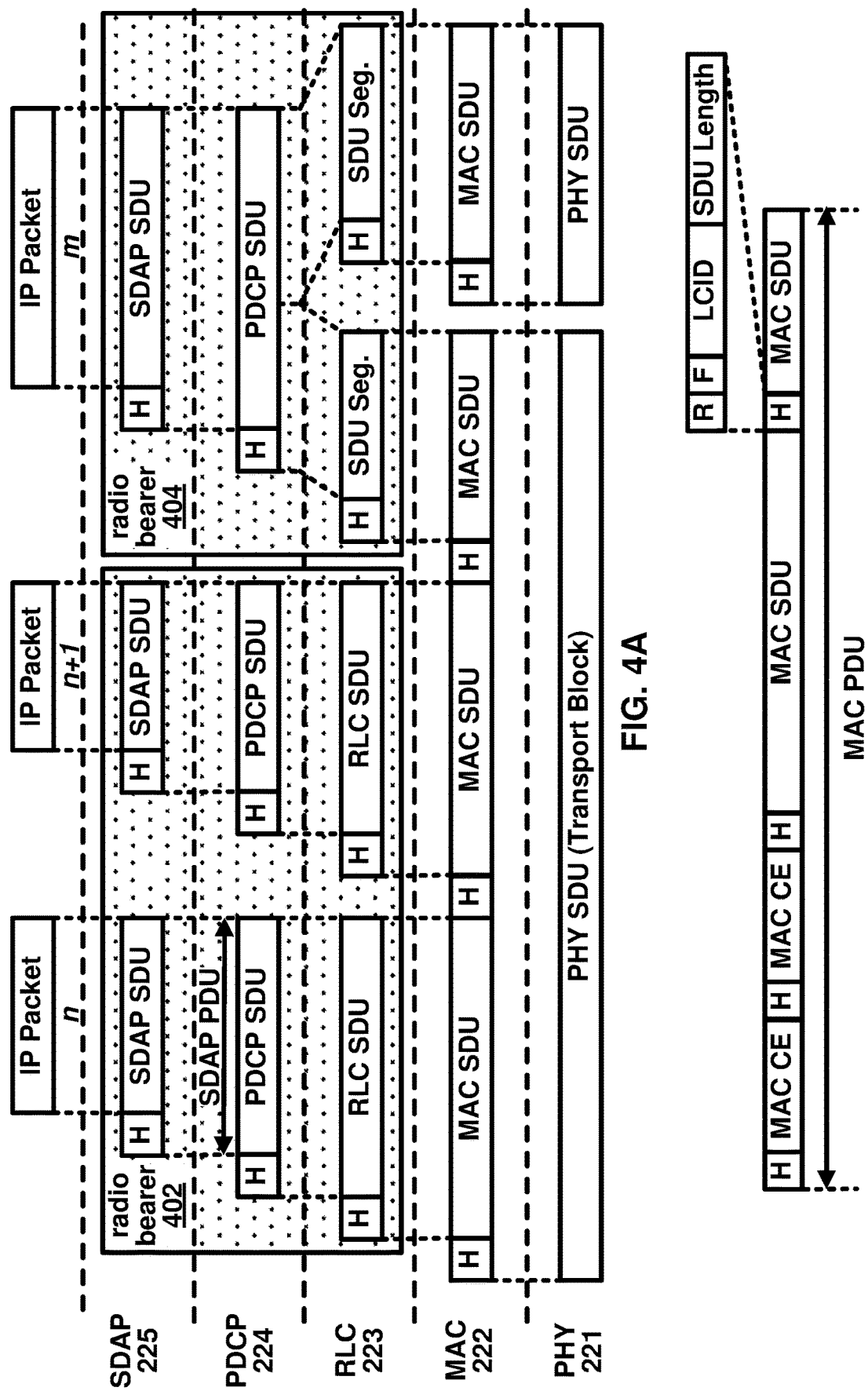
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
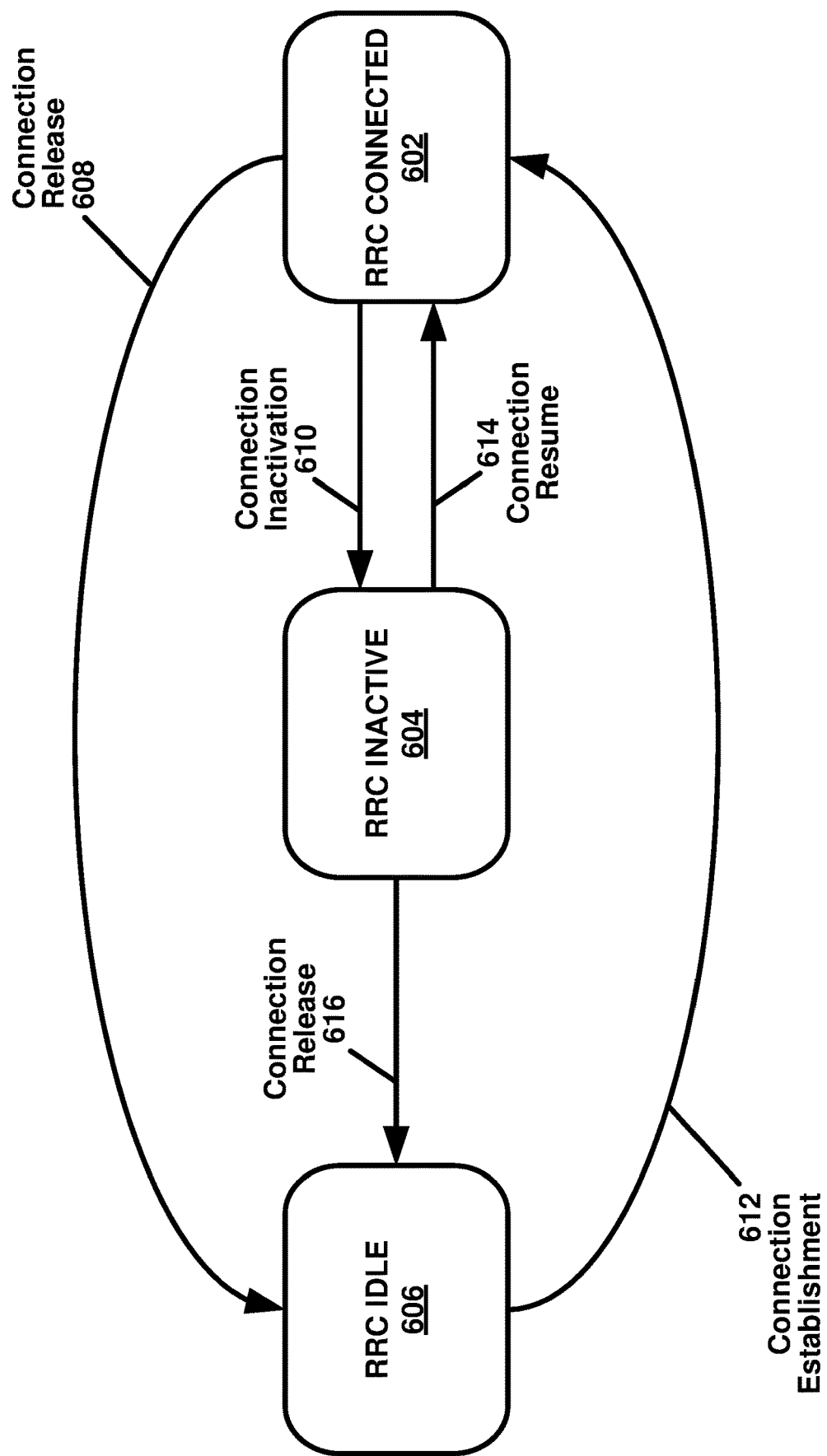
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
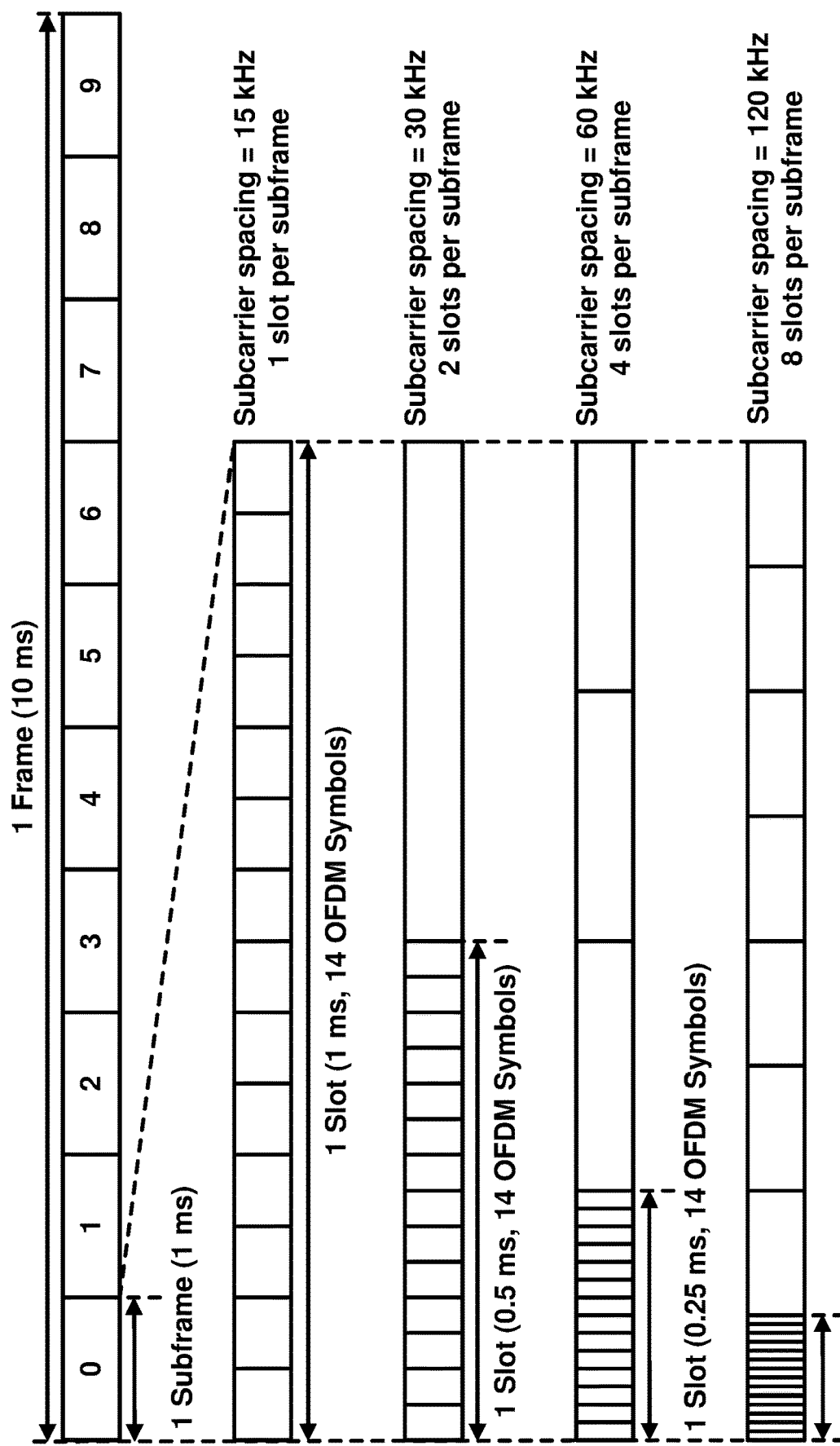
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
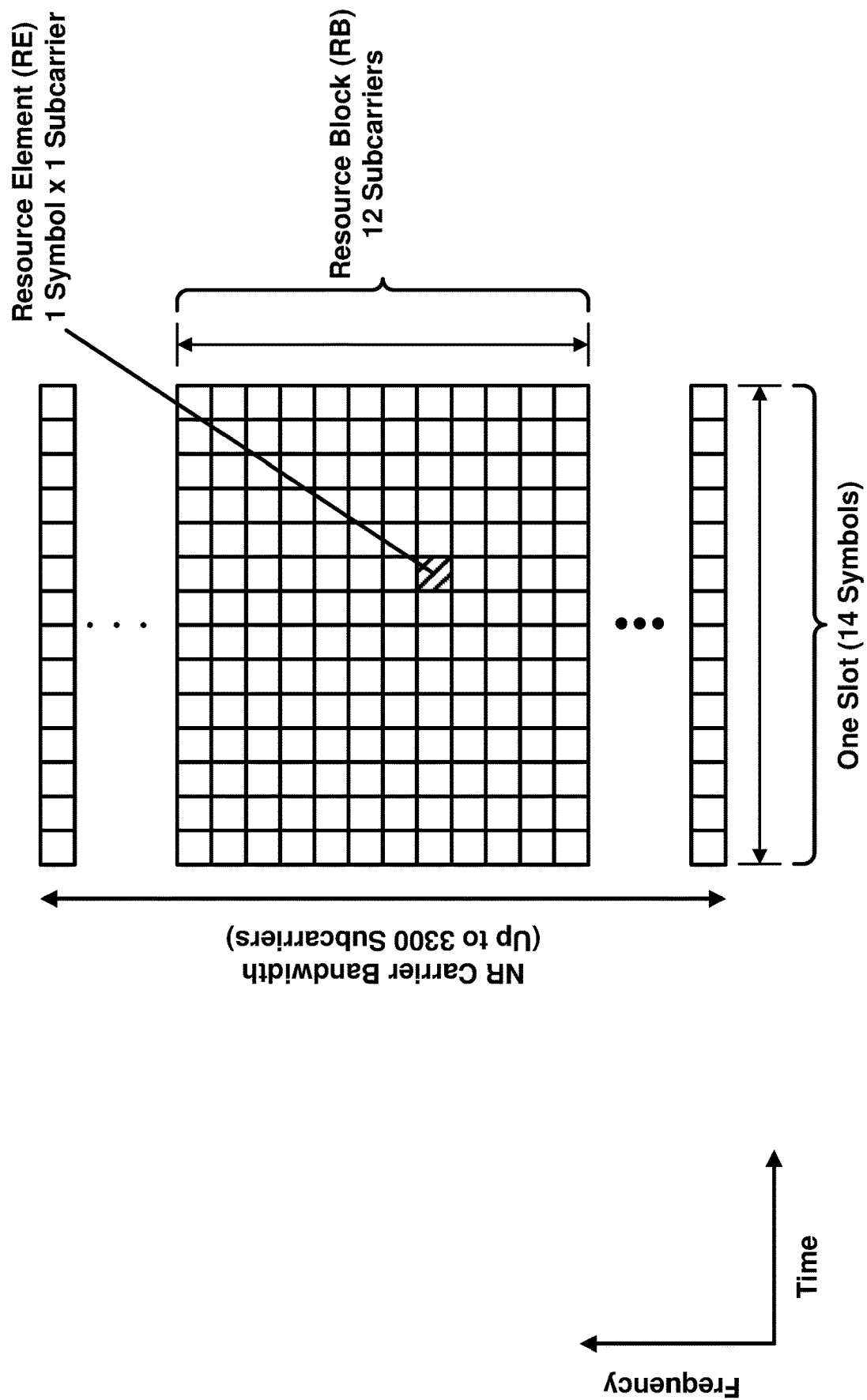
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
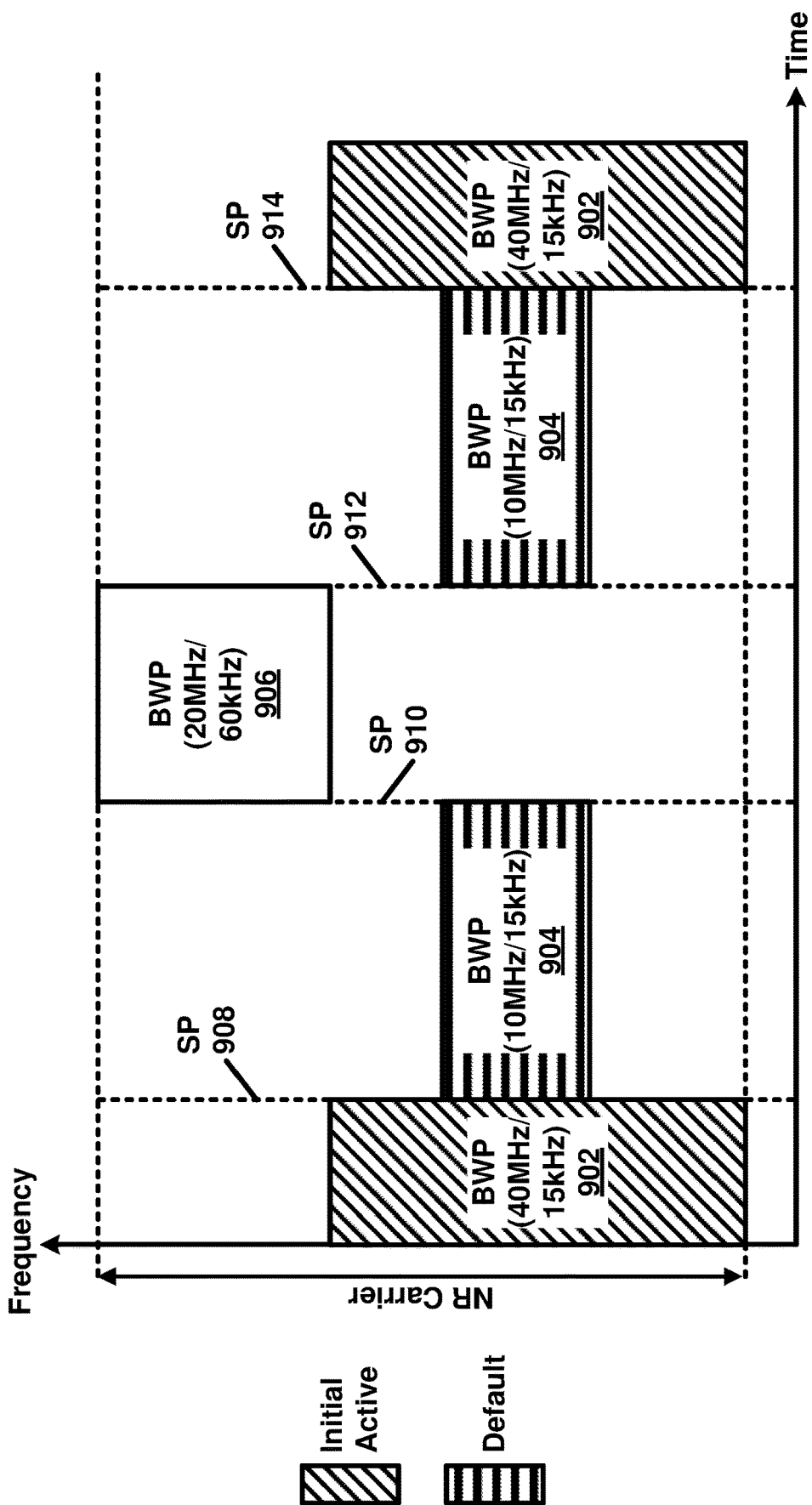
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
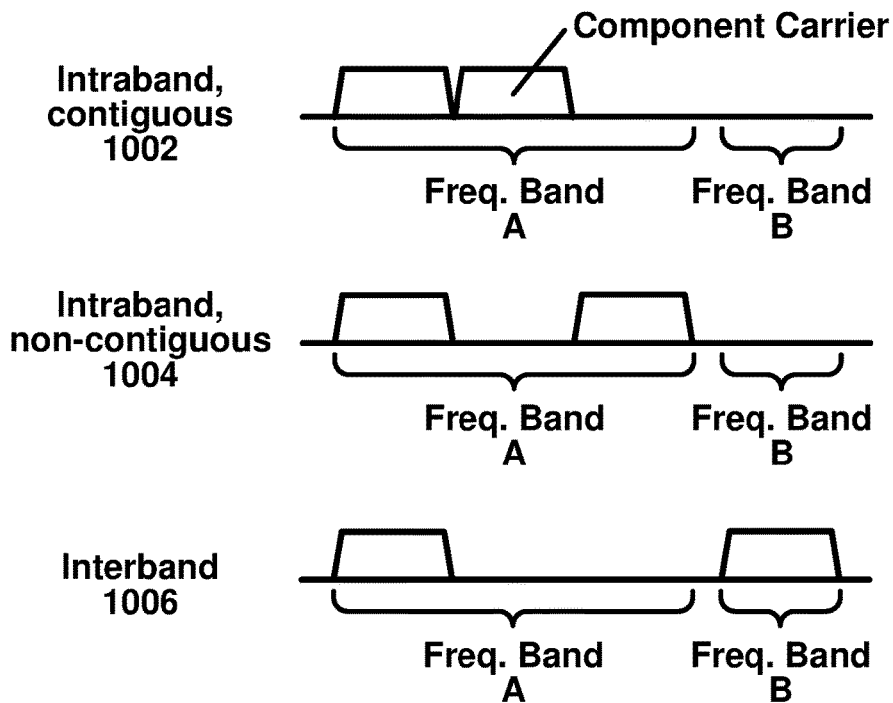
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
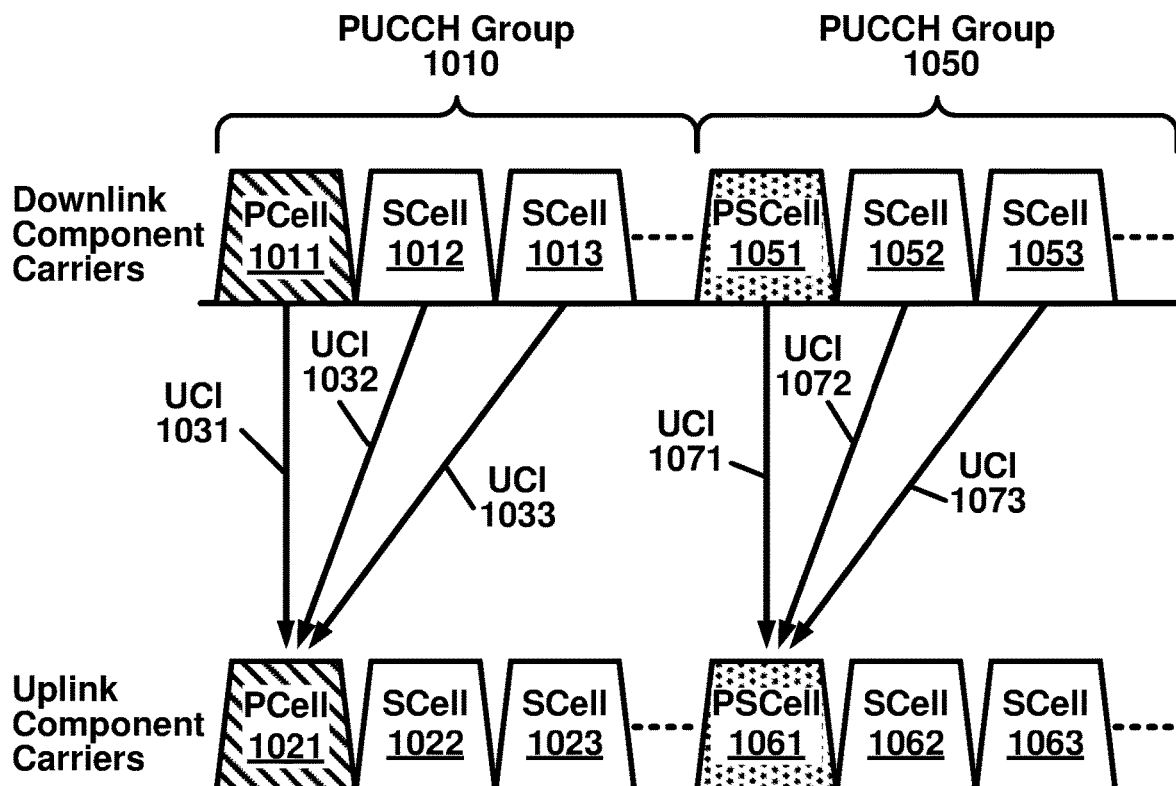
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
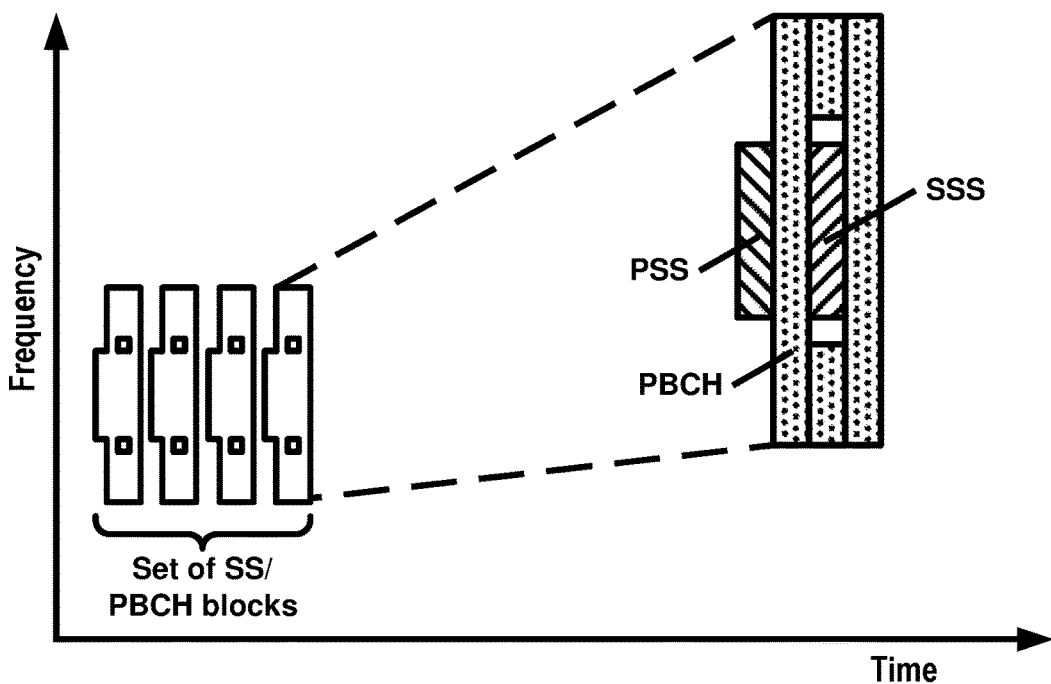
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
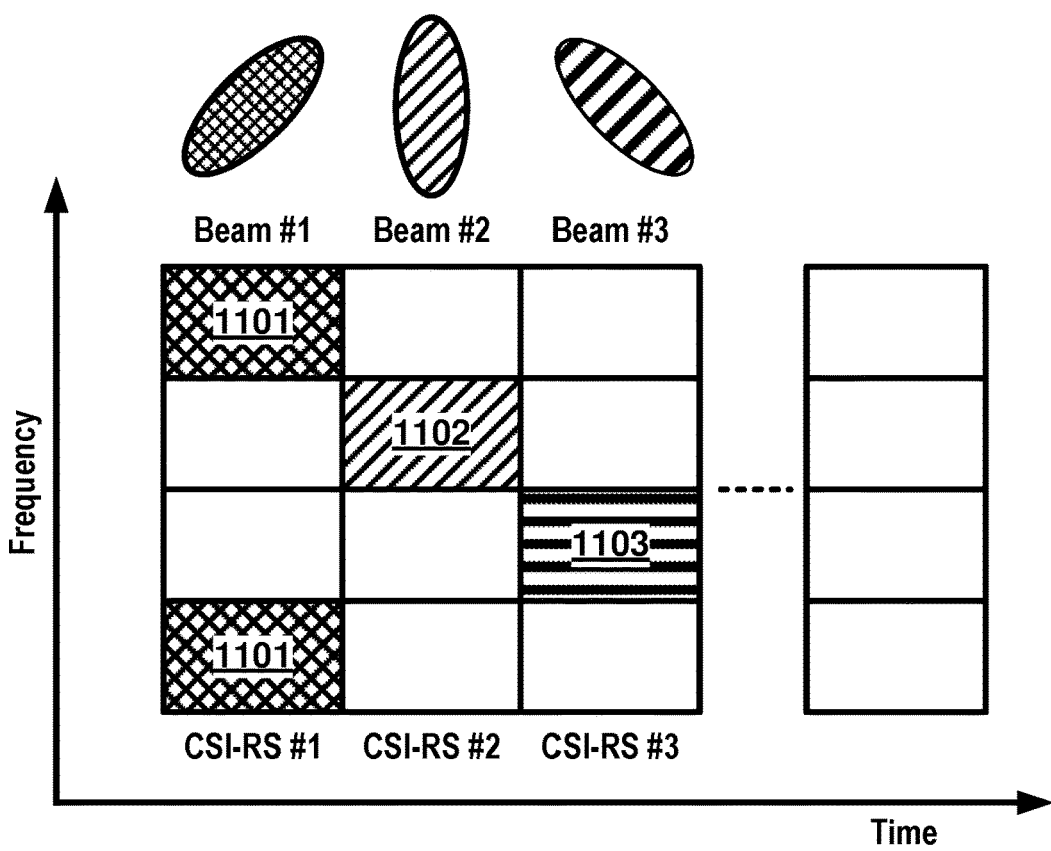
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
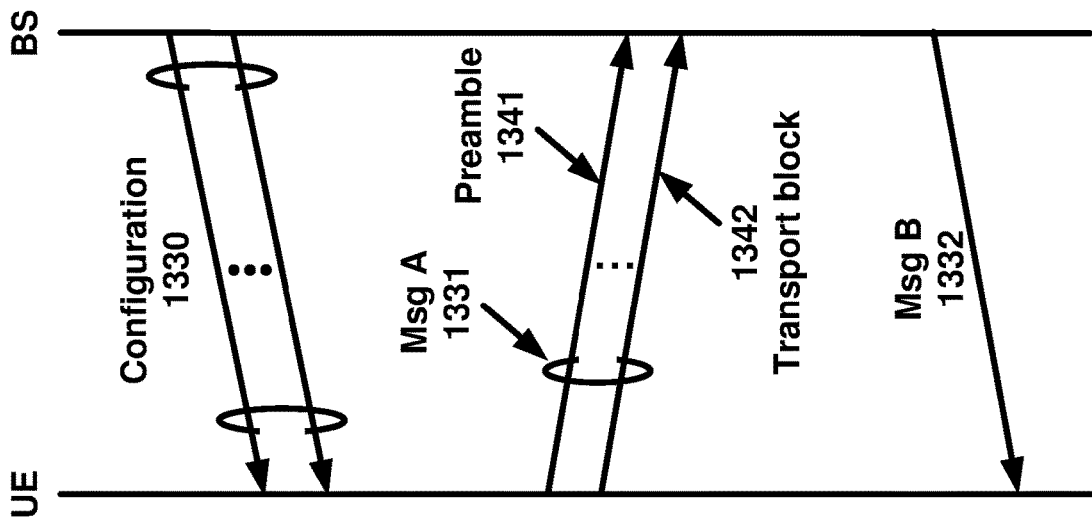
FIG. 13A, FIG. 13B, and FIG. 13C respectively illustrate a four-step contention-based random access procedure, a two-step contention-free random access procedure, and another two-step random access procedure.
Figure 13B:
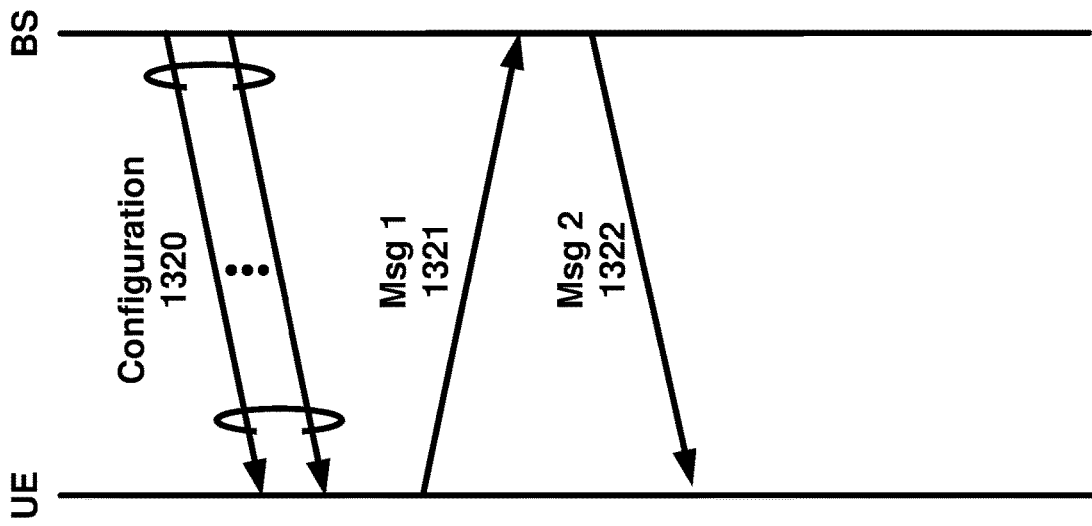
Figure 13A:
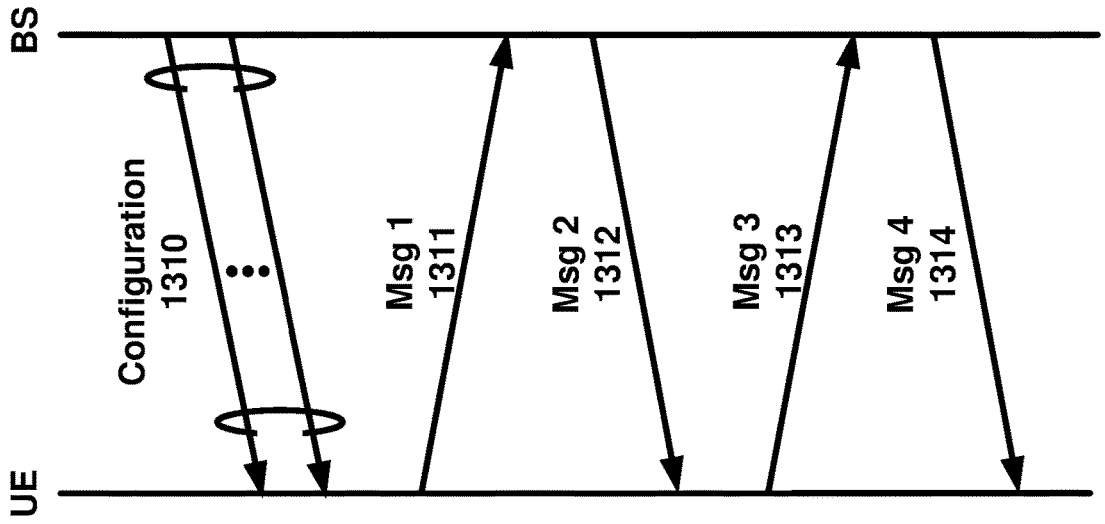

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssbOccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$Ra - RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id <14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
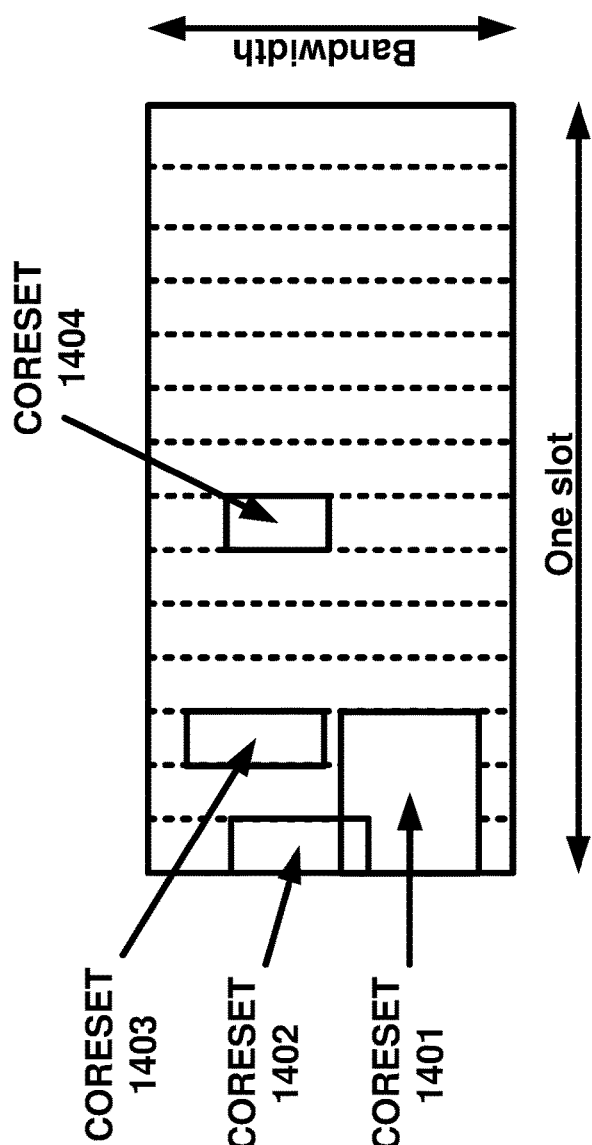
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
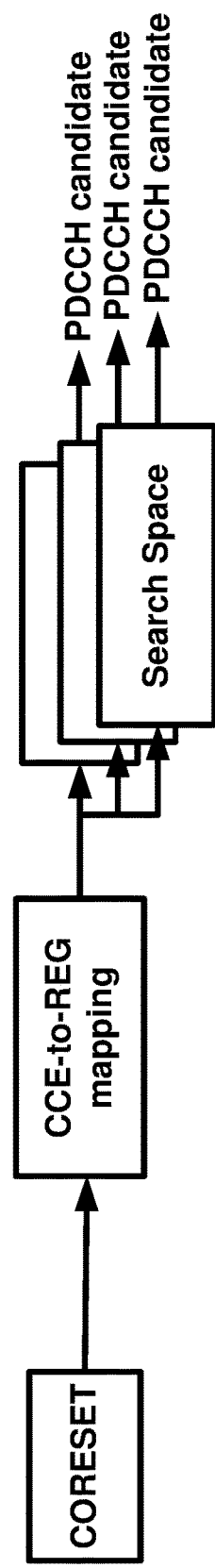
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
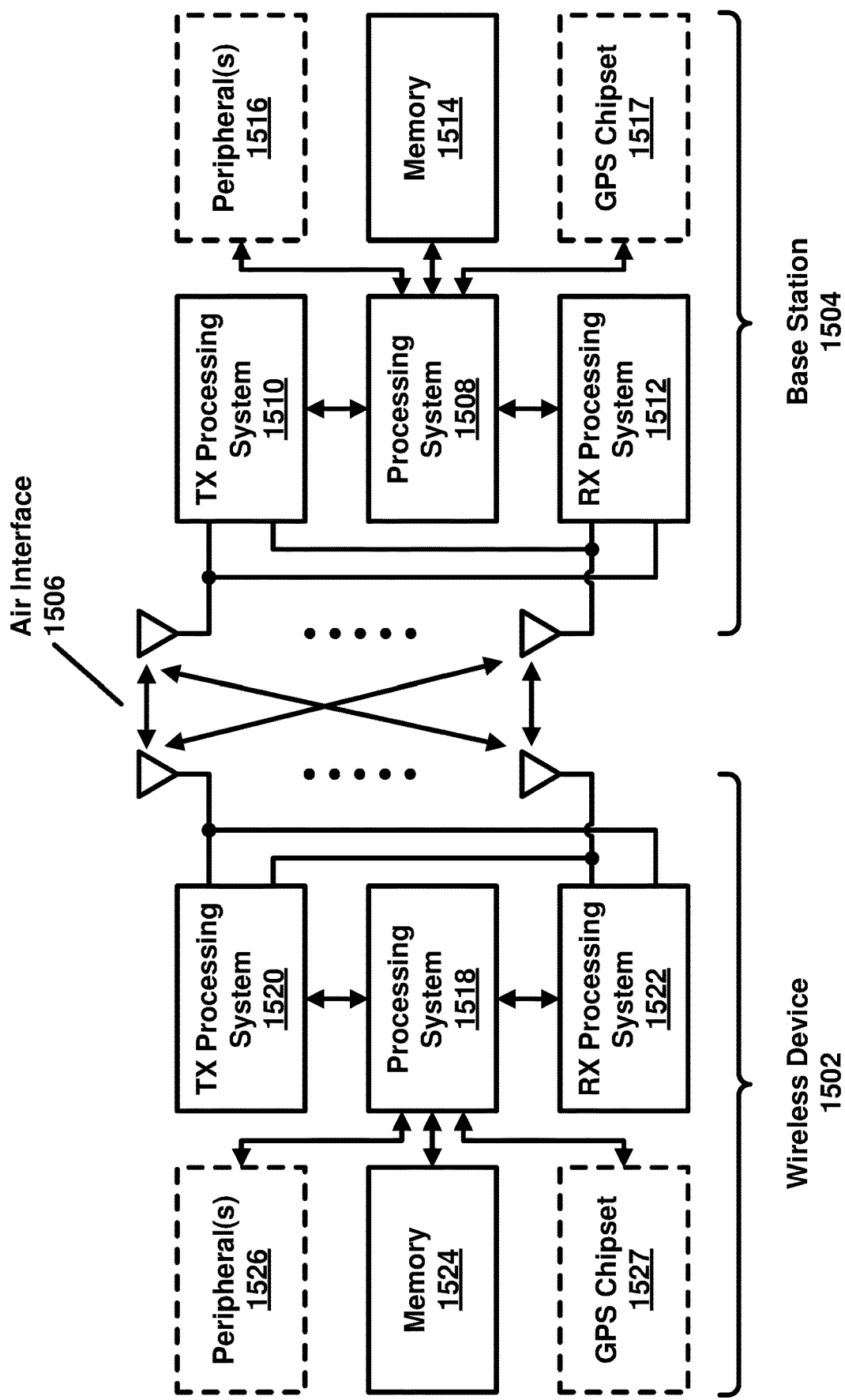
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of a base station may transmit one or more MAC CEs to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant." A wireless device may activate/deactivate an SCell in response to receiving an SCell Activation/Deactivation MAC CE.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP invalidity timer. When the BWP invalidity timer is configured for a serving cell, the base station and/or the wireless device may switch an active BWP to a default BWP in response to an expiry of the BWP invalidity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH. In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or power saving RNTI (PS-RNTI) and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding.

In an example, the wireless device may receive a C-RNTI (e.g., via one or mor previous transmissions) from a base station. For example, the one or more previous transmissions may comprise a Msg4 1314 or a MsgB 1332. If the wireless device is not provided a Type3-PDCCH CSS set or a USS set and it provided a Type1-PDCCH CSS set, the wireless device may monitor a set of PDCCH candidates for DCI format 0_0 and DCI format 1_0 with CRC scrambled by the C-RNTI in the Type1-PDCCH CSS set. For example, the wireless device may be provided one or more search space sets by corresponding one or more of searchSpaceZero, searchSpaceSIB1, searchSpaceOtherSystemInformation, pagingSearchSpace, ra-SearchSpace, and a C-RNTI, an MCS-C-RNTI, or a CS-RNTI. The wireless device may monitor a set of PDCCH candidates for DCI format 0_0 and DCI format 1_0 with CRC scrambled by the C-RNTI, the MCS-C-RNTI, or the CS-RNTI in the one or more search space sets in a slot where the wireless device monitors a set of PDCCH candidates for at least a DCI format 0_0 or a DCI format 1_0 with CRC scrambled by SI-RNTI, RA-RNTI, MSGB-RNTI, or P-RNTI.

FIG. 17 shows several DCI formats that may be used by a base station to transmit control information to a wireless device or used by the wireless device for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. In an example, DCI format 0_1 may be used to schedule one or multiple PUSCH in one cell or indicate CG-DFI (configured grant-Downlink Feedback Information) for configured grant PUSCH, etc.

In an example, a base station may transmit to a wireless device one or more RRC messages/parameters comprising one or more DRX configuration parameters (e.g., an IE DRX-Config). The one or more DRX configuration parameters may configure the wireless device with DRX operation. For example, the one or more DRX operation may indicate monitoring PDCCH for at least one RNTI. In an example, the one or more configuration parameters may indicate monitoring the PDCCH for the DRX operation. In an example, the one or more configuration parameters may indicate monitoring the PDCCH for the for at least one RNTI based on (or for) the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

For example, the wireless device may, based on the DRX operation being configured, may use the DRX operation while communicating with the base station in a serving cell. For example, a MAC entity (or the MAC layer) of the wireless device, based on the DRX operation being configured, may control the PDCCH monitoring activity of the MAC entity. For example, based on the DRX operation being configured, the wireless device may monitor the PDCCH for at least one RNTI.

In an example, the at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

In an example, the one or more DRX configuration parameters may comprise: drx-onDurationTimer indicating a duration at the beginning of a DRX cycle, drx-SlotOffset indicating a delay before starting the drx-onDurationTimer, drx-InactivityTimer indicating a duration after a PDCCH occasion in which the PDCCH indicates a new UL or DL transmission for the MAC entity, drx-RetransmissionTimerDL (per DL HARQ process except for the broadcast process) indicating a maximum duration until a DL retransmission is received, drx-RetransmissionTimerUL (per UL HARQ process) indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycle Timer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before an UL HARQ retransmission grant is expected by the MAC entity.

In an example, Serving Cells (e.g., the serving cell) of a MAC entity may be configured by RRC in two DRX groups with separate DRX parameters. When RRC does not configure a secondary DRX group, there may be only one DRX group and all Serving Cells (e.g., including the serving cell) may belong to that one DRX group. When two DRX groups are configured, each Serving Cell (e.g., the serving cell) is uniquely assigned (or belong) to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In an example, when the DRX operation is configured, the wireless device may determine whether the wireless device is in an active time for the serving cell (or Serving Cells) in a DRX group or not. For example, the wireless device may determine that the Active Time for the serving cell in the DRX group includes the time while: drx-onDurationTimer or drx-InactivityTimer configured for the DRX group is running, or drx-RetransmissionTimerDL or drx-RetransmissionTimerUL is running on any of the Serving Cells (including the serving cell) in the DRX group, or ra-ContentionResolutionTimer or msgB-ResponseWindow is running, or a scheduling request (SR) is sent on PUCCH and is pending; a PDCCH indicating a new transmission addressed to the C-RNTI of the MAC entity has not been received after successful reception of a RAR for the Random Access Preamble not selected by the MAC entity among the contention-based Random Access Preamble.

For example, the wireless device may evaluate at least one DRX Active Time conditions to determine whether the wireless device is in the active time for the serving cell in the DRX group or not. In an example, the at least one DRX Active Time condition may comprise one or more of the following: drx-onDurationTimer or drx-InactivityTimer configured for the DRX group is running, or drx-RetransmissionTimerDL or drx-RetransmissionTimerUL is running on any of the Serving Cells (including the serving cell) in the DRX group, or ra-ContentionResolutionTimer or msgB-ResponseWindow is running, or a scheduling request (SR) is sent on PUCCH and is pending; a PDCCH indicating a new transmission addressed to the C-RNTI of the MAC entity has not been received after successful reception of a RAR for the Random Access Preamble not selected by the MAC entity among the contention-based Random Access Preamble.

For example, when the DRX operation is configured, the wireless device may be in an on duration of the DRX operation (e.g., a DRX on duration) or an off duration of the DRX operation (e.g., a DRX off duration). For example, the DRX off duration may be a DRX inactive time. In an example, the DRX on duration may comprise the active time for the DRX operation in the serving cell. For example, in response to determining the drx-OnDurationTimer and/or the drx-InactivityTimer is running, the wireless device may be in the DRX on duration. In an example, the wireless device may determine whether it is in DRX on duration or not based on the at least one DRX Active Time condition.

In an example, when the DRX operation is configured, if a MAC PDU is received in a configured downlink assignment, the MAC entity of the wireless device may start the drx-HARQ-RTT-TimerDL for a corresponding HARQ process in a first symbol after the end of a corresponding transmission carrying a DL HARQ feedback and/or stop the drx-RetransmissionTimerDL for the corresponding HARQ process.

In an example, when the DRX operation is configured, if a MAC PDU is transmitted in a configured uplink grant and listen before talk (LBT) failure indication is not received from lower layers (e.g., the physical layer) of the wireless device, the MAC entity of the wireless device may start the drx-HARQ-RTT-TimerUL for the corresponding HARQ process in the first symbol after the end of the first transmission (e.g., within a bundle) of the corresponding PUSCH transmission and/or stop the drx-RetransmissionTimerUL for the corresponding HARQ process at the first transmission (within a bundle) of the corresponding PUSCH transmission.

In an example, when the DRX operation is configured, if the drx-HARQ-RTT-TimerDL expires and if the data of the corresponding HARQ process was not successfully decoded, the MAC entity of the wireless device may start the drx-RetransmissionTimerDL for the corresponding HARQ process in the first symbol after the expiry of drx-HARQ-RTT-TimerDL.

In an example, when the DRX operation is configured, if the drx-HARQ-RTT-TimerUL expires, the MAC entity of the wireless device may start the drx-RetransmissionTimerUL for the corresponding HARQ process in the first symbol after the expiry of drx-HARQ-RTT-TimerUL.

In an example, when the DRX operation is configured, if a DRX Command MAC CE or a Long DRX Command MAC CE is received, the MAC entity of the wireless device may stop the drx-onDurationTimer for each DRX group (e.g., the DRX group) and/or stop the drx-InactivityTimer for each DRX group (e.g., the DRX group).

In an example, when the DRX operation is configured, if the drx-Inactivity Timer for the DRX group expires, the MAC entity of the wireless device may start or restart the drx-ShortCycleTimer for the DRX group in the first symbol after the expiry of the drx-InactivityTimer and/or use the Short DRX cycle for the DRX group, if the Short DRX cycle is configured. If the drx-InactivityTimer for the DRX group expires, the MAC entity of the wireless device may use the Long DRX cycle for the DRX group, if the Short DRX cycle is not configured.

In an example, when the DRX operation is configured, if a DRX Command MAC CE is received, the MAC entity of the wireless device may start or restart the drx-ShortCycleTimer for each DRX group (including the DRX group) in the first symbol after the end of the DRX Command MAC CE reception and/or use the Short DRX cycle for each DRX group (including the DRX group), if the Short DRX cycle is configured. If the DRX Command MAC CE is received, the MAC entity of the wireless device may use the Long DRX cycle for the DRX group, if the Short DRX cycle is not configured.

In an example, when the DRX operation is configured, if the drx-ShortCycle Timer for the DRX group expires, the MAC entity of the wireless device may use the Long DRX cycle for the DRX group. If a Long DRX Command MAC CE is received, the MAC entity of the wireless device may stop the drx-ShortCycleTimer for each DRX group (including the DRX group) and/or use the Long DRX cycle for each DRX group (including the DRX group).

In an example, when the DRX operation is configured, if the Short DRX cycle is used for the DRX group, and [(SFN×10)+subframe number] modulo (drx-ShortCycle)= (drx-StartOffset) modulo (drx-ShortCycle), the MAC entity of the wireless device may start the drx-onDurationTimer for the DRX group after the drx-SlotOffset from the beginning of the subframe.

In an example, when the DRX operation is configured, if the DRX group is in the Active Time, the MAC entity of the wireless device may monitor the PDCCH on the Serving Cells (e.g., the serving cell) in the DRX group. If the PDCCH indicates a DL transmission, the MAC entity of the wireless device may start the drx-HARQ-RTT-TimerDL for the corresponding HARQ process in the first symbol after the end of the corresponding transmission carrying the DL HARQ feedback and/or stop the drx-RetransmissionTimerDL for the corresponding HARQ process. The MAC entity may start the drx-RetransmissionTimerDL in the first symbol after the PDSCH transmission for the corresponding HARQ process if the PDSCH-to-HARQ_feedback timing indicate a non-numerical kl value. When HARQ feedback is postponed by PDSCH-to-HARQ_feedback timing indicating a non-numerical kl value, the corresponding transmission opportunity to send the DL HARQ feedback is indicated in a later PDCCH requesting the HARQ-ACK feedback.

In an example, when the DRX operation is configured, if the DRX group is in the Active Time, the MAC entity of the wireless device may monitor the PDCCH on the Serving Cells (e.g., the serving cell) in the DRX group. If the PDCCH indicates a UL transmission, the MAC entity may start the drx-HARQ-RTT-TimerUL for the corresponding HARQ process in the first symbol after the end of the first transmission (within a bundle) of the corresponding PUSCH transmission and/or stop the drx-RetransmissionTimerUL for the corresponding HARQ process.

In an example, when the DRX operation is configured, if the DRX group is in the Active Time, the MAC entity of the wireless device may monitor the PDCCH on the Serving Cells (e.g., the serving cell) in the DRX group. If the PDCCH indicates a new transmission (DL or UL) on the serving cell in the DRX group, the MAC entity may start or restart the drx-InactivityTimer for the DRX group in the first symbol after the end of the PDCCH reception. If a HARQ process receives downlink feedback information and acknowledgement is indicated, the MAC entity may stop the drx-RetransmissionTimerUL for the corresponding HARQ process.

In an example, when DRX operation is configured, if the Short DRX cycle is used for the DRX group, and [(SFN×10)+subframe number] modulo (drx-ShortCycle)=(drx-StartOffset) modulo (drx-ShortCycle), the MAC entity of the wireless device may start drx-onDurationTimer for the DRX group after drx-SlotOffset from the beginning of the subframe.

In an example, the one or more RRC configuration parameters (e.g., via an IE DCP-Config-r16 in an IE PhysicalCellGroupConfig) may indicate the PS-RNTI for detecting a DCI format 2_6 (e.g., by ps-RNTI) in a PDCCH reception on the PCell or on the SpCell. For example, the DCI may be with/having CRC scrambled by the PS-RNTI (DCP). For example, the one or more DRX cofiguration parameters may indicate a number of search space sets (e.g., by dci-Format2-6) to monitor PDCCH for detection of DCI format 2_6 on the active DL BWP of the PCell or of the SpCell according to a common search space (CSS). For example, the one or more DRX configuration parameters may indicate a location in DCI format 2_6 of a wake-up indication bit by ps-PositionDCI-2-6.

For example, a second value for the wake-up indication bit, when reported from the physical layer to the higher layers (e.g., the MAC layer) of the wireless device, may indicate to not start the drx-onDurationTimer for the next long DRX cycle. In an example, when the wireless device receives the DCP comprising the wake-up indication bit being set to the second value, the wireless device may not start a drx-onDurationTimer associated with the DRX operation and/or skip monitoring PDCCH for the on duration of the DRX operation (or a DRX on duration). In an example, a first value for the wake-up indication bit, when reported to the higher layers of the wireless device, may indicate to start the drx-onDurationTimer for the next long DRX cycle. When the wireless device receives a DCP comprising the wake-up indication being set to the first value, the wireless device may start a drx-onDurationTimer (or the DRX switching to an on duration of the DRX operation) associated with the DRX operation and/or monitor PDCCH during the drx-onDurationTimer being running. When the drx-onDurationTimer expires (or the DRX switching to an off duration of the DRX operation), the wireless device may stop monitoring the PDCCH.

For example, on PDCCH monitoring occasions associated with a same long DRX Cycle, the wireless device may not expect to detect more than one DCI format 2_6 with different values of the wake-up indication bit for the wireless device. For example, the wireless device may not monitor PDCCH for detecting DCI format 2_6 during the active time, e.g., the active time for the serving cell in the DRX group.

In an example, the wireless device may be provided search space sets to monitor PDCCH for detection of the DCI format 2_6 in the active DL BWP of the PCell or of the SpCell. If the wireless device does not monitor PDCCH for detection of the DCI format 2_6 for one or more corresponding PDCCH monitoring occasions outside the active time prior to a next long DRX cycle or if the wireless device does not have any PDCCH monitoring occasions for detection of DCI format 2_6 outside the active time of the next long DRX cycle, the physical layer of the wireless device may report the second value for the wake-up indication bit to the higher layers (e.g., the MAC layer) of the wireless device for the next long DRX cycle.

In an example embodiment, when the DRX operation is configured, if the Long DRX cycle is used for the DRX group, and [(SFN×10)+subframe number] modulo (drx-LongCycle)=drx-StartOffset and if DCP monitoring is configured for the active DL BWP, the MAC entity of the wireless device may start drx-onDurationTimer after drx-SlotOffset from the beginning of the subframe, if DCP indication associated with the current DRX cycle received from lower layer indicated to start drx-onDurationTimer, or if all DCP occasion(s) in time domain, associated with the current DRX cycle occurred in the active time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running, or if ps-Wakeup is configured with value true and DCP indication associated with the current DRX cycle has not been received from lower layers.

In an example, when the DRX operation is configured, if the Long DRX cycle is used for a DRX group, and [(SFN×10)+subframe number] modulo (drx-LongCycle)=drx-StartOffset and if DCP monitoring is not configured for the active DL BWP, the MAC entity of the wireless device may start drx-onDurationTimer for the DRX group after drx-SlotOffset from the beginning of the subframe.

In an example, when the DRX operation is configured, if DCP monitoring is configured for the active DL BWP and if the current symbol n occurs within drx-onDurationTimer duration and if drx-onDurationTimer associated with the current DRX cycle is not started, if the MAC entity would not be in the active time considering grants/assignments/DRX Command MAC CE/Long DRX Command MAC CE received and SR sent until 4 ms prior to symbol n when evaluating one or more DRX Active Time conditions (e.g., all DRX Active Time conditions): the MAC entity shall not transmit periodic SRS and semi-persistent SRS, not report semi-persistent CSI configured on PUSCH, not report periodic CSI that is L1-RSRP on PUCCH if ps-TransmitPeriodicL1-RSRP is not configured with value true, not report periodic CSI that is not L1-RSRP on PUCCH if ps-TransmitOtherPeriodicCSI is not configured with value true.

In an example, when the DRX operation is configured, if DCP monitoring is not configured for the active DL BWP, and/or if the current symbol n occurs not within drx-onDurationTimer duration, and/or if drx-onDurationTimer associated with the current DRX cycle is started, in current symbol n, if a DRX group would not be in the active time considering grants/assignments scheduled on Serving Cell(s) in this DRX group and DRX Command MAC CE/Long DRX Command MAC CE received and Scheduling Request sent until 4 ms prior to symbol n when evaluating the at least one DRX Active Time condition: the MAC entity shall not transmit periodic SRS and semi-persistent SRS in this DRX group, not report CSI on PUCCH and semi-persistent CSI configured on PUSCH in this DRX group, not report CSI on PUCCH in this DRX group if CSI masking (csi-Mask) is setup by upper layers and in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating the at least one DRX Active Time condition.

In an example, regardless of whether the MAC entity is monitoring PDCCH or not on the Serving Cells (e.g., the serving cell) in the DRX group, the MAC entity may transmit HARQ feedback, aperiodic CSI on PUSCH, and aperiodic SRS on the Serving Cells (e.g., the serving cell) in the DRX group when such is expected. The MAC entity needs not to monitor the PDCCH if it is not a complete PDCCH occasion (e.g. the Active Time starts or ends in the middle of a PDCCH occasion).

In an example, a wireless device may support a baseline processing time/capability. Some wireless devices may support additional aggressive/faster processing time/capability. In an example, the wireless device may report to a base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance) comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}=(N_1+d_{1,1}+d_2)(2048+144).a_1$ after the end of the last symbol of the PDSCH. In an example, parameter $a_1$ may depend on a numerology µ. The time gap may be given by the wireless device PDSCH processing capability in the corresponding frequency band. In an example, $d_{1,1}$ may at least depend on the PDSCH mapping (e.g., a mapping type A or mapping type B) and the length of the PDSCH (in the number of symbols). In an example, the wireless device may set $d_2=0$.

FIG. 18 shows example PDSCH processing times. Table 1 shows PDSCH decoding time (N1) in number of symbols for a first PDSCH processing capability and for different numerologies. Table 2 shows PDSCH decoding time in number of symbols for a second PDSCH processing capability and for different numerologies. As shown in FIG. 18, for PDSCH processing capability 1, PDSCH decoding time $N_1$ is more than 14 OFDM symbols if SCS is higher than 60 kHz (µ=2). Even for PDSCH processing capability 2, PDSCH decoding time $N_1$ is 9 OFDM symbols for 60 kHz SCS. The PDSCH decoding time, $N_1$, for 480 kHz and 960 kHz SCS may be more than 14 OFDM symbols (1 slot). In an example, parameter $N_1$ may be based on µ for the wireless device with processing capability 1 and 2 respectively, where µ may correspond to the one of ($µ_{PDCCH}$, $µ_{PDSCH}$, $µ_{UL}$). For example, the $µ_{PDCCH}$ corresponds to the subcarrier spacing of the PDCCH scheduling the PDSCH, the $µ_{PDSCH}$ corresponds to the subcarrier spacing of the scheduled PDSCH, and $µ_{UL}$ corresponds to the subcarrier spacing of the uplink channel with which a HARQ-ACK is to be transmitted.

In an example, a PUSCH preparation/processing time may be considered for determining the transmission time of an UL data. For example, if the first uplink symbol in the PUSCH allocation for a transport block (including the DM-RS) may not be no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}=\max((N_2+d_{2,1}+d_2)(2048+144).a_1, d_{2,2})$ after the end of the reception of the last symbol of the PDCCH carrying the DCI scheduling the PUSCH. If the first symbol of the PUSCH allocation consists of DM-RS only, the wireless device may set $d_{2,1}=0$, otherwise $d_{2,1}=1$. In an example, parameter $a_1$ may depend on a numerology p.

FIG. 19 shows examples of PUSCH preparation/processing time. Table 3 in FIG. 19 shows example PUSCH preparation/processing time in number of slots ($N_2$) for a wireless device with PUSCH timing capability 1. Table 4 in FIG. 19 shows example PUSCH preparation/processing time in number of slots ($N_2$) for a wireless device with PUSCH timing capability 2. As FIG. 19 shows $N_2$ may depend on the numerology µ. In an example, the numerology µ may correspond to the subcarrier spacing of the downlink with which a PDCCH carrying a DCI scheduling a PUSCH is transmitted. In another example, the numerology µ may correspond to the subcarrier spacing of the uplink channel with which the PUSCH is to be transmitted.

In an example, a plurality of slot format combinations of a cell (e.g., slot format combination 0, slot format combination 1, slot format combination 2, slot format combination 3, . . . , and slot format combination m) may be configured to a wireless device via RRC messages. In an example, a slot format combination may be indicated to a wireless device via downlink control channel (e.g., via a PDCCH) and/or a group common PDCCH (GC-PDCCH). In an example, a slot format may be identified by a corresponding format index. In an example, each symbol in the slot may be a downlink ('D') symbol), wherein downlink reception is allowed; an uplink ('U') symbol), wherein uplink transmission is allowed; and/or a flexible ('F') symbol, wherein the slot format/direction is determined by other signaling, e.g., DCI format 2_0 and/or UL/DL grants. For example, the network may assign a symbol with 'F' for a wireless device not to transmit to or receive from a base station for interference control and/or power saving. For example, the network may use a slot format 'F' on one or more symbols to selectively initiate/trigger random access (RA) for a particular wireless device. Other wireless devices may not be allowed to transmit or receive on the one or more symbols, resulting in reduced interference for the wireless device.

A wireless device may be configured by higher layers with a parameter indicating one or more slot formats (e.g., SlotFormatIndicator). In an example, a DCI (e.g., DCI format 2_0) may be used for notifying the one or more slot formats. An SFI-index field value in the DCI format 2_0 may indicate to a wireless device a slot format for each of one or more slots in a number of slots for each DL BWP and/or each UL BWP starting from a slot where the wireless device detects the DCI. The DCI format may comprise CRC bits scrambled by a SFI-RNTI. The DCI format may comprise at least one information of one or more slot format indicators (SFIs). The wireless device may be configured to monitor a group-common-PDCCH for the one or more slot format indicators for each one of one or more serving cells configured by the parameters indicating the one or more slot formats. For each serving cell, the wireless device may be provided at least one of: an identity of the serving cell; a location of an SFI-index field in the DCI; and/or a set of slot format combinations comprising one or more slot format combinations (e.g., slotFormatCombinations), where each of the one or more slot format combinations may comprise: one or more slot formats (e.g., slotFormats) for the slot format combination; a mapping for the slot format to a corresponding SFI-index field value in the DCI (e.g., slotFormatCombinationId); and/or at least one reference SCS configuration.

In an example, for each serving cell, the one or more RRC configuration messages may comprise a common RRC configuration message (e.g., TDD-UL-DL-ConfigCommon) comprising one or more parameters that indicate to the wireless device to set the slot format of each slot of a number of one or more consecutive slots. For example, the common RRC configuration message may comprise at least one of: a reference subcarrier spacing (SCS) $\mu_{ref}$; and/or at least one pattern. A first pattern of the at least one pattern may comprise at least one of: a slot configuration period of P msec; a number of slots $d_{slots}$ with only downlink symbols; a number of downlink symbols $d_{sym}$; a number of slots $u_{slots}$ with only uplink symbols; a number of uplink symbols $u_{sym}$. The slot configuration period of P msec may comprise $S=P.2^{\mu_{ref}}$ slots with SCS configuration $\mu_{ref}$. From the S slots, a first $d_{slots}$ slots may comprise one or more downlink symbols and a last $u_{slots}$ slots may comprise one or more uplink symbols. A $d_{sym}$ symbols after the first $d_{slots}$ slots may comprise one or more downlink symbols. A $u_{sym}$ symbols before the last $u_{slots}$ slots may comprise one or more uplink symbols. A remaining $(S-d_{slots}-u_{slots}) \cdot N_{symb}^{slot}-d_{sym}-u_{sym}$ symbols may comprise one or more flexible symbols. A second pattern of the at least one or more patterns may be configured. The wireless device may set the slot format of each slot of a first number of slots as indicated by the first pattern and may set the slot format of each slot of a second number of slots as indicated by the second pattern.

In an example, the one or more RRC configuration messages a dedicated RRC configuration message (e.g., TDD-UL-DL-Configdedicated) comprising one or more parameters that may overwrite one or more flexible symbols of each slot of a number of slots configured by the common RRC configuration message (e.g., TDD-UL-DL-ConfigCommon). For example, the dedicated RRC configuration message may comprise at least one of: one or more slot configurations; and/or for each slot configuration of the one or more slot configurations: a slot index for a slot (e.g., slotIndex); one or more symbols of a slot (e.g., symbols) which indicates a first number of zero or more downlink first symbols in the slot, and a second number of zero or more uplink last symbols in the slot, and a remaining number of zero or more flexible symbols in the slot. The wireless device may determine a slot format for each slot with a corresponding slot index of the slot with index slotIndex based on a format indicated by the one or more symbols of the slot (symbols). In an example, for each slot configuration of one or more slot configurations indicated by the dedicated RRC configuration message, a reference SCS is the reference SCS indicated by the common RRC configuration message. A slot configuration period and a number of downlink/uplink/flexible symbols in each slot of the one or more slot configuration period may be determined from the common/dedicated RRC configuration messages and may be common to each one of one or more configured BWPs.

A slot format determination procedure may be defined for the wireless device. The wireless device may determine a slot format of one or more symbols based on a priority between a first slot format indicated by the one or more RRC configuration messages (e.g., TDD-UL-DL-ConfigCommon and/or TDD-UL-DL-ConfigDedicated) and a second slot format indicated by a DCI (e.g., DCI format 2_0), if detected. Whether the UL/DL grant is configured by higher layer or dynamically indicated by DCI, may be used by the wireless device to determine the slot format.

In an example, the one or more RRC configuration messages may not comprise the common RRC configuration message and/or the dedicated RRC configuration message. The wireless device may receive a DCI (e.g., DCI format 1_0, DCI format 1_1, DCI format 0_1, DCI format 0_0, and/or DCI format 2_3), scheduling downlink/uplink transmissions. In an example, a DCI (e.g., DCI format 1_0, DCI format 1_1, and/or DCI format 0_1) or an RRC message (e.g., SIB1) may indicate to the wireless device a reception of one or more downlink channels/signals e.g., PDSCH, PDCCH, SSB, downlink positioning reference signal (DL PRS) and/or CSI-RS in one or more symbols of a slot. The wireless device may receive the one or more downlink channels/signals in the one or more symbols of the slot. In an example, the wireless device may receive a DCI (e.g., DCI format 1_0, DCI format 1_1, DCI format 0_0, DCI format 2_3, and/or DCI format 0_1) indicating a transmission of one or more uplink channels/signals (e.g., PUSCH, PUCCH, PRACH, and/or SRS) in one or more symbols of a slot. The wireless device may transmit the one or more uplink channels/signals in the one or more symbols of the slot. In an example, the wireless device may receive an RAR message 1312/1322/1332 (e.g., in response to and/or after transmitting Msg1 1311/1321 or MsgA 1331) indicating an UL grant for transmission of one or more uplink channels/signals (e.g., PUSCH) in one or more symbols of a slot. The wireless device may transmit the one or more uplink channels/signals in the one or more symbols of the slot. In another example, the wireless device may receive a fallbackRAR message 1332 (e.g., in response to and/or after transmitting MsgA 1331) indicating an UL grant for transmission of one or more uplink channels/signals (e.g., PUSCH) in one or more symbols of a slot. The wireless device may transmit the one or more uplink channels/signals in the one or more symbols of the slot. In another example, the wireless device may receive a successRAR message 1332 (e.g., in response to and/or after transmitting MsgA 1331) indicating the transmission of one or more uplink channels/signals (e.g., PUCCH) in one or more symbols of a slot. The wireless device may transmit the one or more uplink channels/signals in the one or more symbols of the slot.

In an example, a wireless device may be configured by higher layers (e.g., the MAC layer) to receive a downlink channel/signal (e.g., PDCCH, a PDSCH, a DL PRS, and/or a CSI-RS) in one or more symbols of a slot. The wireless device may receive the PDCCH, PDSCH, DL PRS, and/or CSI-RS, for example, if the wireless device does not detect a DCI (e.g., DCI format 0_0, DCI format 0_1, DCI format 1_0, DCI format 1_1, and/or DCI format 2_3) indicating to the wireless device to transmit an uplink channel/signal (e.g., PUSCH, a PUCCH, a PRACH, and/or a SRS) in at least one symbol of the one or more symbols of the slot. The wireless device may not receive the downlink channel/signal, for example, if the wireless device detects a DCI (e.g., DCI format 0_0, DCI format 0_1, DCI format 1_0, DCI format 1_1, and/or DCI format 2_3) indicating to the wireless device to transmit the uplink channel/signal in the at least one symbol of the one or more symbols of the slot.

In an example, for one or more symbols of a slot, a wireless device may not expect to detect a first DCI (e.g., DCI format 2_0) with an SFI-index field value indicating the one or more symbols of the slot as uplink and to detect a second DCI (e.g., DCI format 1_0, a DCI format 1_1, or DCI format 0_1) indicating to the wireless device to receive PDSCH or CSI-RS in the one or more symbols of the slot. In another example, for one or more symbols of a slot, the wireless device may not expect to detect the first DCI with an SFI-index field value indicating the one or more symbols in the slot as downlink and to detect a third DCI (e.g., DCI format 0_0, DCI format 0_1, DCI format 1_0, DCI format 1_1, DCI format 2_3), a RAR UL grant, a fallbackRAR UL grant, or a successRAR indicating to the wireless device to transmit an uplink channel/signal (e.g., PUSCH, PUCCH, PRACH, or SRS) in the one or more symbols of the slot.

In an example, for one or more symbols of a slot that are indicated to a wireless device as uplink by the one or more RRC configuration messages (e.g., tdd-UL-DL-ConfigurationCommon and/or tdd-UL-DL-ConfigurationDedicated), the wireless device may not receive a downlink channel/signal (e.g., PDCCH, PDSCH, or CSI-RS) in the one or more symbols of the slot when the downlink channel/signal overlaps, even partially, with the one or more symbols of the slot. According to an example, for a set of symbols of a slot that are indicated to a UE as uplink by tdd-UL-DL-ConfigurationCommon, and/or tdd-UL-DL-ConfigurationDedicated, the wireless device may not receive DL PRS in the set of symbols of the slot, if the wireless device is not provided with a measurement gap. According to an example, the wireless device may receive the DL PRS in the set of symbols of the slot, if the wireless device is provided with a measurement gap.

In an example, for one or more symbols of the slot that are indicated to the wireless device as downlink by the one or more RRC configuration messages (e.g., tdd-UL-DL-ConfigurationCommon and/or tdd-UL-DL-ConfigurationDedicated), the wireless device may not transmit an uplink channel/signal (e.g., PUSCH, PUCCH, PRACH, and/or SRS) in the one or more symbols of the slot when the uplink channel/signal overlaps, even partially, with the one or more symbols of the slot. In an example, for the one or more symbols of the slot that are indicated to the wireless device as flexible by the one or more RRC configuration messages (common and/or dedicated), the wireless device may not receive both dedicated configuring transmission from the wireless device in the one or more symbols of the slot and dedicated configuring reception by the wireless device in the one or more symbols of the slot.

In an example, for operation on a single carrier in unpaired spectrum, for one or more symbols of a slot indicated to a wireless device by the one or more RRC messages/parameters (e.g., ssb-PositionsInBurst in SIB1 or ssb-PositionsInBurst in ServingCellConfigCommon) for reception of SS/PBCH blocks, the wireless device may not transmit an uplink channel/signal (e.g., PUSCH, PUCCH, and/or PRACH) in the slot if a transmission overlaps with at least one symbol from the one or more symbols. In another example, for one or more symbols of a slot indicated to the wireless device by the one or more RRC configuration parameters for reception of SS/PBCH blocks the wireless device may not transmit SRS in the one or more symbols of the slot. In another example, for one or more symbols of a slot indicated to the wireless device by the one or more RRC configuration parameters for reception of SS/PBCH blocks, the wireless device may not expect the one or more symbols of the slot to be indicated as uplink by the one or more RRC configuration messages/parameters (e.g., tdd-UL-DL-ConfigurationCommon or tdd-UL-DL-ConfigurationDedicated) when provided to the wireless device.

In an example, for one or more symbols of a slot corresponding to a valid PRACH occasion and N_gap symbols before the valid PRACH occasion, the wireless device may not receive a downlink channel/signal (e.g., PDCCH, PDSCH, or CSI-RS) in the slot if a reception overlaps with any symbol from the one or more symbols. The UE does not expect the one or more symbols of the slot to be indicated as downlink by tdd-UL-DL-ConfigurationCommon or tdd-UL-DL-ConfigurationDedicated.

In an example, if a wireless device is scheduled by a first DCI (e.g., DCI format 1_1) to receive PDSCH over a plurality of slots, and if the one or more RRC configuration parameters (e.g., tdd-UL-DL-ConfigurationCommon and/or tdd-UL-DL-ConfigurationDedicated) indicate that, for a slot in the plurality of slots, at least one symbol from one or more symbols where the wireless device is scheduled PDSCH reception in the slot is an uplink symbol, the wireless device may not receive the PDSCH in the slot. In another example, if the wireless device is scheduled by a second DCI (e.g., DCI format 0_1) to transmit PUSCH over plurality of slots, and if the one or more RRC configuration parameters indicate that, for a slot from the plurality of slots, at least one symbol from one or more symbols where the wireless device is scheduled PUSCH transmission in the slot is a downlink symbol, the wireless device may not transmit the PUSCH in the slot. According to an example, for one or more symbols of a slot indicated to a wireless device by pdcch-ConfigSIB1 in MIB for a CORESET for Type0-PDCCH CSS set, the wireless device may not expect the one or more symbols to be indicated as uplink by the one or more RRC configuration parameters.

For one or more symbols of a slot that are indicated as downlink/uplink by the one or more RRC configuration messages (e.g., TDD-UL-DL-ConfigurationCommon or TDD-UL-DL-ConfigDedicated), the wireless device may not detect a DCI (e.g., DCI format 2_0) with an SFI-index field value indicating the one or more symbols of the slot as uplink/downlink, respectively, or as flexible. In an example, for one or more symbols of a slot indicated to a wireless device by the one or more RRC configuration messages (e.g., ssb-PositionsInBurst in ssb-PositionsInBurst) for reception of SS/PBCH blocks, the wireless device may not detect the DCI (e.g., DCI format 2_0) with an SFI-index field value indicating the one or more symbols of the slot as uplink. In another example, for one or more symbols of a slot indicated to a wireless device by the one or more RRC configuration messages (e.g., prach-ConfigurationIndex in RACH-ConfigCommon) for PRACH transmissions, the wireless device may not detect the DCI (e.g., DCI format 2_0) with an SFI-index field value indicating the one or more symbols of the slot as downlink. In an example, for one or more symbols of a slot indicated to a wireless device by RRC messages (e.g., pdcch-ConfigSIB1 in MIB) for a CORESET for Type0-PDCCH CSS set, the wireless device may not detect the DCI (e.g., DCI format 2_0) with an SFI-index field value indicating the one or more symbols of the slot as uplink.

For one or more symbols of a slot indicated to a wireless device as flexible by the one or more RRC configuration messages (e.g., TDD-UL-DL-ConfigurationCommon and TDD-UL-DL-ConfigDedicated), or when the common RRC configuration parameters TDD-UL-DL-ConfigurationCommon and the dedicated RRC configuration parameters TDD-UL-DL-ConfigDedicated are not provided to the wireless device, the wireless device may detect a DCI (e.g., DCI format 2_0) providing a format for the slot. If at least one symbol of the one or more symbols is a symbol in a CORESET is configured to the wireless device for PDCCH monitoring, the wireless device may receive PDCCH in the CORESET only if an SFI-index field value in the DCI indicates that the at least one symbol is a downlink symbol.

In an example, for one or more symbols of a slot indicated to a wireless device as flexible by the one or more RRC configuration messages (e.g., TDD-UL-DL-Configuration-Common and TDD-UL-DL-ConfigDedicated), or when the common RRC configuration parameters TDD-UL-DL-ConfigurationCommon and the dedicated RRC configuration parameters TDD-UL-DL-ConfigDedicated are not provided to the wireless device, the wireless device may detect a DCI (e.g., DCI format 2_0) providing a format for the slot. If the SFI-index field value in the DCI indicates the one or more symbols of the slot as flexible and the wireless device detects a second DCI format (e.g., DCI format 1_0, DCI format 1_1, or DCI format 0_1) indicating to the wireless device to receive downlink channel/signal (e.g., PDSCH or CSI-RS) in the one or more symbols of the slot, the wireless device may receive the downlink channel/signal in the one or more symbols of the slot.

According to an example, for one or more symbols of a slot indicated to a wireless device as flexible by the one or more RRC configuration messages (e.g., TDD-UL-DL-ConfigurationCommon and TDD-UL-DL-ConfigDedicated), or when the common RRC configuration parameters TDD-UL-DL-ConfigurationCommon and the dedicated RRC configuration parameters TDD-UL-DL-ConfigDedicated are not provided to the wireless device, the wireless device may detect a DCI (e.g., DCI format 2_0) providing a format for the slot. If the SFI-index field value in the DCI indicates the one or more symbols of the slot as flexible, and the wireless device does not detect a DCI (e.g., DCI format 1_0, DCI format 1_1, or DCI format 0_1) indicating to the wireless device to receive a downlink channel/signal (e.g., PDSCH or CSI-RS), the wireless device may not receive the downlink channel/signal in the one or more symbols of the slot. In an example, if the SFI-index field value in the DCI format indicates the one or more symbols of the slot as flexible and the wireless device detects a DCI (e.g., DCI format 0_0, DCI format 0_1, DCI format 1_0, DCI format 1_1, DCI format 2_3), or a RAR UL grant, or a fallbackRAR UL grant, or a successRAR indicating to the wireless device to transmit an uplink channel/signal (e.g., PUSCH, PUCCH, PRACH, or SRS) in the one or more symbols of the slot, the wireless device may transmit the uplink channel/signal in the one or more symbols of the slot. In an example, the wireless device may not detect an SFI-index field value in a first DCI indicating the one or more symbols of the slot as downlink and also detect a second DCI (e.g., DCI format 0_0, DCI format 0_1, DCI format 1_0, DCI format 1_1, DCI format 2_3), or a RAR UL grant, or a fallbackRAR UL grant, or a successRAR indicating to the wireless device to transmit an uplink channel/signal (e.g., SRS, PUSCH, PUCCH, or PRACH) in at least one symbol of the one or more symbols of the slot.

In an example, for one or more symbols of a slot indicated to a wireless device as flexible by the one or more RRC configuration messages (e.g., TDD-UL-DL-Configuration-Common and TDD-UL-DL-ConfigDedicated), or when the common RRC configuration parameters TDD-UL-DL-ConfigurationCommon and the dedicated RRC configuration parameters TDD-UL-DL-ConfigDedicated are not provided to the wireless device, the wireless device may detect a DCI (e.g., DCI format 2_0) providing a format for the slot. If the wireless device is configured by higher layers to receive a downlink channel/signal (e.g., PDSCH or CSI-RS) in the one or more symbols of the slot, the wireless device may receive the downlink channel/signal in the one or more symbols of the slot only if an SFI-index field value in the DCI indicates the one or more symbols of the slot as downlink. In an example, if the wireless device is configured by higher layers to receive DL PRS in the one or more symbols of the slot, the wireless device may receive the DL PRS in the one or more symbols of the slot only if an SFI-index field value in the DCI format 2_0 indicates the set of symbols of the slot as downlink or flexible. According to an example, if the wireless device is configured by higher layers to transmit an uplink channel/signal (e.g., PUCCH, or PUSCH, or PRACH) in the one or more symbols of the slot, the wireless device transmits the uplink channel/signal in the slot only if an SFI-index field value in the DCI format indicates the one or more symbols of the slot as uplink. In an example, if the wireless device is configured by higher layers to transmit an SRS in the one or more symbols of the slot, the wireless device transmits the SRS only in a subset of symbols from the one or more symbols of the slot indicated as uplink symbols by an SFI-index field value in the DCI format.

In an example, for one or more symbols of a slot indicated to a wireless device as flexible by the one or more RRC configuration messages (e.g., TDD-UL-DL-ConfigurationCommon and TDD-UL-DL-ConfigDedicated), or when the common RRC configuration parameters TDD-UL-DL-ConfigurationCommon and the dedicated RRC configuration parameters TDD-UL-DL-ConfigDedicated are not provided to the wireless device, the wireless device may detect a DCI (e.g., DCI format 2_0) providing a format for the slot. The wireless device may not expect to detect an SFI-index field value in the DCI indicating the one or more symbols of the slot as downlink or flexible if the one or more symbols of the slot includes at least one symbol corresponding to any repetition of a PUSCH transmission activated by an UL Type 2 grant PDCCH. In another example, a wireless device may not expect to detect an SFI-index field value in the DCI indicating the one or more symbols of the slot as uplink and detect a second DCI (e.g., DCI format 1_0 or DCI format 1_1 or DCI format 0_1) indicating to the wireless device to receive a downlink channel/signal (e.g., PDSCH or CSI-RS) in at least one symbol of the one or more symbols of the slot.

In an example, if a wireless device is configured by higher layers to receive a downlink channel/signal (e.g., CSI-RS or PDSCH) in one or more symbols of a slot and the wireless device detects a DCI (e.g., DCI format 2_0) with a slot format value that indicates a slot format with a subset of symbols from the one or more symbols as uplink or flexible, the wireless device may cancel the downlink channel/signal reception in the one or more symbols of the slot. According to an example, if the wireless device is configured by higher layers to receive the downlink channel/signal in one or more symbols of a slot and the wireless device detects a second DCI (e.g., DCI format 0_0, DCI format 0_1, DCI format 1_0, DCI format 1_1, or DCI format 2_3) indicating to the wireless device to transmit an uplink channel/signal (e.g., PUSCH, PUCCH, SRS, or PRACH) in at least one symbol in the one or more symbols, the wireless device may cancel the downlink channel/signal reception in the one or more symbols of the slot. In another example, if the wireless device is configured by higher layers to receive a DL PRS in a set of symbols of a slot and the wireless device detects a DCI format 2_0 with a slot format value (e.g., other than 255) that indicates a slot format with a subset of symbols from the set of symbols as uplink, or the wireless device detects the second DCI indicating to the wireless device to transmit the uplink channel/signal in at least one symbol in the set of the symbols, the wireless device may cancel the DL PRS reception in the set of symbols of the slot.

In an example, for one or more symbols of a slot that are indicated as flexible by the one or more RRC configuration messages (e.g., TDD-UL-DL-ConfigurationCommon or TDD-UL-DL-ConfigDedicated), or when the common RRC configuration messages TDD-UL-DL-ConfigurationCommon and/or the dedicated RRC configuration TDD-UL-DL-ConfigDedicated are not provided to a wireless device, the wireless device may not detect a DCI (e.g., DCI format 2_0) providing a slot format for the slot. The wireless device may receive a downlink channel/signal (e.g., PDSCH or CSI-RS) in the one or more symbols of the slot if the wireless device receives a corresponding indication by a DCI (e.g., DCI format 1_0, DCI format 1_1, or DCI format 0_1). In another example, if the wireless device is configured by higher layers to receive the downlink channel/signal in the one or more symbols of the slot, the wireless device may not receive the downlink channel/signal in the one or more symbols of the slot. For example, if the wireless device is configured by higher layers to receive DL PRS in the one or more symbols of the slot, the wireless device may receive the DL PRS. In another example, the wireless device may transmit an uplink channel/signal (e.g., PUSCH, PUCCH, PRACH, or SRS) in the one or more symbols of the slot if the wireless device receives a corresponding indication by a DCI (e.g., DCI format 0_0, DCI format 0_1, DCI format 1_0, DCI format 1_1, or DCI format 2_3).

Prior to initiation of a random access (RA) procedure, a base station may transmit one or more RRC configuration messages/parameters comprising one or more RACH configuration parameters 1310/1320/1330. For example, the one or more RACH configuration parameters may configure a wireless device with one or more parameters of RACH configuration. The one or more RACH configuration parameters may comprise first RACH configuration parameters (e.g., in a RA-ConfigCommon IE) of the RA procedure for a first RA type (e.g., a 4-step RA type) and second RACH configuration parameters (e.g., in a RA-ConfigCommonTwoStepRA-r16 IE) of the RA procedure for a second RA type (e.g., a 2-step RA type). In an example, the one or more RACH configuration parameters may further comprise a third RACH configuration parameters (e.g., MsgA-PUSCH-Config IE) of PUSCH resources for MsgA 1331 transmission for the 2-step RA type.

In an example, the first RACH configuration parameters may comprise generic configuration parameters (e.g., in RACH-ConfigGeneric IE), a total number of preambles for the RA procedure (e.g., preambleTransMax), an indication of association between PRACH occasion/resource (RO) and SSB (e.g., ssb-perRACH-OccasionAndCB-PreamblesPerSSB), one or more configuration parameters (e.g., TB size threshold for preamble Group B selection, pathloss/RSRP threshold for preamble Group B selection, number of preambles per SSB available in preamble group B) of preamble Group B, a contention resolution timer value (e.g., ra-ContentionResolutionTimer) for a contention resolution timer, a first RSRP threshold (e.g., rsrp-ThresholdSSB) for selection of SS block and corresponding RO, a second RSRP threshold (e.g., rsrp-ThresholdSSB-SUL) for selection of a SUL or a NUL for the RA procedure, an indication of PRACH root sequence index (e.g., prach-RootSequenceIndex), and one or more other parameters.

In an example, the second RACH configuration parameters may comprise generic configuration parameters (e.g., in RACH-ConfigGenericTwoStepRA IE), a total number of preambles for the RA procedure (e.g., msgA-TransMax), an indication of association between RO and SSB (e.g., msgA-SSB-PerRACH-OccasionAndCB-PreamblesPerSSB), one or more configuration parameters (e.g., in GroupB-ConfiguredTwoStepRA) of preamble Group B, a contention resolution timer value (e.g., ra-ContentionResolutionTimer) for a contention resolution timer, an indication of PRACH root sequence index (e.g., prach-RootSequenceIndex), and one or more other parameters.

According to an example, a cell specific random access configuration message (e.g., RACH-ConfigCommon and/or RACH-ConfigGeneric) may further comprise, among other parameters, at least one of following: one or more PRACH configuration indexes (e.g., prach-ConfigurationIndex), a number of ROs that may be multiplexed in frequency domain (FDMed) in a time instance (e.g., msg1-FDM), an offset of a lowest RO in frequency domain with respect to a first resource block (e.g., msg1-FrequencyStart), a power ramping step for preamble transmission (e.g., powerRampingStep), a target power level at the network receiver side (preambleReceivedTargetPower), a maximum number of random access preamble transmission that may be performed (e.g., preambleTransMax), and a window length for a random access response (i.e., RAR, e.g., Msg2) (e.g., ra-ResponseWindow). In an example, one or more PRACH configuration indexes (e.g., prach-ConfigurationIndex), may indicate, among other things, a preamble format, a periodicity for one or more PRACH time resources, one or more PRACH subframe numbers, a number of PRACH slots within the one or more PRACH subframes, a PRACH starting symbol number, and a number of time domain ROs within first PRACH slot. A preamble may be transmitted using a selected RO (e.g., PRACH format with a PRACH transmission power on an indicated PRACH resource). For example, the selected RO may need to be valid. In an example, a time gap between the selected RO and an uplink occasion/resource may be considered to ensure the validity of the selected RO. For example, for single cell operation or for operation with carrier aggregation in a same frequency band, a wireless device may not transmit the preamble and PUSCH/PUCCH/SRS in a same slot or when a gap between the first or last symbol of the preamble in a first slot is separated by less than M_gap symbols from the last or first symbol, respectively, of a PUSCH/PUCCH/SRS transmission in a second slot. For numerologies of $\mu=1$ and $\mu=2$, the value of M_gap may be 2. For numerologies of $\mu=3$ and $\mu=4$, the value of M_gap may be 4.

For example, a dedicated random access configuration message (e.g., RACH-ConfigDedicated) may comprise, among other parameters, one or more ROs for contention-free random access (e.g., occasions), and one or more PRACH mask index for random access resource selection (e.g., ra-ssb-OccasionMaskIndex).

A wireless device may be provided a number N of SSBs associated with one RO and a number R of CB preambles per SSB per valid RO (e.g., by ssb-perRACH-OccasionAndCB-PreamblesPerSSB). In an example, when N<1, one SSB may be mapped to 1/N consecutive valid ROs and R CB preambles with consecutive indexes associated with the SSB per valid RO start from preamble index 0. In another example, when N is larger or equal to 1 (N>=1), R CB preambles with consecutive indexes associated with SSB n, n=0, 1, . . . , N−1, per valid RO start from preamble index $nN_{preamble}^{total}/N$ where $N_{preamble}^{total}$ is provided by totalNumberOfRA-Preambles (or by msgA-TotalNumberOfRA-Preambles for 2-step RA procedure with separate configuration of ROs from a 4-step RA procedure).

The base station may further indicate/configure an association period for mapping one or more SS/PBCH blocks to one or more ROs. The association period, starting from frame 0, for mapping SS/PBCH block indexes to PRACH occasions may be determined by the PRACH configuration period. In an example, the mapping of SS/PBCH block indexes to ROs may be carried out such that a number of SS/PBCH block indexes (e.g., N_SSB) are mapped at least once to the ROs within the association period. For example, one or more SS/PBCH block indexes may be mapped to the one or more ROs based on an order.

For paired spectrum or SUL band, all ROs may be valid. For unpaired spectrum, if a wireless device is not provided TDD-UL-DL-ConfigurationCommon, a RO in a PRACH slot may be valid, for example if it does not precede a SS/PBCH block in the PRACH slot and starts at least N_gap symbols after a last SS/PBCH block reception symbol. For example, for preamble numerology of 1.25 kHz or 5 kHz, the value of N_gap may be zero. In an example, for preamble numerology of 15 kHz, 30 kHz, 60 kHz, or 120 kHz, the value of N_gap may be 2. If the wireless device is provided TDD-UL-DL-ConfigurationCommon, a RO in a PRACH slot may be valid, for example if it is within UL symbols, or it does not precede a SS/PBCH block in the PRACH slot and starts at least N_gap symbols after a last downlink symbol and at least N_gap symbols after a last SS/PBCH block transmission symbol. For example, for preamble format B4 the value of N_gap is zero (N_gap=0). A wireless device may not use an invalid RO for transmission of a preamble.

According to an example, the third RACH configuration parameters (e.g., in MsgA-PUSCH-Config 1E) of PUSCH resources may comprise a list of MsgA PUSCH resources (e.g., msgA-PUSCH-ResourceList) that the wireless device may use when transmitting MsgA payload 1342 (or MsgA transport block). In an example, each MsgA PUSCH resource of the list of MsgA PUSCH resources may be associated with one or more parameters comprising a preamble group indication (e.g., msgA-PUSCH-PreambleGroup) indicating a preamble group that the msgA PUSCH configuration is tied to according to groupB-ConfiguredTwoStep in RACH-ConfigCommonTwoStepRA, and one or more PUSCH resource time and/or frequency domain resource allocation parameters. The number of PUSCH resources may be consistent with the number of configured preamble groups in RACH-ConfigCommonTwoStepRA in a BWP. In an example, if an active UL BWP is not an initial UL BWP and msgA-PUSCH-Config is not provided for the active UL BWP, the UE may use the msgA-PUSCH-Config provided for the initial UL BWP.

In an example, the base station may configure the wireless device with both four-step and two-step RACH resources. The wireless device may need to select which type of RACH (2-step or 4-step) to use to initiate a RACH procedure. In an example, the RACH parameters of 2-step RA type may comprise one or more RSRP thresholds comprising a first RSRP threshold (e.g., msgA-RSRP-Threshold) for selection of 2-step RA type or 4-step RA type to perform the procedure (on a NUL), a second RSRP threshold (e.g., msgA-RSRP-ThresholdSUL) for selection of 2-step RA type or 4-step RA type to perform the procedure on a SUL, a third RSRP threshold (e.g., msgA-RSRP-ThresholdSSB) for selection of SS block and corresponding PRACH resource, a fourth RSRP threshold (e.g., msgA-RSRP-ThresholdSSB-SUL) for selection of a NUL or a SUL to perform the RA procedure.

The one or more RACH configuration parameters may indicate/configure different (or independent) ROs between 2-step RA and four-step RA. The different (or independent) ROs may reduce receiver uncertainty and/or reduce the access delay. The base station may configure the wireless device with different (or independent) ROs such that the base station being able to identify, based on RO that the base station receives the received preamble, whether a received preamble being transmitted by a wireless device for 2-step RA or four-step RA. In an example, a base station may flexibility determine whether to configure shared ROs or separate ROs between 2-step RA and four-step RA procedures. A wireless device may receive, from the base station, RRC message(s) and/or DCI indicating an explicit or implicit indication of whether to configure shared ROs or separate ROs between 2-step RA and four-step RA procedures. There may be a case that a base station configures one or more ROs shared between 2-step RA and four-step RA and preambles partitioned for the 2-step RA and the four-step RA. For example, shared ROs but separate preambles may be configured for two-step RACH and four-step RACH. In an example, for the shared ROs, the base station may determine the type of the RA procedure that the wireless device is initiated based on the detected preamble (e.g., the preamble index of the detected preamble).

A base station may transmit to a wireless device one or more RRC messages (e.g., RACH-ConfigGenericTwoStepRA IE) comprising generic configuration parameters of a RA procedure for 2-step RA type on a cell (or a BWP of the cell). The generic configuration parameters of the RA procedure for 2-step RA type may comprise: a PRACH configuration index (e.g., msgA-PRACH-ConfigurationIndex), a preamble target received power level (e.g., msgA-PreambleReceivedTargetPower), a maximum number (e.g., msgA-TransMax) of MsgA preamble 1341 transmission performed before switching to a 4-step RA procedure, a maximum number (e.g., preambleTransMax) of RA preamble transmission performed before declaring an RA failure, a MsgB monitoring window length (e.g., msgB-ResponseWindow) in number of slots, a power ramping step (e.g., msgA-PreamblePowerRampingStep) for MsgA PRACH, a number (e.g., msgA-RO-FDM) of ROs multiplexed in one time instance, an offset indication (e.g., msgA-RO-FrequencyStart) of lowest RO in frequency domain with respect to PRB 0 and etc. In an example, one or more consecutive MsgA PUSCH occasions (POs) in the frequency domain of an UL BWP may be separated by a number of RBs provided by guardBandMsgA-PUSCH. A number Nf of POs in the frequency domain of an UL BWP is provided by nrofMsgA-PO-FDM. In another example, a number Nt of time domain POs in each slot is provided by nrofMsgA-PO-perSlot and a number Ns of consecutive slots that include POs is provided by nrofSlotsMsgA-PUSCH.

Multiple MsgA PUSCH configurations may be provided to the wireless device. For example, for MsgA PUSCH configuration following parameters may be defined: Modulation and coding scheme (MCS) and/or TB size (TBS); number of FDMed MsgA PUSCH occasions (POs), wherein MsgA POs (including guard band and/or guard period, if exist) under the same MsgA PUSCH configuration are consecutive in frequency domain; number of TDMed MsgA POs; number of PRBs per MsgA PO; number of DMRS symbols/ports/sequences per MsgA PO; bandwidth of PRB level guard band and/or duration of guard time; PUSCH mapping type. In another example, for MsgA payload (or MsgA PUSCH) 1342 with separate configuration from MsgA preamble (or MsgA PRACH) 1341, the following parameters may be defined: periodicity (MsgA PUSCH configuration period); offset(s) (e.g., symbol, slot, subframe, etc.); time domain resource allocation (e.g., in a slot for MsgA PUSCH: starting symbol, number of symbols per MsgA PO, number of time-domain MsgA POs, etc.); frequency starting point. In another example, for MsgA PUSCH with relative configuration with respect to MsgA PRACH, the following parameters may be defined: time offset (combination of slot-level and symbol-level indication) with respect to a reference point (e.g., start or end of each PRACH slot); number of symbols per MsgA PO (e.g., explicit or implicit indication); frequency offset with respect to a reference point (e.g., start of the first RO or end of the last RO in frequency domain).

A MsgA PO for MsgA payload 1342 transmission may be defined by a frequency resource and a time resource and is associated with a DMRS resource. In an example, the DMRS resources may be provided by msgA-DMRS-Config. In an example, transmitting a MsgA 1331, by the wireless device to the base station, may comprise at least transmitting a MsgA preamble 1341 via a RO and/or a MsgA payload 1342 via a MsgA PO that is mapped to the RO. The MsgA payload may comprise an identifier (e.g., C-RNTI MAC CE) for contention resolution. For example, a wireless device may construct a MAC header as the MsgA payload with a plurality of bits (e.g., 56 and/or 72 bits). For example, the MsgA payload may comprise buffer status report (BSR) MAC CE, power headroom report (PHR) MAC CE, RRC messages, connection request, etc.

A mapping order for MsgA preamble or RO and MsgA PO may be based on code domain, followed by frequency domain, followed by time domain (e.g., similar to SSB-to-RO mapping). For example, the mapping order for MsgA preamble/RO and MsgA PO may be as follows: 1) first, in increasing order of code domain, e.g., MsgA PUSCH DMRS port/sequence per MsgA PO and/or MsgA preamble index per RO; 2) second, in increasing order of frequency domain resource; and 3) third, in increasing order of time domain resource. In an example, a MsgA PO may be mapped to/from a RO based on the mapping order. In an example, the RO and the MsgA PO may be TDMed and may be located in different resources (e.g., in different time slots). For example, the RO and the MsgA PO may be located in non-contiguous time slots. In an example, in unpaired spectrum (e.g., an TDD operation), UL slot may be isolated, and the MsgA PO may not follow the RO in the following slot. In an example, there may be one or more TDD DL slots between the RO and the MsgA PO.

For example, the base station may transmit, to the wireless device, a message indicating/configuring a mapping ratio between ROs and MsgA POs. The base station may transmit, to the wireless device, a message specifying/configuring the relative location of MsgA POs with respect to the mapped ROs. In an example, one or more MsgA POs may be configured within a MsgA PUSCH configuration period. For separate configuration of ROs and MsgA POs, the MsgA PUSCH configuration period may or may not be the same as PRACH configuration period. For relative configuration of MsgA POs with respect to ROs, the MsgA PUSCH configuration period may be the same as PRACH configuration period.

In an example, for an initiated two-step RA procedure, the wireless device may transmit MsgA payload 1342 corresponding to the MsgA PO based on determining that the MsgA PO is valid/validated. The wireless device may employ one or more PUSCH invalidity rules for determining whether the MsgA PO is invalid or not. For example, the one or more PUSCH invalidity rules may indicate that, in TDD operation, the MsgA PO may be invalid (or invalidated) if one or more symbols of the MsgA PO partially or fully overlaps with DL symbols/resources. In another example, the one or more PUSCH invalidity rules may indicate if one or more symbols of the MsgA PO overlap with SSB symbols, the MsgA PO may be invalid. In an example, the flexible and/or uplink resources (e.g., symbols) may be indicated via TDD-UL-DL-ConfigCommon and/or TDD-UL-DL-ConfigDedicated. In another example, the one or more PUSCH invalidity rules may indicate that if one or more symbols of the MsgA PO overlap (e.g., in time and frequency) with one or more ROs, the MsgA PO may be invalid. In an example, for unpaired spectrum and for SS/PBCH blocks (e.g., with indexes provided by ssb-PositionsInBurst in SIB1 or by ServingCellConfigCommon), regardless of whether the wireless device is provided tdd-UL-DL-ConfigurationCommon or not, the one or more invalidity rules may indicate that the MsgA PO is invalid based on the MsgA PO being preceded a SS/PBCH block in the PUSCH slot that the MsgA PO belongs to. For example, the one or more PUSCH invalidity rules may indicate that if the wireless device is not provided tdd-UL-DL-ConfigurationCommon, the MsgA PO may be invalid if the MsgA PO starts at most N_gap symbols after a last SS/PBCH block symbol. According to another example, if a wireless device is provided tdd-UL-DL-ConfigurationCommon, the one or more PUSCH invalidity rules may indicate that the MsgA PO is invalid if the MsgA PO starts less than N_gap symbols after a last downlink symbol.

The description provided regarding the one or more PUSCH invalidity rules should not be considered limited to examples provided in this disclosure. By way of the provided examples, several details of the exemplary set of embodiments regarding the one or more PUSCH invalidity rules are provided hereinabove. It will be recognized by those of skill in the art that any number of variations on or alternatives to the specific details of the exemplary embodiments may be implemented if desired.

In an example, a wireless device may transmit a MsgA preamble via a valid RO based on the MsgA preamble/RO not being mapped to a valid MsgA PO. For example, the wireless device may, based on the one or more PUSCH invalidity rules, determine that the PO is invalid. In response to determining that the MsgA PO is invalid/validated, the wireless device may transmit the MsgA preamble 1341 and refrain from transmitting the MsgA payload (or MsgA PUSCH or MsgA transport block) 1342.

In an example, in response to determining that the MsgA PO is validated and the transmission of the MsgA payload being canceled, the wireless device may refrain from transmitting the MsgA payload 1342 (e.g., cancel the transmission of the MsgA payload or not transmit the MsgA payload or drop the MsgA payload). For example, the wireless device may cancel the transmission of the MsgA payload based on receiving a cancelation indication (e.g., based on detecting a DCI format 2_4 with a CI-RNTI when the wireless device is provided UplinkCancellation) and/or an interruption transmission indication (e.g., based on detection a DCI format 2_1 with an INT-RNTI when the wireless device is provided DownlinkPreemption) from the base station. For example, the transmission of the MsgA payload may be canceled based on one or more PUSCH transmission cancelation rules.

In an example, the higher layers (e.g., the MAC layer) of the wireless device may schedule/configure the wireless device to transmit the MsgA payload in one or more symbols of a slot corresponding to the MsgA PO. For example, when an ongoing RA procedure is not initiated/triggered by a PDCCH order, the higher layers of the wireless device may schedule/configure the transmission of the MsgA payload. In an example, for an ongoing RA procedure initiated/triggered by a PDCCH order, the higher layers of the wireless device may schedule/configure the transmission of the MsgA payload. For example, for the ongoing RA procedure, the transmission of the MsgA payload may not be indicated by a DCI (e.g., DCI format 0_0, DCI format 0_1, DCI format 1_0, DCI format 1_1, or DCI format 2_3).

For example, a downlink channel/signal (e.g., CSI-RS or PDSCH) may collide/overlap with the MsgA payload in at least one symbol of the one or more symbols of the slot. The one or more PUSCH transmission cancelation rules may indicate that the wireless device may cancel the transmission of the MsgA payload in response to determining the wireless device does not support capability of partial cancelation (or partialCancellation) and the first symbol of the MsgA payload is outside a time window. The time window with length $T_{proc,2}$ may be started from a last symbol of a CORESET where the wireless device detects a DCI (e.g., DCI format 1_0, DCI format 1_1, or DCI format 0_1) indicating to the wireless device to receive the downlink channel/signal. In an example, $T_{proc,2}$ may be evaluated assuming $d_{2,1}=1$ and a numerology μ that may correspond to the smallest SCS configuration between the SCS configuration of the PDCCH carrying the DCI format and the SCS configuration of PUCCH and PUSCH or $\mu_r$, where $\mu_r$ corresponds to the SCS configuration of the PRACH if it is 15 kHz or higher; otherwise $\mu_r=0$. For example, in response to not transmitting the MsgA payload, the wireless device may receive the downlink channel/signal.

In an example, corresponding to the MsgA PO, the higher layers (e.g., the MAC layer) of the wireless device may schedule/configure the wireless device to transmit the MsgA payload in the one or more symbols of the slot. For example, the wireless device may detect a DCI format 2_0 with a slot format value other than 255 that indicates a slot format with a subset of symbols from the one or more of symbols of the slot as downlink or flexible. The one or more PUSCH transmission cancelation rules may indicate that the wireless device may refrain from transmitting the MsgA payload in response to determining the wireless device does not support capability of partial cancelation (or partialCancellation) and the first symbol of the MsgA payload is outside the time window.

In an example, one or more symbols of a slot may be indicated to the wireless device as flexible by tdd-UL-DL-ConfigurationCommon and/or tdd-UL-DL-ConfigurationDedicated. For example, corresponding to the MsgA PO, the higher layers (e.g., the MAC layer) of the wireless device may schedule/configure the wireless device to transmit the MsgA payload in the one or more symbols of the slot. For example, the wireless device may not detect a DCI format 2_0 indicating a slot format with a subset of symbols from the one or more of symbols of the slot. The one or more PUSCH transmission cancelation rules may indicate that the wireless device may refrain from transmitting the MsgA payload in response to determining: the wireless device does not support capability of partial cancelation (or partialCa-ncellation), the wireless device does not provide enableConfiguredUL, and the first symbol of the MsgA payload is outside the time window.

In an example, tdd-UL-DL-ConfigurationCommon and/or tdd-UL-DL-ConfigurationDedicated may not be provided to the wireless device. For example, corresponding to the MsgA PO, the higher layers (e.g., the MAC layer) of the wireless device may schedule/configure the wireless device to transmit the MsgA payload in the one or more symbols of the slot. For example, the wireless device may not detect a DCI format 2_0 indicating a slot format with a subset of symbols from the one or more of symbols of the slot. The one or more PUSCH transmission cancelation rules may indicate that the wireless device may refrain from transmitting the MsgA payload in response to determining: the wireless device does not support capability of partial cancelation (or partialCancellation), the wireless device does not provide enableConfiguredUL, and the first symbol of the MsgA payload is outside the time window.

In an example, one or more symbols of a slot may be indicated to the wireless device as downlink by tdd-UL-DL-ConfigurationCommon and/or tdd-UL-DL-ConfigurationDedicated. Corresponding to the MsgA PO, the one or more PUSCH transmission cancelation rules may indicate that the wireless device may not transmit the MsgA payload in response to determining the MsgA payload overlaps, even partially, with the one or more symbols of the slot.

In an example, the wireless device may not be configured to monitor PDCCH for DCI format 2_0. One or more symbols of a slot may be indicated to the wireless device as flexible by tdd-UL-DL-ConfigurationCommon and/or tdd-UL-DL-ConfigurationDedicated. The one or more PUSCH transmission cancelation rules may indicate that the wireless device may not transmit the MsgA payload, corresponding to the MsgA PO, in response to determining the MsgA payload occurs in the one or more symbols of the slot and the higher layers (e.g., the MAC layer) of the wireless device schedules/configures the wireless device to transmit the MsgA payload.

In an example, the wireless device may not be configured to monitor PDCCH for DCI format 2_0. For example, tdd-UL-DL-ConfigurationCommon and/or tdd-UL-DL-ConfigurationDedicated may not be provided to the wireless device. The one or more PUSCH transmission cancelation rules may indicate that the wireless device may not transmit the MsgA payload, corresponding to the MsgA PO, in response to determining the MsgA payload occurs in the one or more symbols of the slot and the higher layers (e.g., the MAC layer) of the wireless device schedules/configures the wireless device to transmit the MsgA payload.

In an example, one or more symbols of a slot may be indicated to the wireless device as flexible by tdd-UL-DL-ConfigurationCommon and/or tdd-UL-DL-ConfigurationDedicated. The wireless device may receive a DCI format 2_0 providing a format for the slot using a slot format value other than 255 where an SFI-index field value in the DCI format 2_0 indicates the one or more symbols of the slot as flexible. The one or more PUSCH transmission cancelation rules may indicate that the wireless device may not transmit the MsgA payload, corresponding to the MsgA PO, in response to determining the MsgA payload occurs in the one or more symbols of the slot and the higher layers (e.g., the MAC layer) of the wireless device schedules/configures the wireless device to transmit the MsgA payload.

In an example, the wireless device may not be provided tdd-UL-DL-ConfigurationCommon and/or tdd-UL-DL-ConfigurationDedicated. The wireless device may receive a DCI format 2_0 providing a format for a slot using a slot format value other than 255 where an SFI-index field value in the DCI format 2_0 indicates one or more symbols of the slot as flexible. The one or more PUSCH transmission cancelation rules may indicate that the wireless device may not transmit the MsgA payload, corresponding to the MsgA PO, in response to determining the MsgA payload occurs in the one or more symbols of the slot and the higher layers (e.g., the MAC layer) of the wireless device schedules/configures the wireless device to transmit the MsgA payload.

In an example, for operation on a single carrier in unpaired spectrum, one or more symbols of a slot may be indicated to a wireless device for reception of SS/PBCH blocks via for example, ssb-PositionsInBurst in SIB1 or ssb-PositionsInBurst in ServingCellConfigCommon. The one or more PUSCH transmission cancelation rules may indicate that the wireless device may not transmit the MsgA payload, corresponding to the MsgA PO, in the slot based on determining the transmission of the MsgA payload overlaps with at least one symbol from the one or more symbols.

In an example, one or more symbols of a slot may be indicated to the wireless device for reception of SS/PBCH blocks in a first cell of the multiple serving cells by ssb-PositionsInBurst in SystemInformationBlockType1 or by ssb-PositionsInBurst in ServingCellConfigCommon. The one or more PUSCH transmission cancelation rules may indicate that the wireless device may not transmit the MsgA payload, corresponding to the MsgA PO, in the slot based on determining the transmission of the MsgA payload overlaps with at least one symbol from the one or more symbols.

In an example, the wireless device may determine that the one or more of the following are satisfied: the wireless device may be configured with multiple serving cells and is provided with directionalCollisionHandling-r16='enabled' for a set of serving cell(s) among the configured multiple serving cells; the wireless device may indicate support of half-DuplexTDD-CA-SameSCS-r16 capability; and the wireless device is not configured to monitor PDCCH for detection of DCI format 2_0 on any of the multiple serving cells. For example, the wireless device may determine a reference cell for a symbol as an active cell with the smallest cell index among the configured multiple serving cells if the wireless device is not capable of simultaneous transmission and reception as indicated by simultaneousRxTxInterBandCA among the multiple serving cells. In another example, the wireless device may determine a reference cell for a symbol as an active cell with the smallest cell index among the cells of each band respectively if the wireless device is capable of simultaneous transmission and reception by simultaneousRxTxInterBandCA for the configured multiple serving cells. The one or more PUSCH transmission cancelation rules may indicate that the wireless device may not transmit the MsgA PUSCH if the reference cell and another cell among the cells configured with directionalCollisionHandling-r16 operate in different frequency bands, tdd-UL-DL-ConfigurationCommon and/or tdd-UL-DL-ConfigurationDedicated indicate the symbol as downlink or uplink on another cell and as uplink or downlink for the reference cell, and the MsgA PUSCH transmission is configured/indicated by the higher layers (e.g., the MAC layer) of the wireless device. According to an example, the one or more PUSCH transmission cancelation rules may indicate that regardless of whether the reference cell and another cell operate in same or different frequency bands, the wireless device may not transmit the MsgA PUSCH if: the MsgA PUSCH is configured/indicated by the higher layers (e.g., the MAC layer) of the wireless device on a set of symbols on another cell, and at least one symbol from the set of symbols is indicated as downlink by tdd-UL-DL-ConfigurationCommon and/or tdd-UL-DL-ConfigurationDedicated or is a symbol corresponding to a PDCCH, PDSCH, or CSI-RS reception that is configured by higher layers (e.g., the MAC layer) of the wireless device on the reference cell.

In an example, corresponding to the MsgA PO, the higher layers (e.g., the MAC layer) of the wireless device may schedule/configure the wireless device to transmit the MsgA payload in the one or more symbols of the slot. For example, the wireless device may detect a DCI indicating transmission of an uplink signal/channel (e.g., PUCCH, PUSCH, SRS). For example, the transmission of the uplink signal/channel may overlap/collide with the transmission of the MsgA payload in the slot (e.g., in one or more symbols of the MsgA payload). In an example, the one or more PUSCH transmission cancelation rules may indicate that the wireless device may refrain from transmitting the MsgA payload in response to determining the uplink signal/channel is a PUCCH (e.g., carrying HARQ-ACK/NACK information). In another example, the one or more PUSCH transmission cancelation rules may depend on an implementation of the wireless device. For example, the implementation of the wireless device may indicate the transmission of the MsgA payload may be canceled based on determining the uplink signal/channel being a PUSCH. In another example, the implementation of the wireless device may indicate the transmission of the MsgA payload may not be canceled based on determining the uplink signal/channel being an SRS.

The description provided regarding the one or more PUSCH transmission cancelation rules should not be considered limited to examples provided in this disclosure. By way of the provided examples, several details of the exemplary set of embodiments regarding the one or more PUSCH transmission cancelation rules are provided hereinabove. It will be recognized by those of skill in the art that any number of variations on or alternatives to the specific details of the exemplary embodiments may be implemented if desired.

Figure 20:
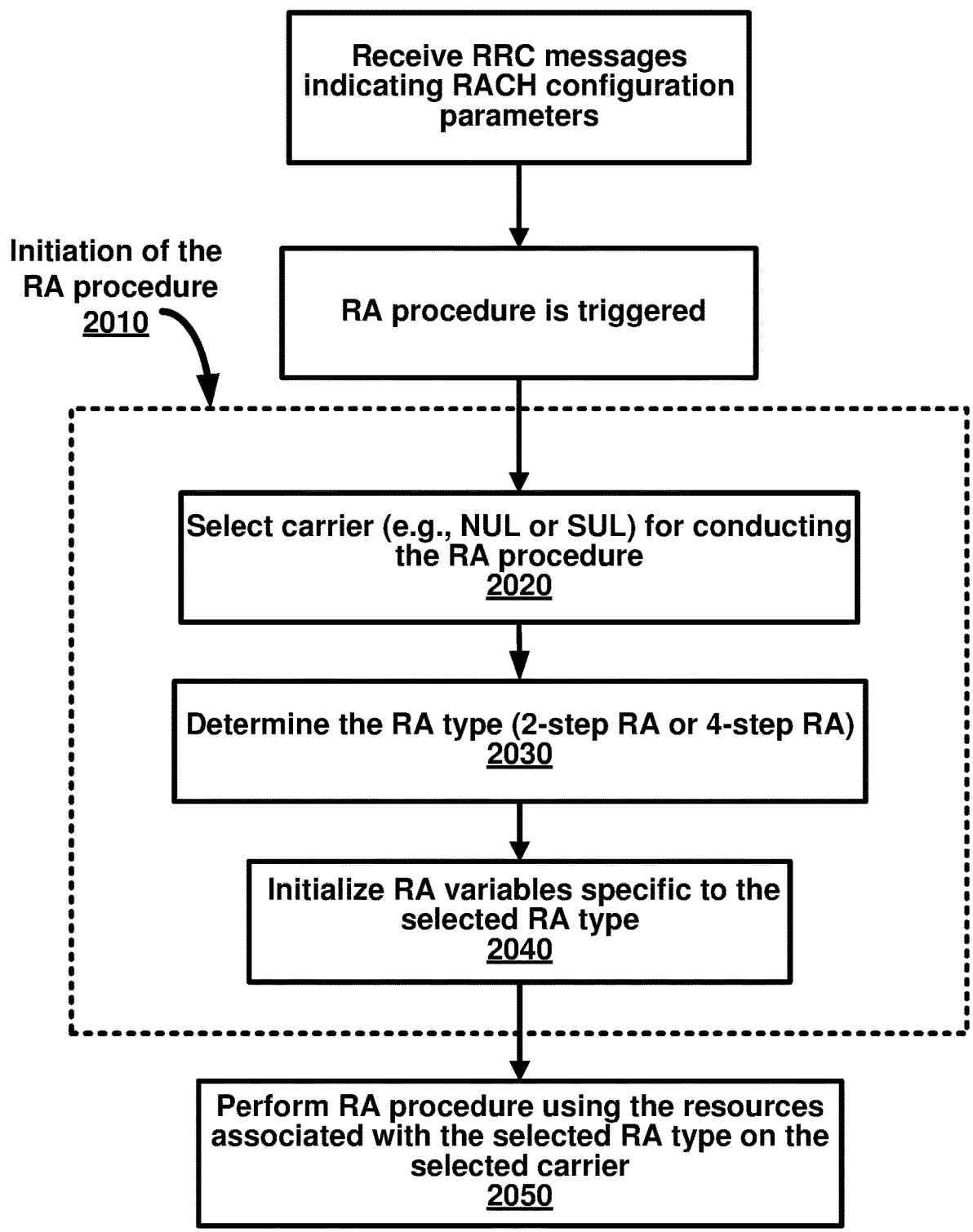
FIG. 20 shows an example flow diagram of an RA procedure with multiple uplink carriers and multiple RA types configured.

FIG. 20 shows an example flow diagram of an RA procedure with multiple uplink carriers and multiple RA types configured. In an example, a base station may transmit to a wireless device the one or more RACH configuration parameters. The one or more RACH configuration parameters may configure the wireless device to perform the RA procedure on a cell (or a BWP of the cell). The cell may be a serving cell. The cell may comprise an SUL and/or an NUL.

Lower layers (e.g., the physical layer) of the wireless device may receive from higher layers (e.g., the MAC layer), among other information, one or more SS/PBCH block indexes and/or one or more configuration parameters of one or more PRACH preamble (or preamble) transmission parameters. In an example, the one or more preamble transmission parameters may indicate preamble format, preamble index, a corresponding RA-RNTI (or MSGB-RNTI), time and/or frequency resources for preamble transmission, and/or parameters for determining one or more sequences and their shifts in the preamble sequence set (e.g., set type). The physical layer may provide to higher layers one or more corresponding sets of reference signal received power (RSRP) measurements.

As shown in FIG. 20, the wireless device may trigger the RA procedure. The wireless device may trigger the RA procedure in response to: initial access to the cell; a positioning procedure; an uplink coverage recovery procedure;

initiating a beam failure recovery; receiving from a base station a RRC reconfiguration message for a handover to a second cell; receiving from a base station a physical downlink control channel (PDCCH) order; re-synchronizing when new data arrives and the wireless device status is out-of-sync; new data arrives at the buffer of the wireless device when there is no scheduling request (SR) resources (e.g., PUCCH) for transmitting the SR are configured; and/or pending data exists in the buffer of the wireless device and the wireless device has reached a maximum allowable times for (re)transmitting an SR (e.g., SR failure). In an example, the MAC layer of the wireless device may trigger the RA procedure (e.g., the RA procedure is not triggered in response to the PDCCH order). In an example, there may only be one RA procedure ongoing at any point in time in a MAC entity of the wireless device. For example, based on determining that the RA procedure is ongoing, if a new RA procedure is triggered, it may be up to the wireless device implementation whether to continue with the ongoing RA procedure or initiate with the new RA procedure.

In response to triggering the RA procedure, the wireless device may initialize the RA procedure 2010. The initializing the RA procedure may comprise at least one of: determining a carrier (SUL or NUL) for performing the RA procedure based on measured RSRP 2020, determining a 2-step RA type or a 4-step RA type (e.g., selecting RA type) for performing the RA procedure 2030, and initializing one or more RA parameters (variables) specific to the selected RA type 2040. Once the RA procedure is initiated, the wireless device may perform RA procedure using selected RA resources with the selected RA carrier and RA type 2050. In an example, performing the RA procedure, based on determining that the RA procedure is a 4-step RA procedure, may comprise at least one or more of the following: selecting the RA resources and transmitting one or more preambles (e.g., corresponding to one or more ROs), and/or monitoring one or more PDCCH candidates for receiving one or more random access responses (RARs) 1312, and/or one or more retransmissions of the one or more preambles, and/or transmission of Msg3 1313, and/or contention resolution procedure. In another example, performing the RA procedure, based on determining that the RA procedure is a 2-step RA procedure, may comprise at least one or more of the following: selecting the RA resources and transmitting one or more MsgA preambles 1341 via one or more ROs and/or transmitting one or more MsgA payloads 1342 via one or more MsgA POs, and/or monitoring one or more PDCCHs for receiving one or more random access responses (RARs) 1332, and/or one or more retransmissions of the one or more MsgA preambles and/or MsgA payloads, and/or switching to a 4-step RA procedure, and/or performing fallback procedure (e.g., transmitting Msg3 1331 in response to receiving a MsgB1332 comprising a fallback MAC subPDU).

As shown in FIG. 20, in response to selecting an uplink carrier (e.g., SUL or NUL) for performing the RA procedure, the wireless device may select the RA type 2030. In an example, the wireless device may select the RA type based on a plurality of conditions, e.g., the RSRP threshold (e.g., msgA-RSRP-Threshold), delay requirement, distance to the serving (or target) base station, and logical channel priority triggering a BSR, and the like. In an example, in response to the RSRP being greater than the second RSRP threshold, the wireless device may select 2-step RA type (e.g., RA_TYPE=2-stepRA) for performing the RA procedure on the selected uplink carrier. In an example, in response to the RSRP being smaller than the second RSRP threshold, the wireless device may select 4-step RA type (e.g., RA_TYPE=4-stepRA) for performing the RA procedure on the selected uplink carrier. According to another example, when the RA procedure is triggered for system information (SI) acquisition, the wireless device may select the 4-step RA type for performing the RA procedure.

The wireless device may employ/use/maintain one or more parameters/variables for the initiated RA procedure. For example, the one or more parameters/variables may comprise at least one of: RA_TYPE; PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; POWER_OFFSET_2STEP_RA; MSGA_PREAMBLE_POWER_RAMPING_STEP; and TEMPORARY_C-RNTI.

As shown in FIG. 20, after determining the RA type 2030, the wireless device may initialize one or more RA parameters specific to the selected RA type 2040. The wireless device may initialize one or more parameters (e.g., transmission counter, transmission timer, transmission power settings, response windows, and etc.) of the RA procedure. For example, based on determining that the selected RA type is a 2-step RA procedure (i.e., RA_TYPE=2-stepRA), the one or more RA parameters specific to 2-step RA procedure may comprise at least the following: PREAMBLE_POWER_RAMPING_STEP, msgA-TransMax, preambleTransMax, and SCALING_FACTOR_BI. In another example, based on determining that the selected RA type is a 4-step RA procedure (i.e., RA_TYPE=4-stepRA), the one or more RA parameters specific to 4-step RA procedure may comprise at least the following: PREAMBLE_POWER_RAMPING_STEP, preambleTransMax, and SCALING_FACTOR_BI.

In an example, if RA_TYPE is switched from 2-stepRA to 4-stepRA during the ongoing/current RA procedure, the wireless device may set POWER_OFFSET_2STEP_RA based on at least one or more configured parameters. In an example, the at least one or more configured parameters may comprise PREAMBLE_POWER_RAMPING_COUNTER and PREAMBLE_POWER_RAMPING_STEP. In response to switching the RA type from 2-stepRA to 4-stepRA during the ongoing/current RA procedure, the wireless device may initialize the RA variables specific to a 4-step RA type 2040 and perform the RA procedure 2050.

In an example, for performing the RA procedure 2050, the wireless device may select one or more RA resources. The one or more RA resources may comprise one or more random access preambles, one or more resources one or more ROs (or resources comprising time, frequency, and/or code) for preamble transmission, and/or one or more MsgA POs for MsgA PUSCH/payload transmission. For example, the wireless device may determine a valid RO (e.g., the next available RO) corresponding to the first SSB or the first CSI-RS. For example, the wireless device may select the valid RO (e.g., randomly with equal probability) amongst the ROs occurring simultaneously but on different subcarriers. The wireless device may determine the valid RO based on the possible occurrence of measurement gaps. In an example, the wireless device may instruct the physical layer to transmit a preamble (e.g., Random Access Preamble (RAP)) using the valid RO, corresponding RA-RNTI (e.g., if available), PREAMBLE_INDEX and PREAMBLE_RECEIVED_TARGET_POWER. For example, the wireless device may determine an RA-RNTI associated with the valid RO in which the preamble being transmitted. In another example, the wireless device may compute an MSGB-RNTI associated with the valid RO in which the MsgA preamble is transmitted. The wireless device may instruct the physical layer to transmit the MsgA 1331 using the valid RO and a MsgA PO that is mapped to the valid RO (e.g., if the valid RO or the MsgA preamble is mapped to a valid PO) using the corresponding the MSGB-RNTI, PREAMBLE_INDEX, PREAMBLE_RECEIVED_TARGET_POWER, msgA-PreambleReceivedTargetPower, and the amount of power ramping applied to the latest MsgA preamble transmission.

In an example, the wireless device may start a RAR window (e.g., ra-ResponseWindow or msgB-ResponseWindow) at a first downlink control channel occasion from an end of the preamble transmission (for a case of four-step RA procedure) or from an end of the MsgA payload transmission (for a case of 2-step RA procedure). The wireless device may, while the RAR window is running, monitor a first downlink control channel (DCI) occasion of the SpCell for random access response(s) (RARs) identified by a particular RNTI (e.g., the RA-RNTI for the 4-step RA procedure or MSGB-RNTI for the 2-step RA procedure), a temporary cell-radio network temporary identifier (TC-RNTI), and/or C-RNTI.

In an example, the wireless device may monitor PDCCH (e.g., a set of PDCCH candidates) for one or more downlink control channels in a Type1-PDCCH common search space set. For example, the Type1-PDCCH common search space set may be configured by one or more search space sets, e.g., the ra-searchSpace in the PDCCH-ConfigCommon. For a DL BWP, if the wireless device is not provided ra-SearchSpace for Type1-PDCCH CSS set, the wireless device may not monitor the set of PDCCH candidates for Type1-PDCCH CSS set on the DL BWP.

According to an example, the RAR window may start at a symbol of a first control resource set. According to an example, the symbol duration may correspond to the numerology for the Type1-PDCCH CSS. For example, the symbol may be the first symbol of the earliest CORESET the wireless device is configured to receive PDCCH for the Type1-PDCCH CSS set. In another example, the symbol may be at least one symbol after the last symbol of the valid RO corresponding to the preamble transmission for the 4-step RA procedure.

For example, the symbol may be at least one symbol after the last symbol of the MsgA PO corresponding to the MsgA payload transmission for the 2-step RA procedure. In another example, the symbol may be at least one symbol after the last symbol of the valid RO corresponding to the MsgA preamble transmission for the 2-step RA procedure. In another example, based on determining that the MsgA PO that is mapped to the RO (or the MsgA preamble) is invalid, the symbol may be determined, by the wireless device, at least one symbol after the last symbol of the valid RO. In another example, based on determining that the MsgA PO occasion is valid, the symbol may be determined, by the wireless device, at least one symbol after the last symbol of the MsgA PO.

In an example, the wireless device may receive a PDCCH based on the RA-RNTI or the MSGB-RNTI. The PDCCH may indicate a downlink assignment based on which the wireless device may receive one or more TBs comprising an MAC PDU. For example, the MAC PDU comprises at least one MAC subPDU with a corresponding subheader comprising a Random Access Preamble identifier (e.g., RAPID) matched to the preamble (e.g., MsgA preamble) that a wireless device transmits to the base station. In this case, the wireless device may determine that a RAR reception is successful. For example, the at least one MAC subPDU may comprise a RAPID only, e.g., for a random access procedure being started, by a wireless device, for a system information (SI) request.

A wireless device may stop the RAR window (e.g., ra-ResponseWindow or msgB-ResponseWindow) after and/or in response to receiving one or more RARs being determined as successful. A reception of the one or more RARs may be determined as successful, for example, when the one or more RARs comprise a RAPID corresponding to the preamble (or the MsgA preamble in the case of the two-step RA procedure) that the wireless device transmits to a base station. The one or more RARs may comprise an uplink grant indicating one or more uplink resources granted for the wireless device. The wireless device may transmit one or more transport blocks (e.g., Msg3) via the one or more uplink resources. In an example, the wireless device may use the downlink assignment to identify parameters required for decoding/detecting the one or more TBs. For example, the downlink assignment may indicate at least one of following: time and frequency resource allocation of a PDSCH carrying the one or more TBs, a size of the PDSCH, MCS, etc.

In an example, a RAR message may be in a form of MAC PDU comprising one or more MAC subPDUs and/or optionally padding. In an example, a MAC subPDU may comprise at least one of following: a MAC subheader with Backoff Indicator only; a MAC subheader with RAPID only (e.g., acknowledgment for SI request); a MAC subheader with RAPID and MAC RAR. In an example, an MAC RAR may be fixed size and may comprise at least one of the following fields: an R field that may indicate a Reserved bit; a Timing Advance Command MAC CE field that may indicate the index value TA employed to control the amount of timing adjustment; an UL grant field that may indicate the resources to be employed on the uplink; and an RNTI field (e.g., Temporary C-RNTI and/or C-RNTI) that may indicate an identity that is employed during the RA procedure. For example, for a two-step RA procedure, a RAR may comprise at least one of following: a wireless device contention resolution identity, an RV ID for retransmission of one or more TBs, decoding success or failure indicator of one or more TB transmission.

In an example, the wireless device may determine that a RAR reception not being successful, e.g., based on determining that at least one RAR comprising one or more RAPIDs, matching the transmitted PREAMBLE_INDEX, is not received until the expiry of the RAR window. In an example, in response to and/or after determining that the RAR reception not being successful, the wireless device may perform one or more retransmissions of one or more preambles during the RA procedure. In another example, the wireless device may determine the requirement for the one or more retransmissions of MsgA (e.g., MsgA preamble and the MsgA payload), e.g., in response to not receiving at least one MsgB comprising the contention resolution identifier, which the wireless device may include in the MsgA payload, until the expiry of the RAR window. In another example, the wireless device may determine the one or more retransmissions of one or more preambles or the MsgA, e.g., in response to determining, by the wireless device, that a contention resolution not being successful. For example, the wireless device may determine, based on a Msg4 for four-step RA procedure and/or the MsgB for 2-step RA procedure, whether the contention resolution being successful or not.

In an example, the wireless device may start a contention resolution timer (e.g., ra-ContentionResolutionTimer) and may restart the contention resolution timer at each HARQ retransmission in the first symbol after the end of a Msg3 1313 transmission, for example, once the wireless device transmits, to a base station, the Msg3. A wireless device may determine that the contention resolution not being successful, for example, based on not receiving an indication of a contention resolution until the contention resolution timer expires. In an example, the wireless device may discard a TEMPRARY_C-RNTI indicated by a Msg2 1312 (or the Msg B 1332) after or in response to the expiry of the contention resolution timer (and/or in response to a determination of the contention resolution is unsuccessful).

For the two-step RA procedure, the wireless device may fall back to a four-step RA procedure based on an explicit and/or implicit indication of the MsgB. In an example, in response to receiving, by the wireless device, the MsgB comprising an explicit indication and/or an RNTI used for detecting a PDCCH scheduling the MsgB (MSGB-RNTI), the wireless device may determine to fall back to the four-step RA procedure. The wireless device may transmit the Msg3, e.g., after or in response to receiving the fallback message via resource(s) indicated by an UL grant in the MsgB. In this case the wireless device may follow the four-step RA procedure, e.g., starting the contention resolution timer, and/or determining whether the contention resolution being successful or not being successful.

A wireless device may maintain (e.g., increment) a counter counting a number of preamble transmissions (e.g., PREAMBLE_TRANSMISSION_COUNTER) by a value of counter step (e.g., by 1), for example, after or in response to a RAR reception being unsuccessful and/or after or in response to a contention resolution being unsuccessful. The wireless device may determine that the RA procedure being unsuccessfully completed and/or a MAC entity of the wireless device may indicate a random access problem to upper layer(s), for example, in response to determining that the number of preamble transmissions reached a configured value, (e.g., if PREAMBLE_TRANSMISSION-COUNTER=preambleTransMax+1). In an example, the wireless device may determine that the RA procedure not being completed and/or one or more retransmissions of one or more Msg1 1311, Msg1 1321, or Msg A 1331 may be performed, in response to determining that the number of preamble transmissions being smaller than the configured value, (e.g., if PREAMBLE_TRANSMISSION_COUNTER<preambleTransMax+1).

In an example, the wireless device may delay a particular period of time (e.g., a backoff time) for performing a retransmission of one or more Msg1 1311, Msg1 1321, or Msg A 1331. For example, the wireless device may apply the backoff time to the retransmission, for example, based on the RA procedure being CBRA (e.g., where a preamble being selected by a MAC entity of the wireless device) and/or based on determining, by the wireless device, that the RA procedure not being completed (e.g., in response to a successful RAR reception). In an example, the backoff time to the retransmission may be applied, by the wireless device, based on determining that that the RA procedure not being completed (e.g., in response to an unsuccessful contention resolution). In an example, the wireless device may set the backoff time to 0 milliseconds when the RA procedure is initiated 1910. In an example, the wireless device may set (or update) the backoff time based on the PREAMBLE_BACKOFF determined by a value in the backoff indicator (BI) field of the MAC subPDU and one or more RRC messages indicating the scaling factor (e.g., SCALING_FACTOR_BI). For example, the wireless device may determine the backoff time based on a uniform distribution between 0 and the PREAMBLE_BACKOFF.

Figure 21:
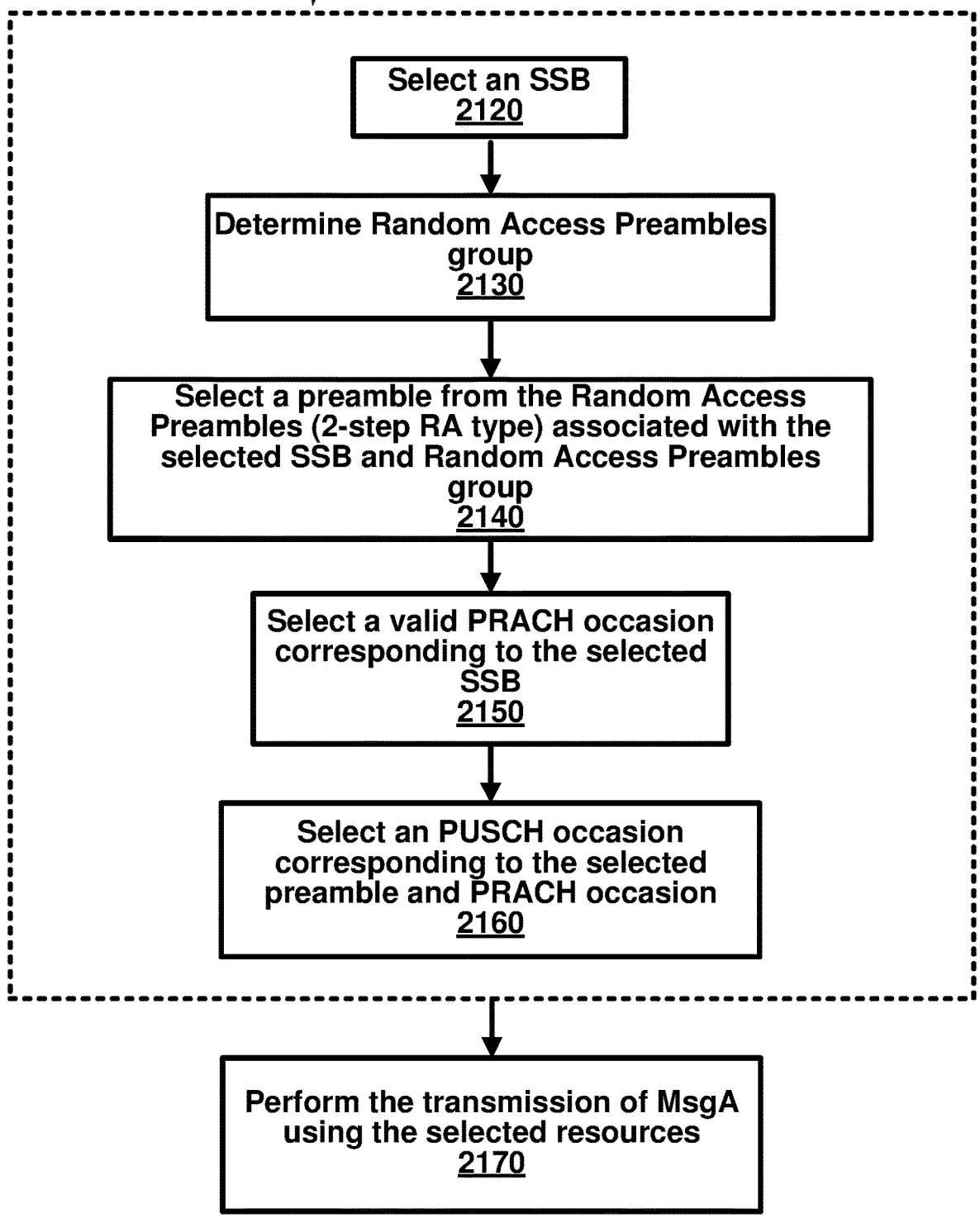
FIG. 21 shows an example flowchart of resource selection procedure specific to a two-step RA procedure.

FIG. 21 shows an example flowchart of resource selection procedure specific to a two-step RA procedure. The wireless device may trigger an RA procedure. Prior to performing the RA procedure, the wireless device may, following the procedure discussed in FIG. 20, select a carrier (SUL or NUL), select the type of the triggered RA procedure (two-step RA type or four-step RA type), and initialize the one or more RA parameters/variables specific to the selected RA type. In the example shown in FIG. 21, it is assumed that the wireless device is selected a two-step RA type (e.g., RA_TYPE=2-stepRA), for example, based on an RSRP threshold.

As shown in FIG. 21, to perform the two-step RA procedure, the wireless device may require selecting one or more resources via the RA resource selection procedure 2110. The RA resource selection procedure may select a valid RO and a MsgA PO mapped to the valid RO. The wireless device may use the valid RO and the MsgA PO for transmitting a MsgA 1331. The MsgA may comprise a MsgA preamble 1341 and a MsgA payload/PUSCH 1342. The wireless device may transmit the MsgA preamble via the RO. In response to the MsgA preamble being transmitted, the wireless device may transmit the MsgA payload via the MsgA PO. For example, the wireless device may not transmit the MsgA payload based on determining the MsgA PO is invalid (e.g., based on the one or more PUSCH invalidity rules). In another example, the wireless device may cancel the transmission of the MsgA payload based on the one or more PUSCH transmission cancelation rules.

In an example, the RA resource selection procedure 2110 may comprise at least selecting an SSB from a plurality of SSBs 2120, selecting a Random Access Preambles (RAPs) group 2130, selecting a MsgA preamble from the selected RAPs group 2140 (e.g., randomly with equal probability from the 2-step RA type Random Access Preambles associated with the selected SSB and the selected RAPs group), determining the valid RO based on the selected SSB 2150 (e.g., based on msgA-RSRP-ThresholdSSB or randomly), selecting the MsgA PO mapped to the valid RO, and determining associated HARQ information of one or more UL grants for transmission of the MsgA 2160. For example, the HARQ information may indicate at least New Data Indicator (NDI), Transport Block size (TBS), Redundancy Version (RV), and/or a HARQ process ID. The wireless device may set the PREAMBLE_INDEX to the index of the MsgA preamble.

In an example, the wireless device may select the valid RO 2050 corresponding to the selected SSB. In an example, the valid RO may be selected among one or more valid ROs (e.g., available for MsgA preamble transmission). In another example, the wireless device may select the valid RO randomly with equal probability among the consecutive valid ROs, corresponding to the selected SSB, allocated for 2-step RA type. In an example, the wireless device may select the valid RO corresponding to the selected SSB based on one or more restrictions (e.g., one or more PRACH mask indexes). The wireless device may select a first valid RO indicated by a first PRACH mask index value for the first SS/PBCH block index in the first association period. The first association period may be a first mapping cycle. The wireless device may reset the one or more indexes of the one or more ROs for the first mapping cycle.

In an example, for a first transmission of the MsgA, if the transmission not being made for the CCCH logical channel, the wireless device may indicate to the Multiplexing and assembly entity to include the C-RNTI MAC CE in the MsgA payload (or MsgA MAC PDU). In an example, the Multiplexing and assembly entity may include beam failure recovery (BFR) MAC CE in the MsgA payload if the RA procedure is triggered for SpCell beam failure recovery and spCell-BFR-CBRA with value true is configured. The wireless device may obtain the MsgA MAC PDU for transmitting the MsgA payload from the Multiplexing and assembly entity (according to the HARQ information) to store it in a buffer (e.g., the MsgA buffer).

In an example, there may be one or more ways for the wireless device to generate one or more candidate preambles that may be used for the two-step RA procedure. For example, a wireless device may receive, from the base station, a control message (e.g., SIB message, RRC message dedicated to the wireless device, and/or a PDCCH order) indicating one or more preamble indices of one or more RAPs to be used by the wireless device. The one or more candidate preambles may be grouped into one or more groups (e.g., RAPs group A and RAPs group B). For example, each group may be associated with a specific amount of data for transmission. For example, the amount of data (e.g., the payload size of the MsgA payload) may indicate a size of one or more transport blocks a wireless device being required to transmit and/or may indicate a size of uplink data being remained in the buffer. In an example, a first group (e.g., the RAPs group A) of the one or more groups may comprise RAPs indicating small data transmission(s) of transport block(s) during the two-step RA procedure, and a second group (e.g., the RAPs group B) may comprise RAPs indicating larger data transmission(s) of transport block(s) during the two-step RA procedure.

In an example, based on determining that the MsgA preamble not being selected by higher layers (e.g., the MAC entity) among the CB RAPs, the wireless device may select the MsgA PO from one or more MsgA POs configured in msgA-CFRA-PUSCH corresponding to the PRACH slot of the selected RO, according to msgA-PUSCH-resource-Index corresponding to the selected SSB. In an example, if the MsgA PO is valid, the wireless device may deliver the one or more UL grants and the associated HARQ information to the HARQ entity. In response to determining the MsgA PO being validated, the wireless device may perform the transmission of the MsgA payload via the MsgA PO using the one or more UL grants and the associated HARQ information.

In another example, based on determining that the Random Access Preamble being selected by the MAC entity among the CBRA Preamble(s), the wireless device may select the MsgA PO corresponding to the selected preamble and the valid RO, e.g., based on the mapping between PO (with an associated DMRS resource) and the valid RO. After selecting the RA resources 2010, the wireless device may perform the transmission of MsgA (e.g., the MsgA preamble and the MsgA payload) using the selected resources 2170. The wireless device may, based on the MsgA PO, determine one or more UL grants for the MsgA payload according to the PUSCH configuration associated with the selected Random Access Preambles group. In an example, the wireless device may deliver the one or more UL grants and the associated HARQ information to the HARQ entity.

In the example shown in FIG. 21, the two-step RA procedure between the wireless device and the base station may comprise of transmitting, by the wireless device, the MsgA 1331 comprising the MsgA preamble 1341 and a MsgA payload 1342. For example, the MsgA payload may comprise one of data, security information, device information such as IMSI/TMSI or the C-RNTI MAC CE (e.g., the wireless device identifier (ID) that may be used for a contention resolution), and/or other information such as BSR MAC CE. In another example, the MsgA payload may comprise a CCCH SDU. The CCCH SDU may comprise an RRC (re)establishment request, an RRC setup request, and/or an RRC resume request.

In the DL transmission of the two-step RA procedure, the base station may transmit a MsgB 1332 (e.g., a RAR corresponding to the MsgA) that may comprise at least one of following: a timing advance command (TAC MAC CE) indicating the TA value, a power control command, an UL grant (e.g., radio resource assignment, and/or MCS), an identifier for contention resolution, an RNTI (e.g., C-RNTI or TC-RNTI), and/or other information. In another example, the MsgB may comprise a RAPID corresponding to the MsgA preamble, a positive or negative acknowledgement of a reception of the MsgA payload, an implicit and/or explicit indication of a successful decoding of the MsgA payload, an indication of fallback to a 4-step RA procedure (e.g., when the MsgB contains the fallbackRAR MAC subPDU), and/or combination thereof.

In an example, the wireless device may start a first response window (e.g., msgB-ResponseWindow) after the transmission of the MsgA. In an example, the wireless device may receive and/or detect, via the downlink control channel during the first response window, a PDCCH addressed to the C-RNTI. The PDCCH may comprise a DCI indicating a downlink assignment of PDSCH. In an example, the DCI may be a particular DCI whose format being predefined, for example, a DCI format 1_0 or a DCI format 1_1. The wireless device may receive and/or decode the PDSCH based on the downlink assignment. The physical layer may decode the PDSCH and send the decoded data to the MAC entity in the form of a MAC PDU.

In an example, the wireless device may attempt to receive and/or decode the PDSCH based on the downlink assignment. The downlink assignment may indicate parameters based on which the wireless device receives the PDSCH. For example, the downlink assignment may indicate at least one of following: a frequency domain resource assignment indicator (e.g., in terms of one or more frequency offsets), a time domain resource assignment indicator (e.g., in terms of OFDM symbol and/or slot offsets from a reception timing of the PDCCH, and/or duration of the PDSCH transmission), modulation and coding scheme, redundancy version indicator, a downlink assignment index, PUCCH resource indicator for ACK/NACK transmission of a reception of the PDSCH, transmit power control command of scheduled PUCCH for the ACK/NACK transmission, PDSCH-to-HARQ feedback (e.g., the ACK/NACK transmission) timing indicator.

In an example, the wireless device may stop monitoring the downlink channel (e.g., stopping the first response window) based on receiving, by the wireless device, at least one response, e.g., a PDCCH addressed to the C-RNTI and/or a PDCCH addressed to the MSG-RNTI. The wireless device may determine that a contention resolution being successful based on one or more conditions. For example, the wireless device may determine that a contention resolution being successful based on detecting a PDCCH addressed to the C-RNTI, included in the MsgA, where indicating a PDSCH (e.g., via a downlink assignment of a DCI) comprising a TA command. For example, the wireless device may determine that a contention resolution being successful based on determining that a PDCCH addressed to the C-RNTI included in the MsgA being detected, indicating a PDSCH (e.g., via a downlink assignment of a DCI) comprising an UL grant (e.g., if the wireless device is already synchronized). The PDCCH addressed to the C-RNTI may be an indication of a success response. In an example, the wireless device may consider (or determine) that the two-step RA procedure being successfully completed based on one or more conditions. At least one of the one or more conditions may be that the MsgB being comprised of a preamble index (or identifier) matching to the MsgA preamble that the wireless device transmitted to the base station. At least one of the one or more conditions may be that the MsgB being comprised and/or indicated a contention resolution identifier matched to the identifier that the wireless device transmitted to the base station for the contention resolution. In an example, the wireless device may determine that the ongoing two-step RA procedure successfully completed based on detecting a PDCCH addressed to the C-RNTI, included in the MsgA, where indicating a PDSCH (e.g., via a downlink assignment of a DCI) comprising a TA command.

In an example, the wireless device may successfully receive (and/or detect) the PDCCH addressed to the C-RNTI that wireless device transmitted to the base station but may fail to decode the PDSCH received based on the downlink assignment. The problem in this case is that the wireless device may not transmit a negative acknowledgement (NACK) (e.g., NACK indication using UCI) to the base station in response to determining that the wireless device may not have a valid TA value available for the transmission of the NACK. For example, the wireless device may not transmit a NACK indicating (e.g., using UCI) the reception of the PDSCH to the base station is response to a TA timer of the wireless device being expired. The TA timer of the wireless device may start (or restart) after or in response to receiving a TA command prior to the transmission of the MsgA. The wireless device may not transmit a NACK indication (e.g., using UCI) of a reception of the PDSCH to the base station, if no TA value has been received or the TA timer (e.g., tiemAlignmentTimer) not being running or expired. This may be a case that the wireless device cannot transmit a transport block (or packet, PUSCH) or a control signal (e.g., UCI and/or PUCCH) to the base station after or in response to determining (or identifying), based on detecting a PDCCH addressed to C-RNTI, that a contention resolution being successful (or the base station received MsgA successfully).

For example, the wireless device may monitor a PDCCH addressed to the MSGB-RNTI for a failure (or fallback) response to the MsgA preamble, e.g., when the wireless device only transmits the MsgA preamble, when the base station fails to decode the MsgA payload, and/or when the base station fails to detect the MsgA preamble. In an example, the response to the MsgA preamble may comprise an explicit or implicit indicator that indicates a fallback RAR (e.g., the fallbackRAR MAC subPDU). The PDCCH (e.g., DCI with a downlink assignment) may comprise a downlink assignment based on which the wireless device may be scheduled a PDSCH comprising the fallback response. The PDSCH may comprise one or more responses. The wireless device may identify a response from the one or more responses based on one or more identifiers. For example, the wireless device may identify a response from the one or more responses based on determining that an identifier of the response being matched to a preamble index of the MsgA preamble.

In an example, the wireless device may stop monitoring for detecting a PDCCH addressed to the C-RNTI in response to receiving during the first response window, by the wireless device, a fallback response. In this case, the contention resolution may not be successful, and the wireless device may fall back to Msg 3 transmission based on fallback operation. The fallback response may comprise an UL grant indicating uplink radio resource(s) where the wireless device may use to transmit the Msg 3 based on the fallback operation. The wireless device may determine that the MsgB reception being failed in response to neither receiving the fallback response nor detecting a PDCCH addressed C-RNTI within the first response window. The wireless device, in this case, may perform a back off operation based on the backoff indicator in response to receiving the backoff indicator via the MsgB.

In an example, based on determining that the MsgB comprises the fallbackRAR MAC subPDU and the Random Access Preamble (RAP) matches the preamble index (e.g., PREAMBLE_INDEX), the wireless device may consider the RAR reception successful. In an example, if the serving cell is the SpCell, the wireless device may perform the following: process the received timing advance command (e.g., TAC MAC CE), indicate the msgA-PreambleReceivedTargetPower and the amount of power ramping applied to the latest RAP transmission to the lower layers (e.g., the physical layer). In an example, when the MsgA preamble was not selected by the MAC entity among the CBRA Preamble(s), the wireless device may consider the ongoing 2-step RA procedure successfully completed. In an example, the wireless device may an UL grant for transmission of Msg3 and indicate it to the lower layers (e.g., physical layer). In another example, based on determining that the MsgB comprises the fallbackRAR MAC subPDU and the Random Access Preamble (RAP) was selected by the MAC entity among the CBRA Preamble(s), the wireless device may consider the contention resolution successful.

Figure 22:
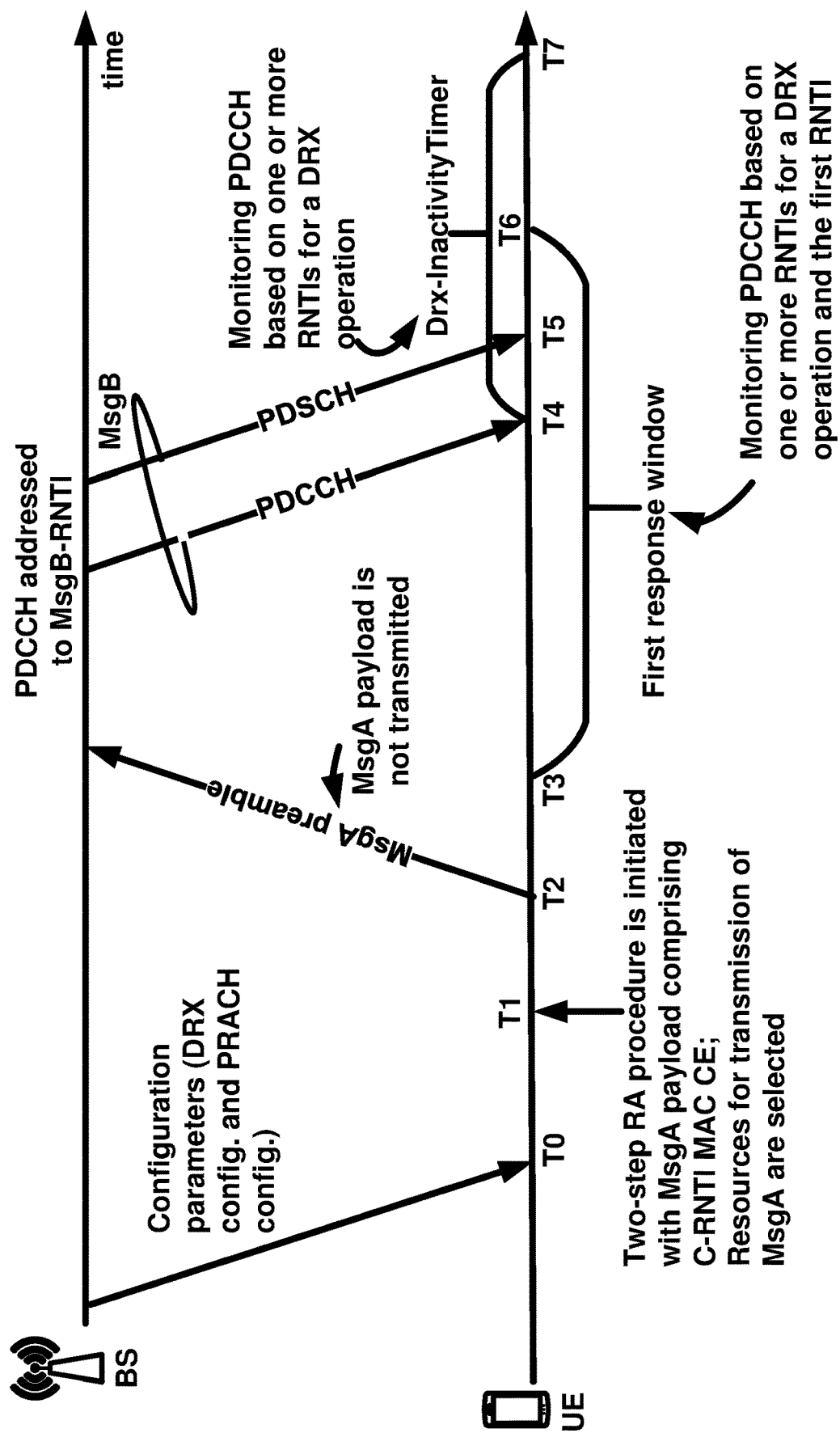
FIG. 22 shows an example of DRX operation during a two-step RA procedure performed between a wireless device and a base station.

FIG. 22 shows an example of DRX operation during a two-step RA procedure performed between a wireless device and a base station. The wireless device may communicate with the base station in a serving cell. As shown in FIG. 22, the wireless device may receive at time T0 from the base station one or more configuration parameters (e.g., the one or more RRC configuration parameters). For example, the one or more configuration parameters may comprise the one or more RACH configuration parameters, the one or more DRX configuration parameters, and PDCCH-ConfigCommon.

The one or more DRX configuration parameters may configure the wireless device with a DRX operation (or functionality). The wireless device may use the DRX operation when communicating with the base station in the serving cell. In an example, the serving cell may be assigned (or belong) to a DRX group. The MAC entity of the wireless device, based on the DRX operation being configured, may control PDCCH monitoring activity. For example, based on determining the wireless device in the active time (or the Active Time) for the serving cell in the DRX group, the wireless device may monitor one or more PDCCH candidates for (or addressed to) the at least one RNTI. For example, the at least one RNTI may comprise one or more of the C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

For example, the one or more configuration parameters may comprise one or more configuration parameters for configuring a master cell group or one or more secondary cell groups (e.g., via an IE CellGroupConfig). For example, the one or more configuration parameters may indicate physicalCellGroupConfig configuration parameters. For example, the one or more configuration parameters (e.g., via the physicalCellGroupConfig) may indicate DCP-Config-r16. When the DRX operation is configured, the DCP-Config-r16 may indicate one or more configuration parameters for detecting a DCI format 2_6.

In an example, the wireless device may receive the C-RNTI via one or more previous transmissions (e.g., a Msg4 1314 or a MsgB 1332 via an initial access). For example, based on the C-RNTI being received by the wireless device from the one or more previous transmissions, the C-RNTI may be available/maintained at the wireless device. In an example, when the wireless device may be in an RRC_CONNECTED state, the C-RNTI may be available/maintained at the wireless device.

At time T1 the wireless device may trigger an RA procedure. For example, the RA procedure may be triggered by the higher layers (e.g., the MAC layer) of the wireless device. For example, the wireless device may trigger the RA procedure based on a PDCCH order. In an example, the RA procedure may be a contention based random access procedure. In an example, the RA procedure may be a contention free random access procedure.

In response to the triggered RA procedure, the wireless device may initiate the RA procedure 2010. Prior to performing the initiated RA procedure, the wireless device may, following the procedure discussed in FIG. 20, select a carrier (SUL or NUL), select the type of the triggered RA procedure (2-step RA type or 4-step RA type), and initialize the one or more RA parameters/variables specific to the selected RA type. In the example shown in FIG. 22, it is assumed that the wireless device is selected the two-step RA type (e.g., RA_TYPE=2-stepRA), for example, based on an RSRP threshold.

The wireless device, following the RA resource selection procedure 2110, may select one or more resources for performing the two-step RA procedure at time T1 in FIG. 22. The RA resource selection procedure may comprise at least a valid PRACH resource/occasion (RO) and a MsgA PUSCH resource/occasion (PO) mapped to the valid RO for a MsgA 1331 (e.g., a message A) transmission. In an example, the one or more resources may comprise at least one of the following: an SSB index, a RAPs group, a preamble index, the valid RO, and the MsgA PO with an associated DMRS resource. For example, the wireless device may compute a first RNTI based on the RO. For example, the first RNTI may be the MSGB-RNTI. The wireless device may use the one or more resources (e.g., the valid RO and the MsgA PO) for transmitting the MsgA with respect to the ongoing two-step RA procedure.

As shown in FIG. 22, the MsgA may comprise a C-RNTI MAC CE. For example, for the ongoing two-step RA procedure, based on determining that it is the first time that the wireless device is transmitting the MsgA, the Multiplexing an assembly entity of the wireless device may include the C-RNTI MAC CE in the MsgA payload. In an example, in response to determining that the transmission of the MsgA is not for a CCCH logical channel (e.g., the MsgA payload does not contain a CCCH PDU), the Multiplexing an assembly entity of the wireless device may include the C-RNTI MAC CE in the MsgA payload. In an example, based on determining the C-RNTI being available/maintained at the wireless device, the Multiplexing an assembly entity of the wireless device may include the C-RNTI MAC CE in the MsgA payload.

As shown in FIG. 22, the wireless device may transmit a MsgA preamble using the valid RO at time T2. In an example, the wireless device may not transmit the MsgA payload (at time T3 in FIG. 22). For example, the wireless device may not transmit the MsgA payload based on determining that the MsgA PO is invalidated/invalid. For example, the one or more PUSCH invalidity rules may indicate the MsgA PO is invalid/invalidated. For example, in response to determining the MsgA PO is invalid/invalidated, the wireless device may transmit the MsgA preamble. In another example, the wireless device may determine that the MsgA PO is valid/validated. Based on the MsgA PO being validated/valid, the wireless device may cancel the transmission of the MsgA payload due to the one or more PUSCH transmission cancelation rules.

As shown in FIG. 22, based on the MsgA preamble being transmitted and the MsgA payload not being transmitted (e.g., due to the MsgA PO being invalidated/invalid or the transmission of the MsgA payload being canceled), the wireless device may start a first response window. The first response window may start at/in the first/starting/initial/next symbol of the earliest CORESET the wireless device is configured (e.g., via ra-SearchSpace in PDCCH-Config-Common) to receive PDCCH for Type1-PDCCH CSS set. For example, based on determining the MsgA PO being invalidated/invalid, the first symbol of the earliest CORESET may be at least one symbol after the last/ending symbol of the RO corresponding to the MsgA preamble transmission. In another example, based on determining the MsgA PO being validated/valid and the transmission of the MsgA payload being canceled, the first symbol of the earliest CORESET may be at least one symbol after the last/ending symbol of the MsgA PO corresponding to the MsgA payload. For example, the symbol duration of the first symbol of the earliest CORSET may be based on a symbol duration corresponding to the SCS for Type1-PDCCH CSS set.

In an example, the wireless device may delay the start of the first response window by a first offset. For example, the base station may configure the wireless device with the first offset (e.g., via the one or more configuration parameters and/or a broadcast system information). According to an example, the value of the first offset may be based on a propagation delay between the wireless device and the base station, for example, when the serving cell is large (e.g., with the cell radius of 250 km to 3500 km). In an example, when the wireless device communicates with the base station via a non-terrestrial network (NTN), the first offset may be based on the propagation delay between the wireless device and an NTN node (e.g., a GEO satellite or a LEO satellite for a high-altitude platform station). In an example, the first offset may indicate a portion of the propagation delay between the wireless device and the base station that the wireless device pre-compensates. In an example, the wireless device may delay the start of the first response window by a timing advance (TA) value. For example, the TA value may be calculated based on the first offset and one or more TAC MAC CEs. In an example, the TA value may be calculated based on the propagation delay between the wireless device and the base station (or the NTN node) and the one or more TA MAC CEs.

For example, the first offset may be indicated based on a first numerology. For example, the wireless device may be configured/indicated by the numerology of the first offset. In another example, the wireless device may implicitly determine the numerology of the first offset based on the numerology of the active DL (or UL) BWP and/or the numerology of the preamble. The first offset may be indicated in number of slots or in number of symbols. For example, the first offset may be indicated in milliseconds or microseconds.

In an example, the length of the first response window in number of slots (e.g., based on the SCS for Type1-PDCCH CSS set) may be indicated via the one or more RACH configuration parameters (e.g., the msgB-ResponseWindow). According to an example, the wireless device may extend the value range (or the length) of the first response window by a second offset. For example, the wireless device may first determine the value range of the second offset (in the number of slots) based on the numerology of the second offset and/or the numerology of the msgB-ResponseWindow. The wireless device may determine the value range of the first response window by adding the second offset (in the number of slots) and the msgB-Response Window (in the number of slots).

In an example, the second offset may be based on the propagation delay (or a portion of) the propagation delay between the wireless device and the base station. For example, the second offset may be the first offset. For example, the one or more configuration parameters may indicate/configure the second offset. In an example, when the wireless device communicates with the base station via the NTN, the second offset may be based on a differential delay of the service cell (e.g., a difference between a maximum propagation delay of the serving cell and a minimum propagation delay of the serving cell). In an example, when the serving cell is large (e.g., with the cell radius of 250 km to 3500 km), the second offset may be based on the differential delay of the serving cell.

When the wireless device uses the DRX operation, the wireless device may determine that the wireless device is in the active time of the serving cell in the DRX group during/while the first response window is running. In an example, during/while the first response window is running, the wireless device may monitor the one or more PDCCH candidates for (or addressed to) the at least one RNTI. For example, the wireless device may monitor the one or more PDCCH candidates based on the DRX operation (e.g., monitoring the one or more PDCCH candidates for the at least one RNTI). In an example, during the first response window is running, the wireless device may monitor the one or more PDCCH candidates for (or addressed to) the first RNTI and the at least one RNTI.

In an example shown in FIG. 22, in response to detecting the MsgA preamble, the base station may transmit a MsgB. For example, the MsgB may comprise a PDCCH addressed to the first RNTI and a downlink assignment (e.g., a PDSCH) indicated by the PDCCH. For example, the downlink assignment may comprise a contention resolution message. During/while the first response window is running, the wireless device may monitor the one or more PDCCH candidates to receive the contention resolution message. As shown in FIG. 22, the wireless device may receive the PDCCH addressed to the first RNTI at time T4.

As shown in FIG. 22, the PDCCH may indicate a valid downlink assignment (the PDSCH) at time T5. For example, the wireless device may successfully decode a transport block received via the valid downlink assignment. The decoded transport block may comprise a MAC subPDU comprising a backoff indicator (BI). For example, the decoded transport block may comprise a failure (or fallback) response to the MsgA preamble (e.g., the fallbackRAR MAC subPDU). For example, the successfully decoded transport block may comprise a MAC subPDU comprising a RAP identifier. The RAP identifier may match to a preamble index of the transmitted MsgA preamble (e.g., PREAMBLE_INDEX). In response to receiving the fallbackRAR MAC subPDU the wireless device may stop the first response window. In another example, the RAP identifier may not match the preamble index of the transmitted MsgA preamble. According to an example, the decoded transport block may comprise a successRAR MAC subPDU.

In an example, the wireless device may not be able to successfully decode the valid downlink assignment. For example, the wireless device may monitor the one or more PDCCH candidates until the expiry of the first response window based on determining the valid downlink assignment and/or the fallbackRAR MAC subPDU is not received. For example, the wireless device may monitor the one or more PDCCH candidates until the expiry of the first response window based on not receiving the PDCCH and/or the valid downlink assignment.

As shown in FIG. 22, when the wireless device is configured with the DRX operation, based on receiving the PDCCH at time T4 indicating the downlink assignment, the wireless device may start the DRX inactivity timer (e.g., the drx-InactivityTimer) of the DRX group. While the DRX inactivity timer of the DRX group is running, the wireless device may monitor the one or more PDCCH candidates based on the DRX operation. For example, the wireless device may monitor the one or more PDCCH candidates for the at least one RNTI.

As shown in FIG. 22 and discussed above the wireless device may initiate a two-step random access (RA) procedure in/for/via a serving cell 2010. The wireless device may select one or more resources 2110 for performing the two-step RA procedure via transmitting a MsgA 1331. The MsgA may comprise a MsgA preamble 1341 and a MsgA payload 1342. The MsgA payload may comprise the C-RNTI MAC CE. The one or more resources may comprise at least a valid PRACH occasion (RO) and a MsgA PUSCH occasion (PO) that is mapped to the valid RO.

In existing technologies, a transmission of the MsgA 1331 may comprise transmitting the MsgA preamble via the valid RO. For example, the wireless device may not transmit the MsgA payload 1342 via the MsgA PO, e.g., based on the MsgA PO being invalidated/invalid or the transmission of the MsgA payload being canceled. Based on the MsgA preamble being transmitted, the wireless device may start the first response window (e.g., the msgB-ResponseWindow). When the wireless device is configured with the DRX operation (e.g., by the one or more configuration parameters), the wireless device may determine the first response window as the active time for the serving cell in the DRX group. For example, during/within the first response window, the wireless device may monitor the one or more PDCCH candidates for (or addressed to) the least one RNTI and the first RNTI (e.g., the MSGB-RNTI).

In existing technologies, during/within the first response window, the wireless device may receive a PDCCH indicating a new DL transmission. For example, the PDCCH may be addressed to the first RNTI. The wireless device may, based on the PDCCH, start the DRX inactivity timer of the DRX group. For example, while the DRX inactivity timer is running, the wireless device may monitor the one or more PDCCH candidates for the at least one RNTI. The active time for the serving cell may comprise a time duration that the DRX inactivity timer is running.

In the implementation of the existing technologies, when the DRX operation is configured, during/while the first response window is running and based on the MsgA payload not being transmitted, the wireless device may unnecessarily increase its consumed power and/or processing complexity for monitoring PDCCH (e.g., monitoring for at least one RNTI and/or at least one DCI format). For example, the base station may not, based on not receiving the MsgA payload, be able to identify the wireless device. The base station may not, based on not being able to identify the wireless device, determine whether the wireless device is in the active time or not. In existing technologies, when DRX operation is configured, during/while the first response window is running and the MsgA payload not being transmitted, the wireless device may unnecessarily start the DRX inactivity timer of the DRX group in response to receiving the PDCCH. For example, the base station may not, based on not being able to identify the wireless device, determine whether the wireless device has started the DRX inactivity timer or not in response to receiving the PDCCH. Based on existing technologies, the wireless device may unnecessarily increase its consumed power and/or processing complexity for monitoring PDCCH while the DRX inactivity timer of the DRX group is running.

In the implementation of the existing technologies, the wireless device may require retransmitting the MsgA one or more times, for example, when the base station is unable to detect the MsgA preamble and/or when the wireless device fails to decode the MsgB. When the DRX operation is configured, the consumed power of the wireless device for monitoring PDCCH during the first response window after each retransmission of the MsgA may increase. Based on existing technologies, the power consumption of the wireless device for performing random access may increase.

In existing technologies, when the wireless device is communicating with the base station via an NTN node and/or when the serving cell is large (e.g., a cell/beam with radius of, for example, 250 km to 3500 km), the wireless device may be required to extend the value range of the first response window, e.g., based on the differential delay of the serving cell or based on a portion of the propagation delay between the wireless device and the base station. Based on existing technologies, when the DRX operation is configured and the wireless device is communicating with the base station via an NTN node, the consumed power (and/or the processing complexity) of the wireless device for monitoring PDCCH during the first response window may increase.

For the wireless device configured with the DRX operation performing the two-step RA procedure, enhancements may be required to reduce the power consumption of the wireless device and/or to reduce the processing complexity of the wireless device.

According to embodiments of the present disclosure, when the DRX operation is configured, during/while the first response window is running and based on the MsgA payload not being transmitted, the wireless device may not monitor the one or more PDCCH candidates for (addressed to) the at least one RNTI (e.g., for the DRX operation). The MsgA payload may comprise the C-RNTI MAC CE (e.g., the transmission of the MsgA may not be for a CCCH logical channel). For example, the C-RNTI may be available/maintained at the wireless device. For example, the wireless device may be in an RRC connected state. In an example embodiment, when the DRX operation is configured, the wireless device may not, based on the MsgA payload not being transmitted, determine that the first response window is not the active time of the serving cell in the DRX group (e.g., the active time does not comprise the first response window). In an example embodiment, when the DRX operation is configured, based on the MsgA payload not being transmitted, the first response window may occur outside of the active time of the serving cell in the DRX group (e.g., during the off duration of the DRX operation). In an example embodiment, the wireless device may, based on the MsgA payload not being transmitted, monitor the one or more PDCCH candidates for at most the first RNTI. In an example embodiment, the wireless device may, based on the MsgA payload not being transmitted and the PS-RNTI being indicated/configured, monitor the one or more PDCCH candidates for the first RNTI and the PS-RNTI. For example, the one or more DRX configuration parameters may indicate/configure the PS-RNTI. In an example embodiment, when the DRX operation is configured, in response to receiving the PDCCH indicating the new transmission (e.g., a new DL transmission) during/while the first response window is running and the MsgA payload not being transmitted, the wireless device may not start the DRX inactivity timer of the DRX group.

Example embodiments may reduce the consumed power of the wireless device and/or reduce the processing complexity of the wireless device for performing the two-step RA procedure. For example, the power consumption of the wireless device for monitoring the one or more PDCCH candidates, during/while the first response window is running, may be reduced. For example, the processing complexity of the wireless device may be reduced by not monitoring the one or more PDCCH candidates for the at least one RNTI and/or one or more DCI formats (e.g., the DCI formats of 2_0, 2_1, 2_2, 2_3, 2_4, and/or 2_5). For example, when the wireless device communicates with the base station via an NTN node and/or when the value range of the first response window is extended, the example embodiments may reduce the consumed power (and/or the processing complexity) of the wireless device for performing the two-step RA procedure. In another example, when the wireless device transmits/retransmits the MsgA several times, the example embodiments may allow the wireless device to reduce its power consumption and/or processing complexity for performing the RA procedure.

Figure 23:
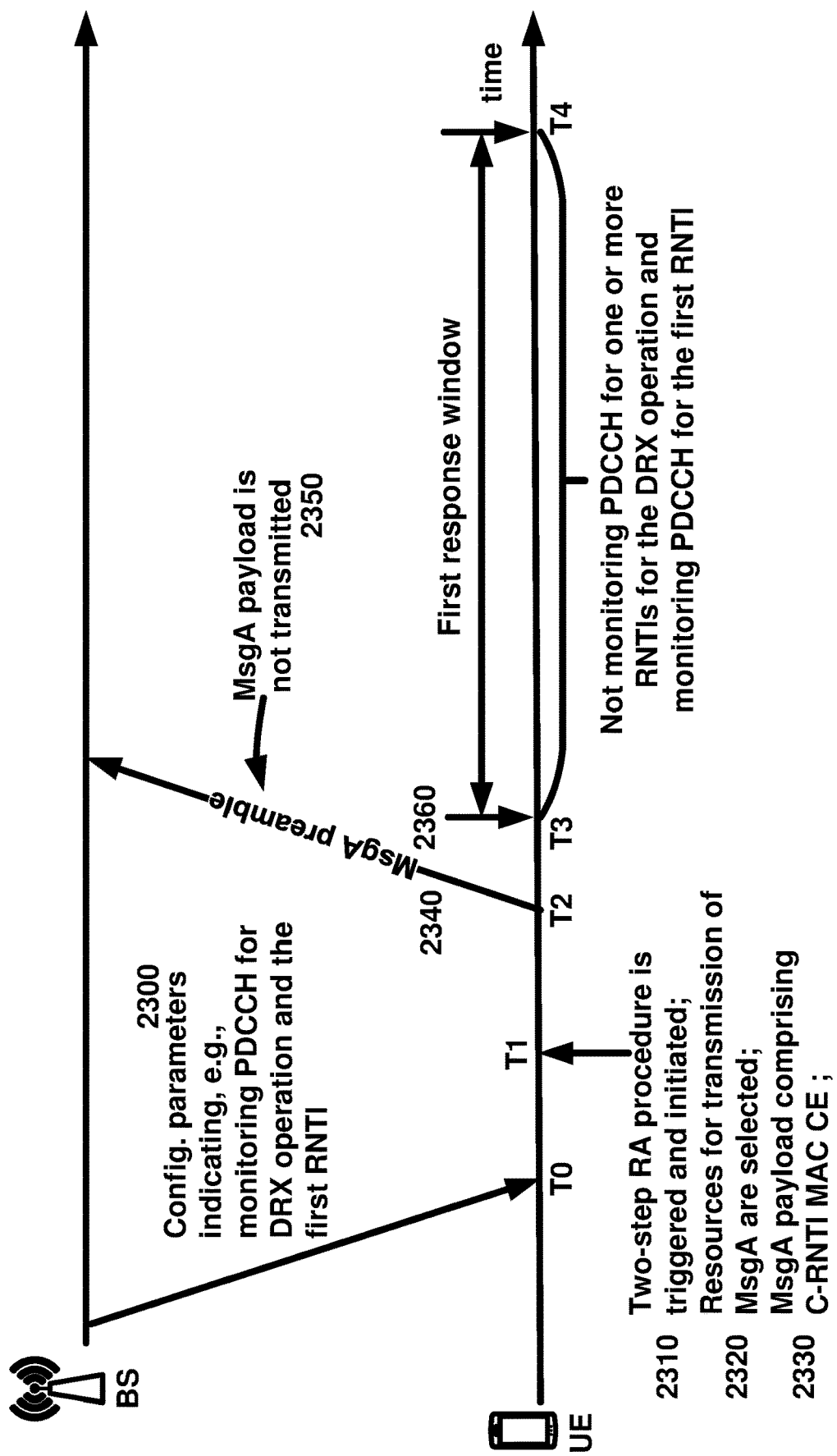
FIG. 23 is an example embodiment of a DRX operation during a two-step RA procedure performed between a wireless device and a base station in a serving cell.

FIG. 23 is an example embodiment of a DRX operation during a two-step RA procedure performed between a wireless device and a base station in a serving cell. The wireless device may receive at time T0, from the base station, the one or more configuration parameters 2300. The one or more configuration parameters may indicate/configure monitoring one or more PDCCH candidates, by the wireless device, for the at least one RNTI for a DRX operation. For example, the one or more configuration parameters may comprise the one or more DRX configuration parameters. The one or more DRX configuration parameters may configure the wireless device with the DRX operation (or functionality). The wireless device may use the DRX operation when communicating with the base station in the serving cell.

For example, the one or more configuration parameters may indicate/configure monitoring the one or more PDCCH candidates, by the wireless device, for a first RNTI. For example, the first RNTI may be the MSGB-RNTI. In an example, the one or more configuration parameters may comprise PDCCH-ConfigCommon. The PDCCH-ConfigCommon may indicate/configure the Type1-PDCCH CSS set via ra-SearchSpace for monitoring the one or more PDCCH candidates for the first RNTI. For example, the wireless device may, based on the Type1-PDCCH CSS set being provided/configured/indicated, monitor for a DCI format with CRC scrambled by the first RNTI.

In an example, the one or more configuration parameters may comprise the one or more RACH configuration parameters.

As FIG. 23 shows, at time T1 the wireless device may trigger an RA procedure 2310. In response to the triggered RA procedure, the wireless device may initiate the RA procedure 2010. Prior to performing the initiated RA procedure, the wireless device may, following the procedure discussed in FIG. 20, select a carrier (SUL or NUL), select the type of the triggered RA procedure (2-step RA type or 4-step RA type), and/or initialize the one or more RA parameters/variables specific to the selected RA type. In the example shown in FIG. 23, the wireless device selects the two-step RA type (e.g., RA_TYPE=2-stepRA), for example, based on an RSRP threshold. For example, the RSRP threshold may be indicated/configured via the one or more RACH configuration parameters.

The wireless device, following the RA resource selection procedure 2110, may select one or more resources for performing the two-step RA procedure 2320. In an example, the one or more resources may comprise at least one of the following: an SSB index, a RAPs group, a preamble index, a valid PRACH resource/occasion (RO), and a MsgA PUSCH resource/occasion (PO) with an associated DMRS resource that is mapped to the valid RO. For example, the wireless device may calculate/compute the first RNTI (e.g., the MSGB-RNTI) based on the valid RO. The wireless device may use the valid RO and the MsgA PO for transmitting a MsgA 1331 with respect to the two-step RA procedure.

As shown in FIG. 23, the MsgA may comprise the C-RNTI MAC CE 2330. For example, the C-RNTI may be received, from the base station, via the one or more previous transmissions. Based on the C-RNTI being received, the C-RNTI may be available/maintained at the wireless device. For example, when the wireless device is in an RRC_CONNECTED state, the C-RNTI may be maintained/available at the wireless device.

As shown in FIG. 23, using/via the valid RO, at time T2 the wireless device may transmit a MsgA preamble corresponding to the preamble index 2340. In an example and as shown in FIG. 23, the wireless device may not transmit the MsgA payload. For example, the wireless device may not transmit the MsgA payload based on determining that the MsgA PO is invalidated/invalid (e.g., based on the one or more PUSCH invalidity rules). For example, in response to the MsgA PO being invalid/invalidated, the wireless device may transmit the MsgA preamble and may not transmit the MsgA payload.

According to an example, the wireless device may determine that the MsgA PO is valid/validated. Based on the MsgA PO being validated/valid, the wireless device may cancel the transmission of the MsgA payload (e.g., based on the one or more PUSCH transmission cancelation rules). The wireless device may, based on the MsgA payload transmission being cancelled, refrain from transmitting the MsgA payload. For example, based on the MsgA payload transmission being cancelled, the wireless device may not transmit the MsgA payload.

As shown in FIG. 23, based on the MsgA preamble being transmitted, the wireless device may start the first response window 2360 (at time T3). For example, based on the MsgA preamble being transmitted and the MsgA payload not being transmitted, the wireless device may start the first response window. For example, the first response window may be started, by the wireless device, at least at/in the first/starting/next/initial symbol after the last/ending symbol of the valid RO based on the MsgA PO being invalidated/invalid. For example, the first response window may be started, by the wireless device, at least at/in the first/starting/next/initial symbol after the last/ending symbol of the MsgA PO based on the transmission of the MsgA payload being cancelled. In an example, the first response window may start at the first symbol of the earliest CORESET the wireless device is configured (e.g., via ra-SearchSpace in the PDCCH-Config-Common) to receive PDCCH for Type1-PDCCH CSS set. For example, based on determining the MsgA PO being invalidated/invalid, the first/starting/next/initial symbol of the earliest CORESET may be at least one symbol after the last/ending symbol of the RO corresponding to the MsgA preamble transmission. In an example, based on determining the MsgA PO being validated/valid and the MsgA payload not being transmitted, the first/starting/next/initial symbol of the earliest CORESET may be at least one symbol after the last/ending symbol of the MsgA PO corresponding to the MsgA payload.

In an example, the wireless device may delay the start of the first response window by the first offset (e.g., when the wireless device communicates with the base station via the NTN). For example, based on determining the MsgA PO being invalidated/invalid, the first/initial/starting/next symbol of the earliest CORESET may be at least N symbols after the last/ending symbol of the RO corresponding to the MsgA preamble transmission. In an example, the first/initial/starting/next symbol of the earliest CORESET may be at least N symbols after the last/ending symbol of the MsgA PO corresponding to the MsgA payload based on determining the MsgA PO being validated/valid and the MsgA payload not being transmitted.

For example, parameter N may be based on the first offset. In an example, the first offset may be indicated/configured based on a first numerology. For example, the first numerology may be the same as the numerology of the preamble. For example, the first numerology may be different than the numerology of the preamble. In an example, the first numerology may be the numerology of an initial BWP or an active BWP (e.g., an active DL BWP or an active UL BWP). In an example, the first numerology may be based on the numerology of a broadcast system information (e.g., SIB1). For example, the wireless device may calculate/compute parameter N based on the value range of the first offset, the numerology of the preamble (or the numerology of the active BWP) and the first numerology. In an example, parameter N may be based on the TA value of the wireless device. For example, the wireless device may calculate/compute parameter N based on the value range of the TA value and the numerology of the preamble (or the numerology of the active BWP).

In an example, the length of the first response window may be in number of slots. The length of the first response window may be determined based on the SCS for Type1-PDCCH CSS set. The length of the first response window may be indicated (e.g., provided) via the one or more RACH configuration parameters (e.g., the msgB-ResponseWindow). According to an example, the wireless device may extend the value range (or the length) of the first response window by the second offset. For example, the wireless device may determine the value range of the first response window by adding the second offset (in the number of slots) and the msgB-Response Window. For example, the one or more configuration parameters may indicate/configure the second offset. For example, the second offset may be based on the propagation delay between the wireless device and the base station in the serving cell. In an example, when the wireless device communicates with the base station via a non-terrestrial network (NTN), the second offset may be based on a differential delay of the service cell (e.g., a difference between a maximum propagation delay of the serving cell and a minimum propagation delay of the serving cell).

In an example embodiment, during/while the first response window is running and based on the MsgA payload not being transmitted, the wireless device may not monitor the one or more PDCCH candidates for (or addressed to) the at least one RNTI (e.g., for DRX operation). As shown in FIG. 23, during/while the first response window is running and based on the MsgA payload not being transmitted, the wireless device may monitor the one or more PDCCH candidates for (or addressed to) the first RNTI and may not monitor the one or more PDCCH candidates for (or addressed to) the at least one RNTI.

In an example embodiment, during/while the first response window is running, the wireless device may not monitor the one or more PDCCH candidates for the at least one RNTI based on the MsgA payload not being transmitted and the C-RNTI MAC CE being included in the MsgA payload.

For example, during/while the first response window is running, the wireless device may not monitor the one or more PDCCH candidates for the at least one RNTI based on the C-RNTI being available/maintained at the wireless device.

For example, during/while the first response window is running, the wireless device may not monitor the one or more PDCCH candidates for the at least one RNTI based on the transmission of the MsgA not being for a CCCH logical channel.

For example, during/while the first response window is running, the wireless device may not monitor the one or more PDCCH candidates for the at least one RNTI based on the wireless device being in the RRC_CONNECTED state.

In an example, during/while the first response window is running, the wireless device may not monitor the one or more PDCCH candidates for the DRX operation based on the C-RNTI MAC CE being included in the MsgA payload.

For example, during/while the first response window is running, the wireless device may not monitor the one or more PDCCH candidates for the DRX operation based on the C-RNTI being available/maintained at the wireless device.

For example, during/while the first response window is running, the wireless device may not monitor the one or more PDCCH candidates for the DRX operation based on the transmission of the MsgA not being for the CCCH logical channel.

For example, during/while the first response window is running, the wireless device may not monitor the one or more PDCCH candidates for the DRX operation based on the wireless device being in the RRC_CONNECTED state.

In an example, during/while the first response window is running, the wireless device may monitor the one or more PDCCH candidates for at most the first RNTI based on the MsgA payload not being transmitted.

For example, during/while the first response window is running, the wireless device may monitor the one or more PDCCH candidates for at most the first RNTI based on the MsgA payload not being transmitted and the C-RNTI MAC CE being included in the MsgA payload.

For example, during/while the first response window is running, the wireless device may monitor the one or more PDCCH candidates for at most the first RNTI based on the C-RNTI being available/maintained at the wireless device.

According to an example, during/while the first response window is running, the wireless device may monitor the one or more PDCCH candidates for at most the first RNTI based on the transmission of the MsgA not being for the CCCH logical channel.

According to an example, during/while the first response window is running, the wireless device may monitor the one or more PDCCH candidates for at most the first RNTI based on the wireless device being in the RRC_CONNECTED state.

In an example embodiment, during/while the first response window is running, based on the MsgA payload not being transmitted and the C-RNTI MAC CE being included in the MsgA payload, the wireless device may monitor the one or more PDCCH candidates for the first RNTI and may not monitor the one or more PDCCH candidates for the C-RNTI.

In an example, during/while the first response window is running, based on the C-RNTI being maintained/available at the wireless device, the wireless device may monitor the one or more PDCCH candidates for the first RNTI and may not monitor the one or more PDCCH candidates for the C-RNTI.

For example, during/while the first response window is running, based on the transmission of the MsgA not being for the CCCH logical channel, the wireless device may monitor the one or more PDCCH candidates for the first RNTI and may not monitor the one or more PDCCH candidates for the C-RNTI.

In an example, during/while the first response window is running, based on the wireless device is in an RRC_CONNECTED state, the wireless device may monitor the one or more PDCCH candidates for the first RNTI and may not monitor the one or more PDCCH candidates for the C-RNTI.

An advantage of not monitoring PDCCH, based on the MsgA payload not being transmitted, for the one or more RNTIs (e.g., based on the DRX operation) may be a reduction of the power consumption and/or a reduction of processing complexity of the wireless device.

For example, when the value range of the first response window is extended by the second offset, by not monitoring PDCCH for the one or more RNTIs for the DRX operation, the wireless device may reduce its consumed power for monitoring PDCCH and/or reduce its processing complexity for monitoring PDCCH.

Figure 24:
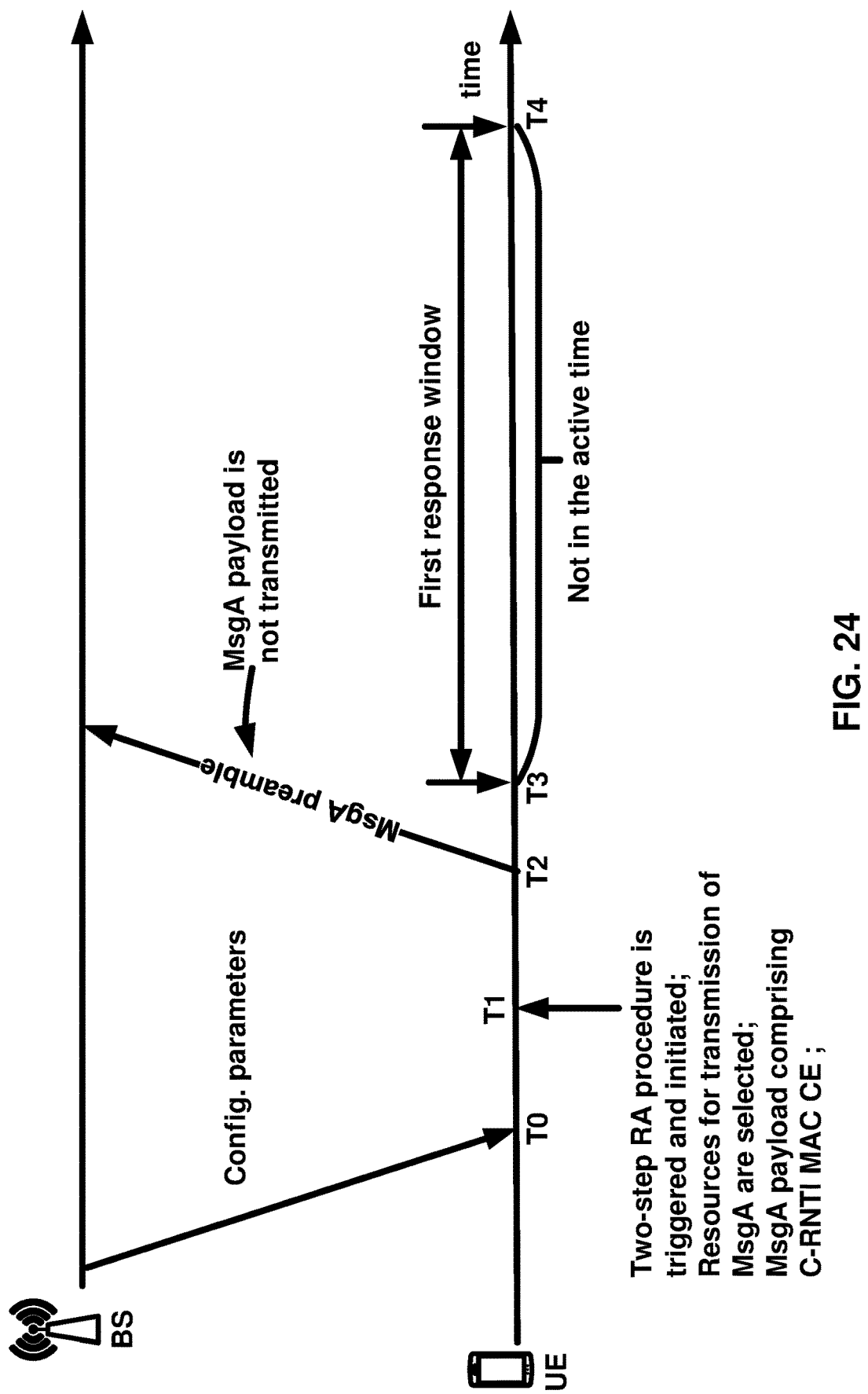
FIG. 24 is an example embodiment of a DRX operation during a two-step RA procedure performed between a wireless device and a base station in a serving cell.

FIG. 24 is an example embodiment of a DRX operation during a two-step RA procedure performed between a wireless device and a base station in a serving cell. The wireless device may receive at time T0 from the base station the one or more configuration parameters 2300. For example, the one or more configuration parameters may comprise the one or more RACH configuration parameters, the one or more DRX configuration parameters, and/or the PDCCH-Config-Common.

As FIG. 24 shows, at time T1 the wireless device may trigger an RA procedure 2320. In response to the triggered RA procedure, the wireless device may initiate the RA procedure 2010. In the example shown in FIG. 24, the wireless device selects the two-step RA type (e.g., RA_TYPE=2-stepRA). The wireless device, following the RA resource selection procedure 2110, may select one or more resources for performing the two-step RA procedure 2330. For example, the RA resource selection procedure may comprise at least the valid RO and the MsgA PO mapped to the valid RO for the MsgA 1331 transmission. As shown in FIG. 24, the MsgA may comprise the C-RNTI MAC CE 2310. As shown in FIG. 24, using/via the valid RO, at time T2 the wireless device may transmit a MsgA preamble corresponding to the preamble index 2340 (e.g., the MsgA payload not being transmitted 2350). As shown in FIG. 24, based on the MsgA preamble being transmitted and the MsgA payload not being transmitted, the wireless device may start the first response window 2360 at time T3.

In an example embodiment, during/while the first response window is running and based on the MsgA payload not being transmitted, the wireless device may not be in the active time (e.g., the active time of the serving cell in the DRX group). In an example, based on the MsgA payload not being transmitted, the active time of the serving cell in the DRX group may not comprise the first response window.

According to an example, during/while the first response window is running, the wireless device may not be in the active time of the serving cell in the DRX group based on the C-RNTI MAC CE being included in the MsgA payload. In an example, based on the C-RNTI MAC CE being included in the MsgA payload, the active time of the serving cell in the DRX group may not comprise the first response window.

According to an example, during/while the first response window is running, the wireless device may not be in the active time of the serving cell in the DRX group based on the C-RNTI being available/maintained at the wireless device. For example, based on the C-RNTI being available/maintained at the wireless device, the active time of the serving cell in the DRX group may not comprise the first response window.

According to an example, during/while the first response window is running, the wireless device may not be in the active time of the serving cell in the DRX group based on wireless device being in an RRC_CONNECTED state. For example, based on the wireless device being in an RRC_CONNECTED state, the active time of the serving cell in the DRX group may not comprise the first response window.

According to an example, during/while the first response window is running, the wireless device may not be in the active time of the serving cell in the DRX group based on the transmission of the MsgA not being for the CCCH logical channel. For example, based on the transmission of the MsgA not being for the CCCH logical channel, the active time of the serving cell in the DRX group may not comprise the first response window.

In an example embodiment, based on the MsgA payload not being transmitted, the first response window may occur outside of the active time of the serving cell (e.g., a DRX Active Time) in the DRX group. For example, the DRX Active Time may comprise the DRX on duration (e.g., the on duration of the DRX operation). In an example, the DRX Active Time may not comprise the DRX off duration (e.g., the off duration of the DRX operation). For example, the DRX off duration may comprise the first response window based on the MsgA payload not being transmitted.

In an example, based on the C-RNTI MAC CE being included in the MsgA payload, the first response window may occur outside of the DRX Active Time in the DRX group. For example, the DRX off duration may comprise the first response window based on the C-RNTI MAC CE being included in the MsgA payload. In an example, based on the C-RNTI being available/maintained at the wireless device, the first response window may occur outside of the DRX Active Time in the DRX group. For example, the DRX off duration may comprise the first response window based on the C-RNTI being available/maintained at the wireless device.

In an example, when the DRX operation is configured, based on the transmission of the MsgA not being for the CCCH logical channel, the first response window may occur outside of the DRX Active Time in the DRX group. For example, the DRX off duration may comprise the first response window based on the transmission of the MsgA not being for the CCCH logical channel.

In an example, when the DRX operation is configured, based on the wireless device being in an RRC_CONNECTED state, the first response window may occur outside of DRX Active Time in the DRX group. For example, the DRX off duration may comprise the first response window based on the wireless device being in an RRC_CONNECTED state.

In an example embodiment, based on the MsgA payload not being transmitted, the at least one DRX Active Time condition (e.g., for determining whether the wireless device in in active time or not) may not comprise the first response window being running. In an example, based on the C-RNTI MAC CE being included in the MsgA payload, the at least one DRX Active Time condition may not comprise the first response window being running. For example, when the DRX operation is configured, based on the C-RNTI being available/maintained at the wireless device, the at least one DRX Active Time condition may not comprise the first response window being running. For example, when the DRX operation is configured, based on the wireless device being in an RRC_CONNECTED state, the at least one DRX Active Time condition may not comprise the first response window being running. For example, when the DRX operation is configured, based on the transmission of the MsgA not being for the CCCH logical channel, the at least one DRX Active Time condition may not comprise the first response window being running.

One or more advantages of not considering the first response window as the active time of the serving cell in the DRX group, based on the MsgA payload not being transmitted, may be a reduction of the power consumption and/or a reduction of processing complexity of the wireless device for monitoring PDCCH.

Figure 25:
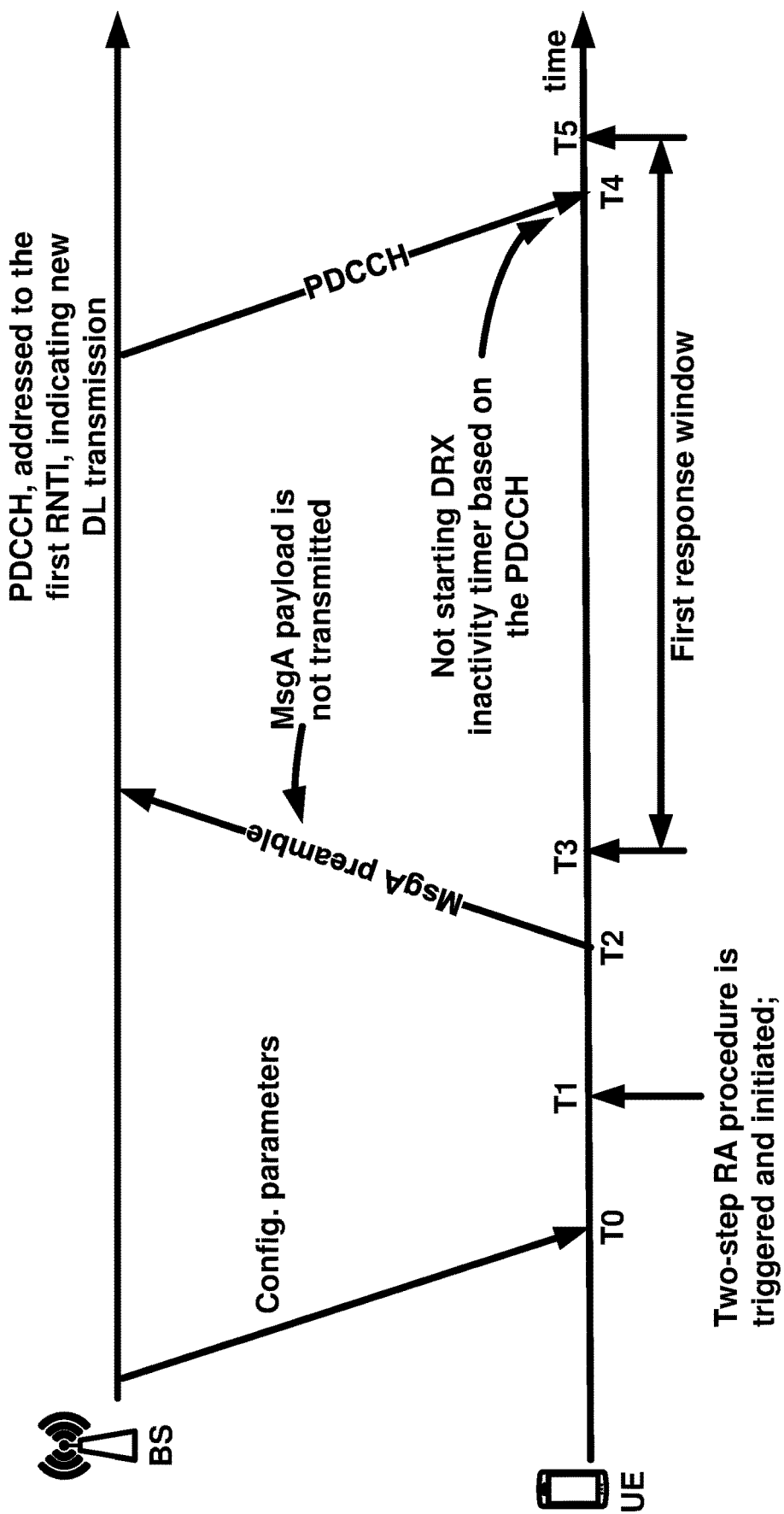
FIG. 25 is an example embodiment of a DRX operation during a two-step RA procedure performed between a wireless device and a base station in a serving cell.

FIG. 25 is an example embodiment of a DRX operation during a two-step RA procedure performed between a wireless device and a base station in a serving cell. The wireless device may receive at time T0 from the base station the one or more configuration parameters 2300. For example, the one or more configuration parameters may comprise the one or more RACH configuration parameters, the one or more DRX configuration parameters, and/or the PDCCH-Config-Common.

As FIG. 25 shows, at time T1 the wireless device may trigger an RA procedure 2320. In response to the triggered RA procedure, the wireless device may initiate the RA procedure 2010. In the example shown in FIG. 25, the wireless device selects the two-step RA type (e.g., RA_TYPE=2-stepRA). The wireless device, following the RA resource selection procedure 2110, may select one or more resources for performing the two-step RA procedure 2330. For example, the RA resource selection procedure may comprise at least the valid RO and the MsgA PO mapped to the valid RO for the MsgA 1331 transmission. As shown in FIG. 25, the MsgA may comprise the C-RNTI MAC CE 2310. As shown in FIG. 24, using/via the valid RO, at time T2 the wireless device may transmit a MsgA preamble corresponding to the preamble index 2340 (e.g., the MsgA payload not being transmitted 2350). As shown in FIG. 25, based on the MsgA preamble being transmitted and the MsgA payload not being transmitted, the wireless device may start the first response window 2360 at time T3.

As shown in FIG. 25, the base station based on detecting the MsgA preamble may transmit a response to the wireless device. During/while the first response window is running, the wireless device may monitor PDCCH to receive the response from the base station. For example, the response may indicate the contention resolution message. As shown in FIG. 25 the wireless device may receive a first PDCCH addressed to the first RNTI at time T4. For example, the PDCCH may indicate the new DL transmission. In an example, the new DL transmission may comprise the fallbackRAR MAC subPDU. In an example, the new DL transmission may comprise the MAC subPDU indicating the backoff indicator. In another example, the new DL transmission may comprise the successRAR MAC subPDU.

As shown in FIG. 25, when the DRX operation is configured, during/while the first response window is running, the wireless device may not start the DRX inactivity timer of the DRX group based on the MsgA payload not being transmitted and receiving the first PDCCH.

In an example embodiment, when the DRX operation is configured, during/while the first response window is running, the wireless device may not start the DRX inactivity timer of the DRX group based on receiving the first PDCCH and the C-RNTI MAC CE being included in the MsgA payload.

For example, when the DRX operation is configured, during/while the first response window is running, the wireless device may not start the DRX inactivity timer of the DRX group based on receiving the first PDCCH and the C-RNTI being available/maintained at the wireless device.

For example, when the DRX operation is configured, during/while the first response window is running, the wireless device may not start the DRX inactivity timer of the DRX group based on receiving the first PDCCH and the MsgA transmission not being for the CCCH logical channel.

For example, when the DRX operation is configured, during/while the first response window is running, the wireless device may not start the DRX inactivity timer of the DRX group based on receiving the first PDCCH and the wireless device being in RRC connected state.

One or more advantages of not starting the DRX inactivity timer, based on the MsgA payload not being transmitted and the first PDCCH being received, may be a reduction of the power consumption and/or a reduction of processing complexity of the wireless device for monitoring PDCCH.

Figure 26:
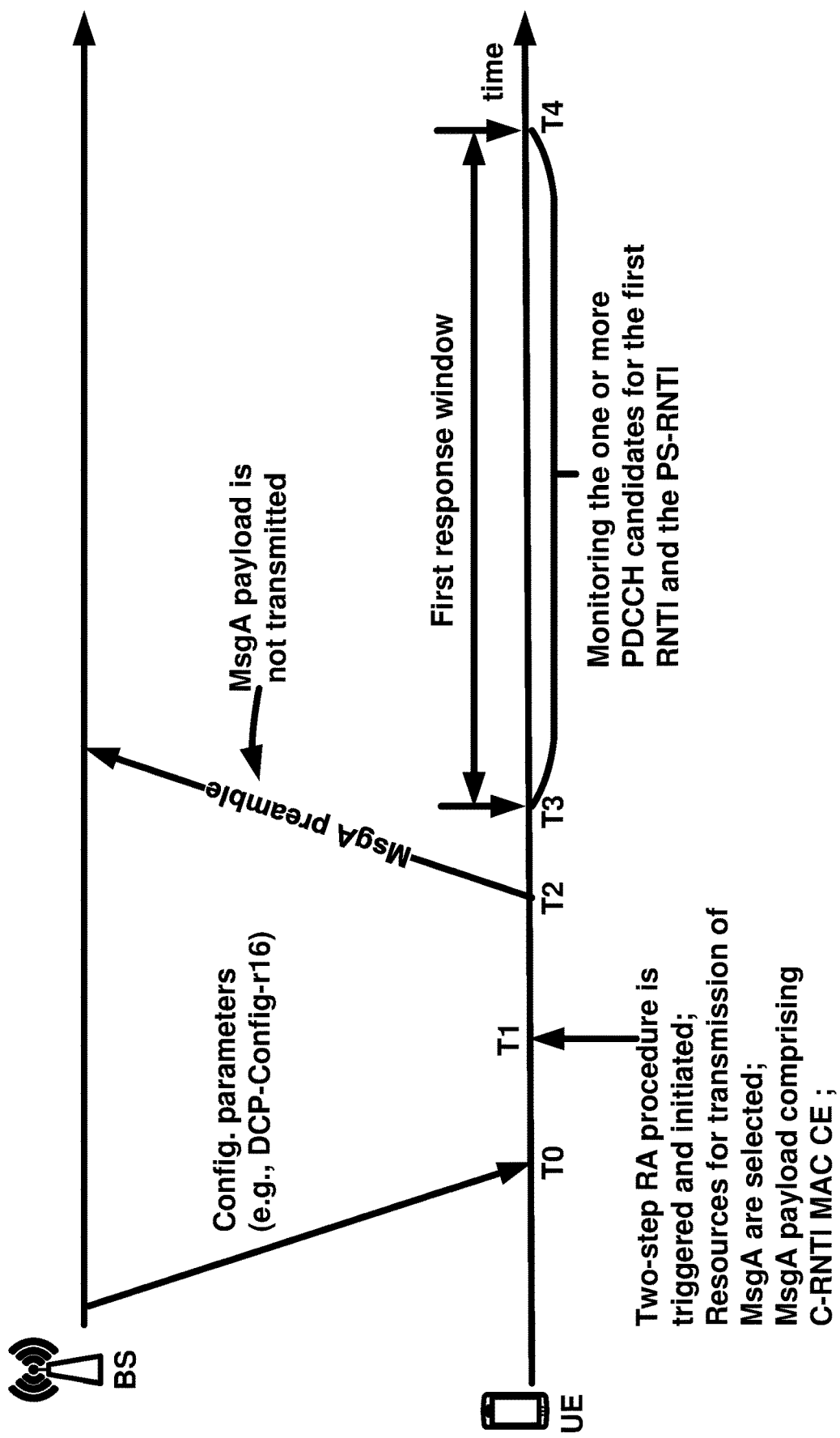
FIG. 26 is an example embodiment of a DRX operation during a two-step RA procedure performed between a wireless device and a base station in a serving cell.

FIG. 26 is an example embodiment of a DRX operation during a two-step RA procedure performed between a wireless device and a base station in a serving cell. The wireless device may receive at time T0 from the base station the one or more configuration parameters 2300. For example, the one or more configuration parameters may comprise the one or more RACH configuration parameters, the one or more DRX configuration parameters, and/or the PDCCH-Config-Common.

As shown in FIG. 26, the one or more configuration parameters may comprise the DCP-Config-r16I. In an example, the one or more configuration parameters (e.g., via the DCP-Config-r16) may indicate the PS-RNTI for detecting the DCI format 2_6 in a PDCCH reception on the PCell or on the SpCell. For example, the serving cell may be the PCell. For example, the serving cell may the SpCell.

As FIG. 26 shows, at time T1 the wireless device may trigger an RA procedure 2320. In response to the triggered RA procedure, the wireless device may initiate the RA procedure 2010. In the example shown in FIG. 26, the wireless device selects the two-step RA type (e.g., RA_TYPE=2-stepRA). The wireless device, following the RA resource selection procedure 2110, may select one or more resources for performing the two-step RA procedure 2330. For example, the RA resource selection procedure may comprise at least the valid RO and the MsgA PO mapped to the valid RO for the MsgA 1331 transmission. As shown in FIG. 26, the MsgA may comprise the C-RNTI MAC CE 2310. As shown in FIG. 26, using/via the valid RO, at time T2 the wireless device may transmit a MsgA preamble corresponding to the preamble index 2340 (e.g., the MsgA payload not being transmitted 2350). As shown in FIG. 26, based on the MsgA preamble being transmitted and the MsgA payload not being transmitted, the wireless device may start the first response window 2360 at time T3.

In an example embodiment, when the DRX is configured, during the first response window and based on the MsgA payload not being transmitted and the PS-RNTI being indicated/configured, the wireless device may monitor the one or more PDCCH candidates for the first RNTI and for the PS-RNTI (e.g., for detecting the DCI format 2_6).

In an example, based on the C-RNTI MAC CE being included in the MsgA payload, the wireless device may monitor the one or more PDCCH candidates for the first RNTI and for the PS-RNTI during the first response window.

In an example, based on the C-RNTI being available/maintained at the wireless device, the wireless device may monitor the one or more PDCCH candidates for the first RNTI and for the PS-RNTI during the first response window.

In an example embodiment, based on the transmission of the MsgA not being for the CCCH logical channel, the wireless device may monitor the one or more PDCCH candidates for the first RNTI and for the PS-RNTI during the first response window.

In an example embodiment, based on the wireless device being in an RRC_CONNECTED state, the wireless device may monitor the one or more PDCCH candidates for the first RNTI and for the PS-RNTI during the first response window.

Figure 27:
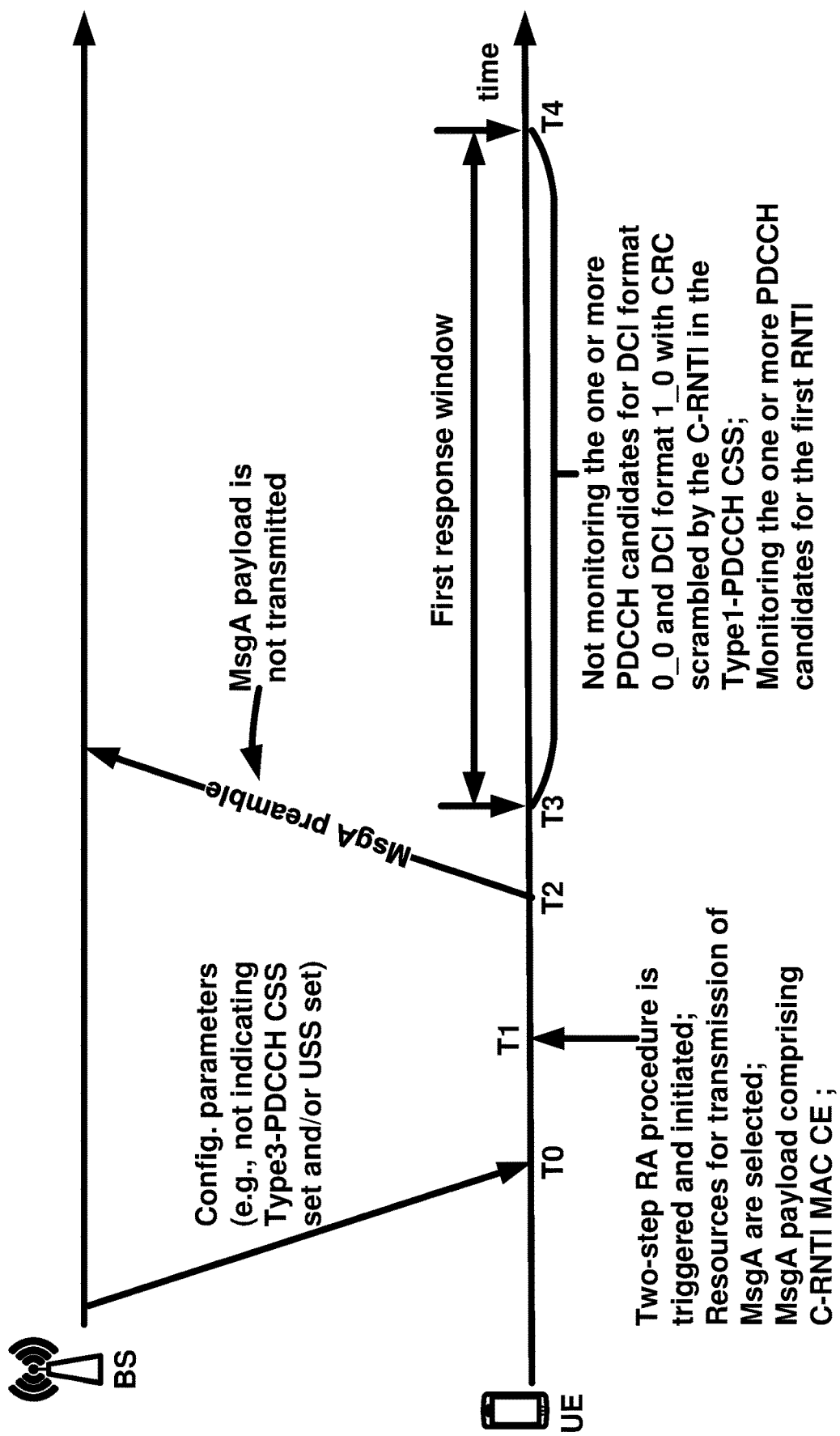
FIG. 27 is an example embodiment of a DRX operation during a two-step RA procedure performed between a wireless device and a base station in a serving cell.

FIG. 27 is an example embodiment of a DRX operation during a two-step RA procedure performed between a wireless device and a base station in a serving cell. The wireless device may receive at time T0 from the base station the one or more configuration parameters 2300. For example, the one or more configuration parameters may comprise the one or more RACH configuration parameters, the one or more DRX configuration parameters, and/or the PDCCH-Config-Common.

As shown in FIG. 27, the one or more configuration parameters may not indicate a Type3-PDCCH CSS set and/or a USS set. For example, the one or more configuration parameters may not indicate/configure SearchSpace in PDCCH-Config with searchSpaceType=common for DCI formats with CRC scrambled by a first set of RNTIs. For example, the first set of RNTIs may comprise INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or the PS-RNTI. For example, the one or more configuration parameters may not indicate/configure SearchSpace in PDCCH-Config with searchSpaceType=ue-Specific for DCI formats with CRC scrambled by a second set of RNTIs. For example, the second set of RNTIs may comprise the C-RNTI, MCS-C-RNTI, SP-CSI-RNTI, CS-RNTI(s), side link RNTI (SL-RNTI), side link configured scheduling RNTI (SL-CS-RNTI), or SL Semi-Persistent Scheduling V-RNTI.

As FIG. 27 shows, at time T1 the wireless device may trigger an RA procedure 2320. In response to the triggered RA procedure, the wireless device may initiate the RA procedure 2010. In the example shown in FIG. 27, the wireless device selects the two-step RA type (e.g., RA_TYPE=2-stepRA). The wireless device, following the RA resource selection procedure 2110, may select one or more resources for performing the two-step RA procedure 2330. For example, the RA resource selection procedure may comprise at least the valid RO and the MsgA PO mapped to the valid RO for the MsgA 1331 transmission. As shown in FIG. 27, the MsgA may comprise the C-RNTI MAC CE 2310. As shown in FIG. 27, using/via the valid RO, at time T2 the wireless device may transmit a MsgA preamble corresponding to the preamble index 2340 (e.g., the MsgA payload not being transmitted 2350). As shown in FIG. 27, based on the MsgA preamble being transmitted and the MsgA payload not being transmitted, the wireless device may start the first response window 2360 at time T3. For example, the wireless device may monitor the one or more PDCCH candidates for the first RNTI.

In an example embodiment, when the wireless device is configured with the DRX operation, during/while the first response window is running and the MsgA payload not being transmitted, the wireless device may not monitor the one or more PDCCH candidates for (or addressed to) the C-RNTI in the Type1-PDCCH CSS set. For example, the one or more PDCCH candidates may indicate (or carry) a DCI format 0_0 with CRC scrambled by the C-RNTI. For example, the one or more PDCCH candidates may indicate (or carry) a DCI format 1_0 with CRC scrambled by the C-RNTI.

For example, when the DRX operation is configured, during/while the first response window is running, the wireless device may not monitor the one or more PDCCH candidates for (or addressed to) the C-RNTI in the Type1-PDCCH CSS set based on the C-RNTI MAC CE being included in the MsgA payload.

In an example, when the DRX operation is configured, during/while the first response window is running, the wireless device may not monitor the one or more PDCCH candidates for (or addressed to) the C-RNTI in the Type1-PDCCH CSS set based on the transmission of the MsgA not being for the CCCH logical channel.

In an example, when the DRX operation is configured, during/while the first response window is running, the wireless device may not monitor the one or more PDCCH candidates for (or addressed to) the C-RNTI in the Type1-PDCCH CSS set based on the wireless device being in an RRC connected state.

For example, when the DRX operation is configured, during/while the first response window is running, the wireless device may not monitor the one or more PDCCH candidates for (or addressed to) the C-RNTI in the Type1-PDCCH CSS set based on the C-RNTI being available at the wireless device.

Figure 28:
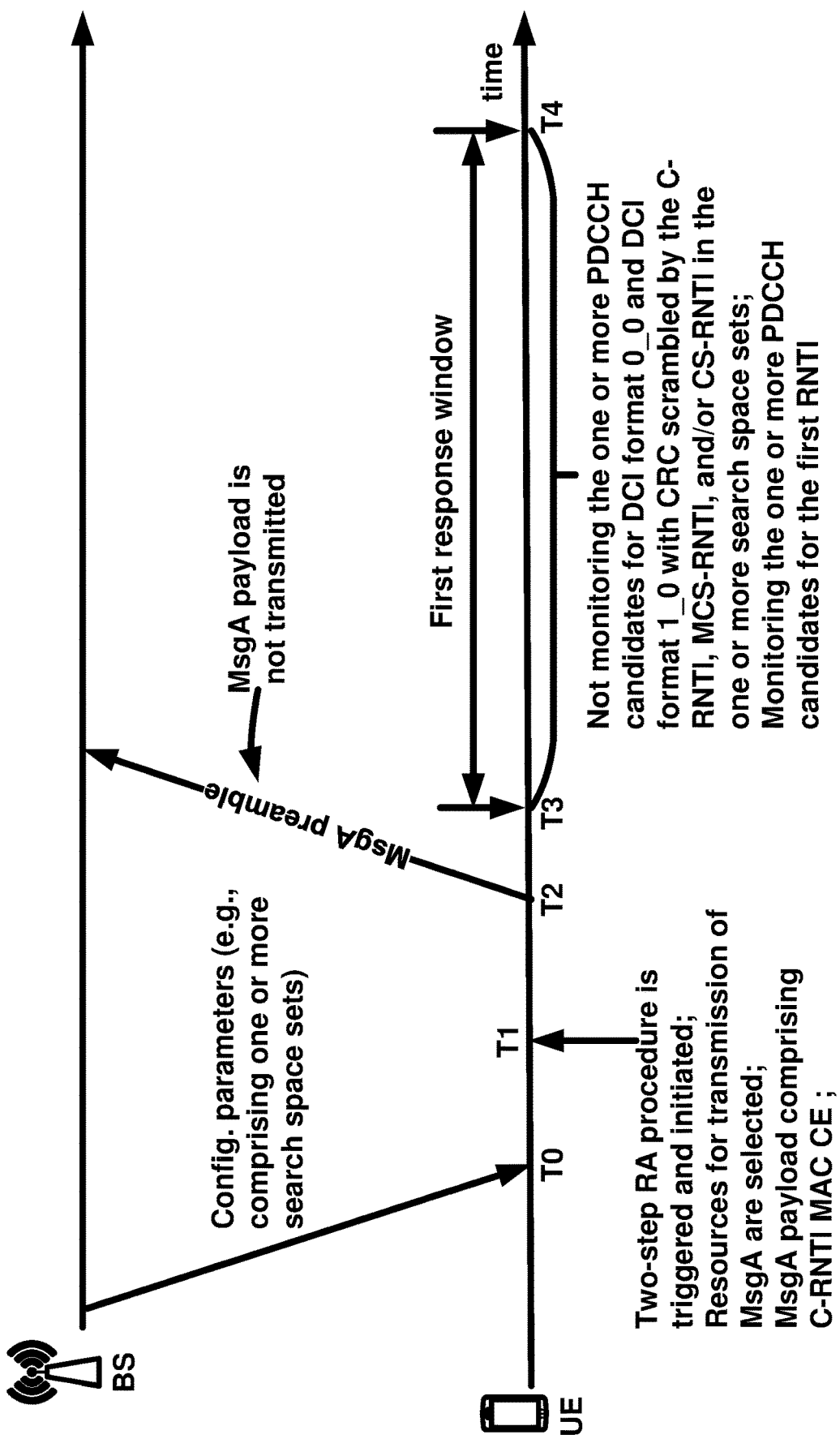
FIG. 28 is an example embodiment of a DRX operation during a two-step RA procedure performed between a wireless device and a base station in a serving cell.

FIG. 28 is an example embodiment of a DRX operation during a two-step RA procedure performed between a wireless device and a base station in a serving cell. The wireless device may receive at time T0 from the base station the one or more configuration parameters 2300. For example, the one or more configuration parameters may comprise the one or more RACH configuration parameters, the one or more DRX configuration parameters, and/or the PDCCH-Config-Common.

As shown in FIG. 27, the one or more configuration parameters may indicate/configure one or more search space sets. For example, the one or more search space sets may comprise one or more of the following: searchSpaceZero, searchSpaceSIB1, searchSpaceOtherSystemInformation, pagingSearchSpace, ra-SearchSpace. In an example, the wireless device may be provided/indicated an MCS-C-RNTI and/or a CS-RNTI.

As FIG. 28 shows, at time T1 the wireless device may trigger an RA procedure 2320. In response to the triggered RA procedure, the wireless device may initiate the RA procedure 2010. In the example shown in FIG. 28, the wireless device selects the two-step RA type (e.g., RA_TYPE=2-stepRA). The wireless device, following the RA resource selection procedure 2110, may select one or more resources for performing the two-step RA procedure 2330. For example, the RA resource selection procedure may comprise at least the valid RO and the MsgA PO mapped to the valid RO for the MsgA 1331 transmission. As shown in FIG. 27, the MsgA may comprise the C-RNTI MAC CE 2310. As shown in FIG. 28, using/via the valid RO, at time T2 the wireless device may transmit a MsgA preamble corresponding to the preamble index 2340 (e.g., the MsgA payload not being transmitted 2350). As shown in FIG. 28, based on the MsgA preamble being transmitted and the MsgA payload not being transmitted, the wireless device may start the first response window 2360 at time T3. For example, the wireless device may monitor the one or more PDCCH candidates for the first RNTI.

In an example embodiment, when DRX operation is configured, during/while the first response window is running and based on the MsgA payload not being transmitted, the wireless device may not monitor the one or more PDCCH candidates for DCI format 0_0 and DCI format 1_0 with CRC scrambled by the C-RNTI, the MCS-C-RNTI, and/or the CS-RNTI in the one or more search space sets. For example, the MsgA payload may comprise the C-RNTI MAC CE. For example, the transmission of the MsgA may not be for the CCCH logical channel. In an example, the C-RNTI may be available at the wireless device. In an example, the wireless device may be in an RRC connected state.

According to an example embodiment, the wireless device may receive, from a base station, one or more configuration parameters indicating monitoring physical downlink control channel (PDCCH) for at least one radio network temporary identifiers (RNTIs) for a discontinuous reception (DRX) operation and a first RNTI for a random access (RA) procedure. The wireless device may initiate the random access (RA) procedure. The wireless device may select one or more resources for transmitting a first message, comprising a preamble and a payload, of the RA procedure, wherein the payload comprises a cell RNTI (C-RNTI) medium access control (MAC) control element (CE). The wireless device may start a first response window based on transmitting the preamble using the one or more resources. During the first response window and based on the payload not being transmitted, the wireless device may monitor the PDCCH for the first RNTI and may not monitor the PDCCH for the at least one RNTI.

In an example, the wireless device may not monitor, during the first response window, one or more PDCCH candidates for (or addressed to) a cell RNTI (C-RNTI).

In an example, an active time of the DRX operation may not comprise the first response window.

In an example, the first response window may not occur in an active time of the DRX operation.

In an example, the first response window may occur during an off duration of the DRX operation.

In an example, the DRX operation may comprise an on duration and an off duration. The first response window may occur during the off duration of the DRX operation.

In an example, the DRX operation may comprise an active time and an off duration. The first response window may occur during the off duration of the DRX operation.

In an example, the wireless device may monitor the PDCCH for both power saving RNTI (PS-RNTI) and the first RNTI, wherein the first RNTI is different than the PS-RNTI.

In an example, a C-RNTI may be available/maintained at the wireless device.

In an example, the wireless device may be in a radio resource control (RRC) connected state.

In an example, the RA procedure may be a two-step RA procedure.

In an example, the first message may be a message A of a two-step RA procedure.

In an example, the first RNTI may a message B RNTI (MSGB-RNTI).

In an example, the first response window may a message B response window.

In an example, the one or more resources may comprise a valid physical random access channel (PRACH) resource/occasion and a physical downlink shared channel (PUSCH) resource/occasion that is mapped to the valid PRACH resource/occasion.

In an example, the PUSCH resource/occasion may be invalidated/invalid.

In an example, the wireless device may not transmit the payload based on the PUSCH resource/occasion being invalidated/invalid.

In an example, the wireless device may start the first response window from at least a last symbol of the valid PRACH resource/occasion.

In an example, the wireless device may start the first response window from a first symbol of a PDCCH monitoring occasion that occurs first among the PDCCH monitoring occasions after the last symbol of the valid PRACH resource/occasion In an example, the wireless device may transmit the preamble via the valid PRACH resource/occasion.

In an example, the wireless device may not transmit the payload in response to the PUSCH resource/occasion being validated/valid; and the transmission of the payload via the PUSCH occasion/resource being canceled.

In an example, the wireless device may start the first response window from at least one symbol after the last symbol of the PUSCH resource/occasion.

In an example, the wireless device may start the first response window from a first symbol of a PDCCH monitoring occasion that occurs first among the PDCCH monitoring occasions after the last symbol of the PUSCH resource/occasion In an example, the wireless device may not start a DRX inactivity timer of a DRX group based on receiving a PDCCH, during the first response window, indicating a new downlink transmission.

In an example, the at least one RNTI may comprise one or more of C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

In an example, the wireless device may receive one or more configuration parameters from the base station, wherein the one or more configuration parameters comprise one or more of: one or more DRX configuration parameters configuring/indicating DRX operation/functionality; or one or more random access channel (RACH) configuration parameters.

In an example, the wireless device may not be provided/indicated a Type3-PDCCH common search space (CSS) set and/or UE-specific search space (USS) set. The wireless device may be provided a Type1-PDCCH-CSS set.

In an example, the wireless device may not monitor, during the first response window and based on the payload not being transmitted, the one or more PDCCH candidates addressed to the C-RNTI in the Type1-PDCCH-CSS set for a downlink control channel (DCI) format 0_0 or a DCI format 1_0.

In an example, the wireless device may be provided/indicated one or more search space sets; and/or a modulation and coding scheme (MCS) RNTI and/or configured scheduling (CS) RNTI and/or the C-RNTI.

In an example, the wireless device may not monitor, during the first response window and based on the payload not being transmitted, the one or more PDCCH candidates for the C-RNTI, MCS-RNTI, and/or CS-RNTI in the one or more search space sets.

In an example, the wireless device may delay the start of the first response window by a first offset.

In an example, the wireless device may be configured with the first offset.

In an example, the first offset may be based on the propagation delay between the wireless device and the base station.

In an example, the wireless device may extend the value range of the first response window by a second offset.

In an example, the wireless device may be configured with the second offset.

In an example, the second offset may be based on the propagation delay between the wireless device and the base station.

In an example, the second offset may be based on a differential delay of a serving cell, wherein the wireless device communicates with the base station in the serving cell.

In an example, the wireless device may communicate with the base station via a non-terrestrial network (NTN).

What is claimed is:

1. A method comprising:
 receiving, by a wireless device, one or more configuration parameters indicating one or more radio network temporary identifiers (RNTIs) to monitor for, via downlink control channels, during an active time of discontinuous reception (DRX) operation, wherein the one or more RNTIs comprise a cell RNTI (C-RNTI);
 selecting, for transmission of a message A (MsgA) of a random access (RA) procedure, one or more resources, wherein:
  the MsgA comprises a preamble and a payload; and
  the payload comprises the C-RNTI;
 starting a response window based on transmitting, for the RA procedure, the preamble via at least one resource of the one or more resources; and
 based on dropping transmission of the payload:
  monitoring, during the response window, the downlink control channels for both a power saving RNTI (PS-RNTI) and a first RNTI, wherein the first RNTI is associated with a response to the preamble and determined based on the at least one resource; and
not monitoring, during the response window, the downlink control channels for the one or more RNTIs.

2. The method of claim 1, wherein the response window occurs outside of the active time of the DRX operation.

3. The method of claim 1, wherein:
the RA procedure is a two-step RA procedure;
the first RNTI is a message B RNTI (MSGB-RNTI); and
the response window is a message B response window.

4. The method of claim 1, wherein:
the one or more resources comprise a valid physical random access channel (PRACH) resource and a physical downlink shared channel (PUSCH) resource mapped to the valid PRACH resource; and
a start of the response window is from at least one symbol after a last symbol of the PUSCH resource.

5. The method of claim 4, wherein the transmission is dropped in response to:
the PUSCH resource being invalid; and
the transmission of the payload being canceled.

6. The method of claim 1, wherein not monitoring comprises not decoding the downlink control channels for the one or more RNTIs.

7. The method of claim 1, further comprising not starting a DRX inactivity timer of a DRX group based on receiving a PDCCH, during the response window, indicating a new downlink transmission.

8. The method of claim 1, wherein the wireless device:
communicates with a base station via a non-terrestrial network (NTN); and/or
is in a radio resource control (RRC) connected state.

9. The method of claim 1, further comprising delaying the start of the response window by a first offset, wherein the first offset is based on a propagation delay between the wireless device and a base station.

10. A wireless device comprising:
one or more processors; and
memory storing instructions that, when executed by the one or more processors, cause the wireless device to:
receive one or more configuration parameters indicating one or more radio network temporary identifiers (RNTIs) to monitor for, via downlink control channels, during an active time of discontinuous reception (DRX) operation, wherein the one or more RNTIs comprise a cell RNTI (C-RNTI);
select, for transmission of a message A (MsgA) of a random access (RA) procedure, one or more resources, wherein:
the MsgA comprises a preamble and a payload; and
the payload comprises the C-RNTI;
start a response window based on transmitting, for the RA procedure, the preamble via at least one resource of the one or more resources; and
based on dropping transmission of the payload:
monitor, during the response window, the downlink control channels for both a power saving RNTI (PS-RNTI) and a first RNTI, wherein the first RNTI is associated with a response to the preamble and determined based on the at least one resource; and
not monitor, during the response window, the downlink control channels for the one or more RNTIs.

11. The wireless device of claim 10, wherein the response window occurs outside of the active time of the DRX operation.

12. The wireless device of claim 10, wherein:
the RA procedure is a two-step RA procedure;
the first RNTI is a message B RNTI (MSGB-RNTI); and
the response window is a message B response window.

13. The wireless device of claim 10, wherein:
the one or more resources comprise a valid physical random access channel (PRACH) resource and a physical downlink shared channel (PUSCH) resource mapped to the valid PRACH resource; and
a start of the response window is from at least one symbol after a last symbol of the PUSCH resource.

14. The wireless device of claim 13, wherein the transmission is dropped in response to:
the PUSCH resource being invalid; and
the transmission of the payload being canceled.

15. The wireless device of claim 10, wherein not monitoring comprises not decoding the downlink control channels for the one or more RNTIs.

16. The wireless device of claim 10, wherein the instructions, when executed by the one or more processors, further cause the wireless device to not start a DRX inactivity timer of a DRX group based on receiving a PDCCH, during the response window, indicating a new downlink transmission.

17. The wireless device of claim 10, wherein the wireless device:
communicates with a base station via a non-terrestrial network (NTN); and/or
is in a radio resource control (RRC) connected state.

18. A non-transitory computer-readable medium comprising instructions that, when executed by one or more processors of a wireless device, cause the wireless device to:
receive one or more configuration parameters indicating one or more radio network temporary identifiers (RNTIs) to monitor for, via downlink control channels, during an active time of discontinuous reception (DRX) operation, wherein the one or more RNTIs comprise a cell RNTI (C-RNTI);
select, for transmission of a message A (MsgA) of a random access (RA) procedure, one or more resources, wherein:
the MsgA comprises a preamble and a payload; and
the payload comprises the C-RNTI;
start a response window based on transmitting, for the RA procedure, the preamble via at least one resource of the one or more resources; and
based on dropping transmission of the payload:
monitor, during the response window, the downlink control channels for both a power saving RNTI (PS-RNTI) and a first RNTI, wherein the first RNTI is associated with a response to the preamble and determined based on the at least one resource; and
not monitor, during the response window, the downlink control channels for the one or more RNTIs.

19. The non-transitory computer-readable medium of claim 18, wherein the response window occurs outside of the active time of the DRX operation.

20. The non-transitory computer-readable medium of claim 18, wherein:
the one or more resources comprise a valid physical random access channel (PRACH) resource and a physical downlink shared channel (PUSCH) resource mapped to the valid PRACH resource; and
a start of the response window is from at least one symbol after a last symbol of the PUSCH resource.

* * * * *